US011435199B2

(12) United States Patent
Lermusiaux et al.

(10) Patent No.: US 11,435,199 B2
(45) Date of Patent: Sep. 6, 2022

(54) ROUTE DETERMINATION IN DYNAMIC AND UNCERTAIN ENVIRONMENTS

(71) Applicant: Massachusetts Institute of Technology, Cambridge, MA (US)

(72) Inventors: Pierre Lermusiaux, Cambridge, MA (US); Deepak Narayanan Subramani, Cambridge, MA (US); Chinmay Kulkarni, Cambridge, MA (US); Patrick Haley, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 265 days.

(21) Appl. No.: 16/449,305

(22) Filed: Jun. 21, 2019

(65) Prior Publication Data
US 2019/0390969 A1    Dec. 26, 2019

Related U.S. Application Data

(60) Provisional application No. 62/689,011, filed on Jun. 22, 2018.

(51) Int. Cl.
*G01C 21/34* (2006.01)

(52) U.S. Cl.
CPC ..... *G01C 21/3446* (2013.01); *G01C 21/3469* (2013.01)

(58) Field of Classification Search
CPC .. G01C 21/3446; G01C 21/005; G01C 21/20; G01C 21/26; G01C 21/3469; G05D 1/0005; G05D 1/0212
See application file for complete search history.

(56) References Cited

U.S. PATENT DOCUMENTS

| | | | | |
|---|---|---|---|---|
| 8,862,403 B1 * | 10/2014 | Piponi | ............... | H04B 7/18504 701/410 |
| 9,542,849 B1 * | 1/2017 | Bertram | ............... | G08G 5/0034 |
| 2010/0094485 A1 * | 4/2010 | Verlut | ............... | G01C 21/005 701/3 |
| 2014/0336789 A1 * | 11/2014 | Huynh | ............... | G05B 13/04 700/31 |
| 2017/0200376 A1 * | 7/2017 | Itabashi | ............... | G08G 5/0013 |
| 2018/0285749 A1 * | 10/2018 | Dow | ............... | G06F 30/20 |

FOREIGN PATENT DOCUMENTS

CN    111596333 A  *  8/2020

OTHER PUBLICATIONS

Themistoklis Sapsis, Pierre Lermusiaux, "Dynamically orthogonal field equations for continuous stochastic dynamical systems" 2009, Physica, D 238, pp. 2347-2360. (Year: 2009).*

(Continued)

*Primary Examiner* — Khoi H Tran
*Assistant Examiner* — Tristan J Greiner
(74) *Attorney, Agent, or Firm* — Wolf, Greenfield & Sacks, P.C.

(57) ABSTRACT

Techniques for use in connection with determining an optimized route for a vehicle include obtaining a target state, a fixed initial position of the vehicle, and dynamic flow information, and determining an optimized route from the fixed initial position to the target state using the dynamic flow information.

14 Claims, 43 Drawing Sheets
(34 of 43 Drawing Sheet(s) Filed in Color)

(56) References Cited

OTHER PUBLICATIONS

Nathan Glatt-Holtz, Roger Temam, "Pathwise Solutions of the 2-D Stochastic Primitive Equations.", 2011, Appl Math Optim 63, pp. 401-433 (Year: 2011).*
Patrick Haley Jr, Pierre Lermusiaux "Multiscale two-way embedding schemes for free-surface primitive equations in the Multidisciplinary Simulation, Estimation and Assimilation System" 2010, Ocean Dynamics 60, pp. 1497-1537. (Year: 2010).*
Arvind A. Pereira, Jonathan Binney, Geoffrey Hollinger, Guarav Sukhatme, "Risk-aware Path Planning for Autonomous Underwater Vehicles using Predictive Ocean Models", 2013, Journal of Field Robotics 30, pp. 741-762. (Year: 2013).*
Tapovan Lolla, Pierre Lermusiaux, Mattheus Ueckermann, Patrick Haley Jr. "Time-optimal path planning in dynamic flows using level set equations: theory and schemes" 2014, Ocean Dynamics 64, pp. 1373-1397 (Year: 2014).*
Deepak Subramani, Pierre Lermusiaux, "Energy-optimal path planning by stochastic dynamically orthogonal level-set optimization" 2016 Ocean Modeling 100, pp. 57-77. (Year: 2016).*
Pierre Lermusiaux, Konuralp Yigit, Tapovan Lolla, Mattheus Ueckermann, "Science of Autonomy: Time-Optimal Path Planning and Adaptive Sampling for Swarms of Ocean Vehicles." 2014 (Year: 2014).*
International Search Report and Written Opinion dated Sep. 23, 2019 in connection with International Application No. PCT/US2019/038605.
Bertuccelli et al., Real-time Multi-UAV Task Assignment in Dynamic and Uncertain Environments. American Institute of Aeronautics and Astronautics. Guidance, Navigation, and Control Conference. Jun. 14, 2012; 16 pages.
Di Giacomo, Dynamically adaptive animation of virtual humans. Diss. University of Geneva. 2007; 183 pages.
Duan et al., Max-Min Adaptive Ant Colony Optimization Approach To Multi-UAVs Coordinated Trajectory Replanning in Dynamic and Uncertain Environments. ScienceDirect. Journal of Bionic Engineering. Jun. 1, 2009; 6(2):161-173.
Lolla, Path Planning in Time Dependent Flows using Level Set Methods. Thesis submitted to Dept. of Mechanical Engineemg at the Massachusetts Instate of Technology. Sep. 2012; 177 pages.
Mowlavi et al., Model order reduction for stochastic dynamical systems with continous symmetries. SIAM Journal on Scientific Computing. Jun. 5, 2018.
Subramani et al., Stochastic time-optimal path-planning in uncertain, strong, and dynamic flows. Science Direct. Received Sep. 20, 2017. Computer Methods in Applied Mechanics and Engineering. 2018; 333:281-237.
PCT/US2019/038605, Sep. 23, 2019, International Search Report and Written Opinion.
International Preliminary Report on Patentability for International Application No. PCT/US2019/038605 dated Dec. 30, 2020.
Adalsteinsson et al., A fast level set method for propagating interfaces. Journal of Computational Physics. May 1, 1995;118(2):269-77.
Aghababa, 3D path planning for underwater vehicles using five evolutionary optimization algorithms avoiding static and energetic obstacles. Applied Ocean Research. Oct. 1, 2012;38:48-62.
Alt et al., Computing the Fréchet distance between two polygonal curves. International Journal of Computational Geometry & Applications. Mar. 1995;5(01n02):75-91.
Alvarez et al., Evolutionary path planning for autonomous underwater vehicles in a variable ocean. IEEE Journal of Oceanic Engineering. Jul. 19, 2004;29(2):418-29.
Amato et al., Policy search for multi-robot coordination under uncertainty. The International Journal of Robotics Research. Dec. 2016;35(14):1760-78.
Arrow, Utilities, attitudes, choices: A review note. Econometrica: Journal of the Econometric Society. Jan. 1, 1958;26(1):1-23.
Athans et al., Optimal control: an Introduction to the Theory and its Applications. Dover Books on Engineering Series, Dover Publications. 2007:897 pages.
Bardi et al., Optimal control and viscosity solutions of Hamilton-Jacobi-Bellman equations. Springer Science & Business Media. Jan. 11, 2008:588 pages.
Barraquand et al., A Monte-Carlo algorithm for path planning with many degrees of freedom. Proceedings of the IEEE International Conference on Robotics and Automation. May 13, 1990:1712-17.
Bellingham et al., Robotics in remote and hostile environments. Science. Nov. 16, 2007;318(5853):1098-102.
Beylkin, Path Optimization For An Earth-Based Demonstration Balloon Flight. SURF Report. 2008:12 pages.
Bianchini et al., SBV regularity for Hamilton—Jacobi Equations with Hamiltonian depending on (t,x). SIAM Journal on Mathematical Analysis. 2012;44(3):2179-203.
Bloch et al., Nonholonomic mechanics and control. Interdisciplinary Applied Mathematics, Springer. 2003;4:498 pages.
Blythe, An overview of planning under uncertainty. AI Magazine. 1999;20(2):37-54.
Boddy et al., Solving time-dependent planning problems. Brown University, Department of Computer Science. Aug. 20, 1989:979-984.
Bokanowski et al., An adaptive sparse grid semi-Lagrangian scheme for first order Hamilton-Jacobi Bellman equations. Journal of Scientific Computing. Jun. 1, 2013;55(3):575-605.
Bokanowski et al., Minimum time control problems for non-autonomous differential equations. Systems & control letters. Oct. 1, 2009;58(10-11):742-6.
Bokanowski et al., Reachability and minimal times for state constrained nonlinear problems without any controllability assumption. SIAM Journal on Control and Optimization. 2010;48(7):4292-316.
Bressan, Viscosity solutions of Hamilton-Jacobi equations and optimal control problems. Penn State University, Department of Mathematics. Jun. 2011:1-53.
Bry et al., Rapidly-exploring random belief trees for motion planning under uncertainty. 2011 IEEE international conference on robotics and automation. May 9, 2011:723-30.
Bryson et al., Applied Optimal Control: Optimization, Estimation, and Control. Hemisphere Publishing Corporation. 1975:496 pages.
Burns et al., Sampling-based motion planning with sensing uncertainty. Proceedings 2007 IEEE International Conference on Robotics and Automation. Apr. 10, 2007:3313-18.
Cannarsa et al., Semiconcave functions, Hamilton-Jacobi equations, and optimal control. Progress in Nonlinear Differential Equations and Their Applications, Birkhäuser Boston. 2004:311 pages.
Chakrabarty et al., UAV flight path planning in time varying complex wind-fields. 2013 American control conference (ACC). Jun. 17, 2013:2574-80.
Cherdron et al., Asymmetric flows and instabilities in symmetric ducts with sudden expansions. Journal of Fluid Mechanics. Jan. 1978;84(1):13-31.
Clarke et al., Nonsmooth analysis and control theory. Graduate Texts in Mathematics, Springer-Verlag. 1998:288 pages.
Crandall et al., Viscosity solutions of Hamilton-Jacobi equations. Transactions of the American mathematical society. 1983;277(1):1-42.
Curtin et al., Autonomous underwater vehicles: trends and transformations. Marine Technology Society Journal. Sep. 1, 2005;39(3):65-75.
Curtin et al., Progress toward autonomous ocean sampling networks. Deep Sea Research II. Feb. 2009;56:62-7.
Davis et al., Routing strategies for underwater gliders. Deep Sea Research Part II: Topical Studies in Oceanography. Feb. 1, 2009;56(3-5):173-87.
Durst et al., Low Reynolds number flow over a plane symmetric sudden expansion. Journal of fluid mechanics. Jun. 1974;64(1):111-28.
Edwards et al., Data-driven learning and modeling of AUV operational characteristics for optimal path planning. Oceans, IEEE. Jun. 19, 2017:1-5.

(56) References Cited

OTHER PUBLICATIONS

Eiter et al., Computing discrete Fréchet distance. Tech. Report CD-TR 94/64, Information Systems Department, Technical University of Vienna. Apr. 25, 1994:1-7.
Epstein, Behavior under risk: Recent developments in theory and applications. Advances in economic theory. 1992;2:1-63.
Falcone et al., Level sets of viscosity solutions: some applications to fronts and rendez-vous problems. SIAM Journal on Applied Mathematics. Oct. 1994;54(5):1335-54.
Fearn et al., Nonlinear flow phenomena in a symmetric sudden expansion. Journal of Fluid Mechanics. Feb. 1990;211:595-608.
Feppon et al., A geometric approach to dynamical model order reduction. SIAM Journal on Matrix Analysis and Applications. 2018;39(1):510-38.
Fishburn, Nonlinear preference and utility theory. Baltimore: Johns Hopkins University Press. Jul. 1988:272 pages.
Fishburn, On the nature of expected utility. In: Expected utility hypotheses and the Allais paradox. Allais et al., Eds. Springer, Dordrecht. 1979;21:243-57.
Frankowska, Hamilton-Jacobi equations: viscosity solutions and generalized gradients. Journal of mathematical analysis and applications. Jul. 1, 1989;141(1):21-6.
Galton, On the employment of meteorological statistics in determining the best course for a ship whose sailing qualities are known. Proceedings of the Royal Society of London. Apr. 24, 1873;21:263-74.
Garau et al., Path planning of autonomous underwater vehicles in current fields with complex spatial variability: an A* approach. Proceedings of the 2005 IEEE international conference on robotics and automation. Apr. 18, 2005:194-98.
Gordon et al., Regional Oceanography of the Philippine Archipelago. Oceanography. Mar. 2011;24(1):14-27.
Hessels, Time-optimal path planning for sea-surface vehicles under the effects of strong currents and winds. Massachusetts Institute of Technology, Department of Mechanical Engineering. Jun. 2014:1-30.
Hwang et al., Gross motion planning—a survey. ACM Computing Surveys (CSUR). Sep. 1, 1992;24(3):219-91.
Kao et al., Fast sweeping methods for static Hamilton—Jacobi equations. SIAM journal on numerical analysis. 2005;42(6):2612-32.
Kewlani et al., Stochastic mobility-based path planning in uncertain environments. 2009 IEEE/RSJ International Conference on Intelligent Robots and Systems. Oct. 10, 2009:1183-89.
Kruger et al., Optimal AUV path planning for extended missions in complex, fast-flowing estuarine environments. Proceedings 2007 IEEE International Conference on Robotics and Automation. Apr. 10, 2007:4265-70.
Latombe, Robot motion planning. Springer Science & Business Media. 2012:668 pages.
Lavalle, Planning algorithms. Cambridge university press. May 29, 2006:1023 pages.
Leonard et al., Collective motion, sensor networks, and ocean sampling. Proceedings of the IEEE. Mar. 5, 2007;95(1):48-74.
Lermusiaux et al., A future for intelligent autonomous ocean observing systems. Journal of Marine Research. Nov. 1, 2017;75(6):765-813.
Lermusiaux et al.. Multiscale physical and biological dynamics in the Philippine Archipelago: predictions and processes. Oceanography. Mar. 1, 2011;24(1):70-89.
Lermusiaux et al., Quantifying uncertainties in ocean predictions. Oceanography. 2006;19(1):92-105.
Lermusiaux et al., Science of autonomy: Time-optimal path planning and adaptive sampling for swarms of ocean vehicles. In: Springer Handbook of Ocean Engineering: Autonomous Ocean Vehicles, Subsystems and Control. Sep. 11, 2014. Curtain, Ed. Chapter 21:481-98.
Lermusiaux, Error subspace data assimilation methods for ocean field estimation: Theory, validation and applications. PhD thesis, Harvard University. May 1997:420 pages.
Lermusiaux, Uncertainty estimation and prediction for interdisciplinary ocean dynamics. Journal of Computational Physics. Sep. 1, 2006;217(1):176-99.
Licalzi et al., The Pearson system of utility functions. European Journal of Operational Research. Jul. 16, 2006;172(2):560-73.
Lolla et al., Path planning in multi-scale ocean flows: Coordination and dynamic obstacles. Ocean Modelling. Oct. 1, 2015;94:46-66.
Lolla et al., Time-optimal path planning in dynamic flows using level set equations: realistic applications. Ocean Dynamics. Oct. 1, 2014;64(10):1399-1417.
Lygeros, On reachability and minimum cost optimal control. Automatica. Jun. 1, 2004;40(6):917-27.
Mannarini et al., VISIR-I: small vessels—least-time nautical routes using wave forecasts. Geoscientific Model Development. May 2, 2016;9(4):1597-625.
Mirabito et al., Autonomy for surface ship interception. Oceans. Jun. 19, 2017:1-10.
Mitchell et al., A time-dependent Hamilton-Jacobi formulation of reachable sets for continuous dynamic games. IEEE Transactions on automatic control. Jul. 11, 2005;50(7):947-57.
Mitchell et al., Level set methods for computation in hybrid systems. International Workshop on Hybrid Systems: Computation and Control, Springer, Berlin, Heidelberg. Mar. 23, 2000:310-23.
Mitchell et al., Overapproximating reachable sets by Hamilton-Jacobi projections. Journal of Scientific Computing. Dec. 1, 2003;19(1-3):323-46.
Mitchell, Application of level set methods to control and reachability problems in continuous and hybrid systems. PhD Thesis, Scientific Computing and Computational Mathematics Program, Standford University. Aug. 2002:141 pages.
Osher et al., Fronts propagating with curvature-dependent speed: algorithms based on Hamilton-Jacobi formulations. Journal of computational physics. Nov. 1, 1988;79(1):12-49.
Petres et al., Path planning for autonomous underwater vehicles. IEEE Transactions on Robotics. Apr. 16, 2007;23(2):331-41.
Leyland et al., Rowing to barbados. Algorithms for Optimization with Incomplete Information. Mar. 4, 2005:1-6.
Rao et al., Large-scale path planning for underwater gliders in ocean currents. Australasian conference on robotics and automation (ACRA). Dec. 2-4, 2009:8 pages.
Raz, Sailboat speed vs. wind speed. Catalyst, Journal of the Amateur Yacht Research Society. Apr. 2009:21-26.
Rhoads et al., Minimum time feedback control of autonomous underwater vehicles. 49th IEEE conference on decision and control (CDC). Dec. 1, 2010:5828-5834.
Rhoads et al., Minimum time heading control of underpowered vehicles in time-varying ocean currents. Ocean Engineering. Jul. 1, 2013;66:12-31.
Rosenblatt, Optimal selection of uncertain actions by maximizing expected utility. Autonomous Robots. Aug. 1, 2000;9(1):17-25.
Schoemaker, The expected utility model: Its variants, purposes, evidence and limitations. Journal of economic literature. Jun. 1, 1982;20(2):529-63.
Schofield et al., Automated sensor network to advance ocean science. Eos, Transactions American Geophysical Union. Sep. 28, 2010;91(39):345-6.
Sethian et al., Ordered upwind methods for static Hamilton—Jacobi equations. Proceedings of the National Academy of Sciences. Sep. 25, 2001;98(20):11069-74.
Sethian et al., Ordered upwind methods for static Hamilton—Jacobi equations: Theory and algorithms. SIAM Journal on Numerical Analysis. 2003;41(1):325-63.
Sethian, Fast marching methods. SIAM review. 1999;41(2):199-235.
Soulignac et al., Time-minimal path planning in dynamic current fields. 2009 IEEE International Conference on Robotics and Automation. May 12, 2009:2473-79.
Subramani et al., A stochastic optimization method for energy-based path planning. Springer, Dynamic Data-Driven Environmental Systems Science: First International Conference. Nov. 26, 2015;8964:347-358.

(56) References Cited

OTHER PUBLICATIONS

Subramani et al., Energy-optimal path planning in the coastal ocean. Journal of Geophysical Research: Oceans. May 2017;122(5):3981-4003.

Subramani et al., Time-optimal path planning: Real-time sea exercises. IEEE Oceans 2017—Aberdeen. Jun. 19, 2017:1-10.

Subramani, Probabilistic regional ocean predictions: stochastic fields and optimal planning. Massachusetts Institute of Technology, Department of Mechanical Engineering and Center for Computational Engineering. Feb. 2018:268 pages.

Sun et al., Multiple-pursuer/one-evader pursuit-evasion game in dynamic flowfields. Journal of guidance, control, and dynamics. Jul. 2017;40(7):1627-1637.

Sun et al., Pursuit-evasion games in dynamic flow fields via reachability set analysis. 2017 American Control Conference (ACC) Seattle. May 24, 2017:4595-4600.

Thompson et al., Spatiotemporal path planning in strong, dynamic, uncertain currents. 2010 IEEE International Conference on Robotics and Automation. May 3, 2010:4778-83.

Tonon, Regularity results for Hamilton-Jacobi equations. PhD thesis, Scuola Internazionale Superiore di Studi Avanzati. Sep. 2011:109 pages.

Ueckerman et al., Numerical schemes for dynamically orthogonal equations of stochastic fluid and ocean flows. Journal of Computational Physics. Jan. 15, 2013;233:272-94.

Ueckermann et al., 2.39 finite vol. MATLAB framework documentation. Massachusetts Institute of Technology, Tech report, MSEAS Group. Jan. 23, 2015:1-42.

Vladimirsky, Static PDEs for time-dependent control problems. Interfaces and Free Boundaries. Sep. 30, 2006;8(3):281-300.

Von Neumann el al., Theory of games and economic behavior (commemorative edition). Princeton university press, Mar. 19, 2007:774 pages.

Wang et al., Path planning in uncertain flow fields using ensemble method. Ocean Dynamics. Oct. 1, 2016;66(10):1231-51.

Wellman et al., Path planning under time-dependent uncertainty. Proceedings of the Eleventh conference on Uncertainty in artificial intelligence, Morgan Kaufmann Publishers Inc. Aug. 18, 1995:532-39.

Witt et al., Go with the flow: Optimal AUV path planning in coastal environments. Proceedings of Australasian Conference on Robotics and Automation. Dec. 2008:86-94.

Yigit, Path planning methods for autonomous underwater vehicles. Massachusetts Institute of Technology, Department of Mechanical Engineering. Jun. 2011:1-81.

PCT/US2019/038605, Dec. 30, 2020, International Preliminary Report on Patentability.

\* cited by examiner (a) Glider 1

(b) Glider 2

ROW D
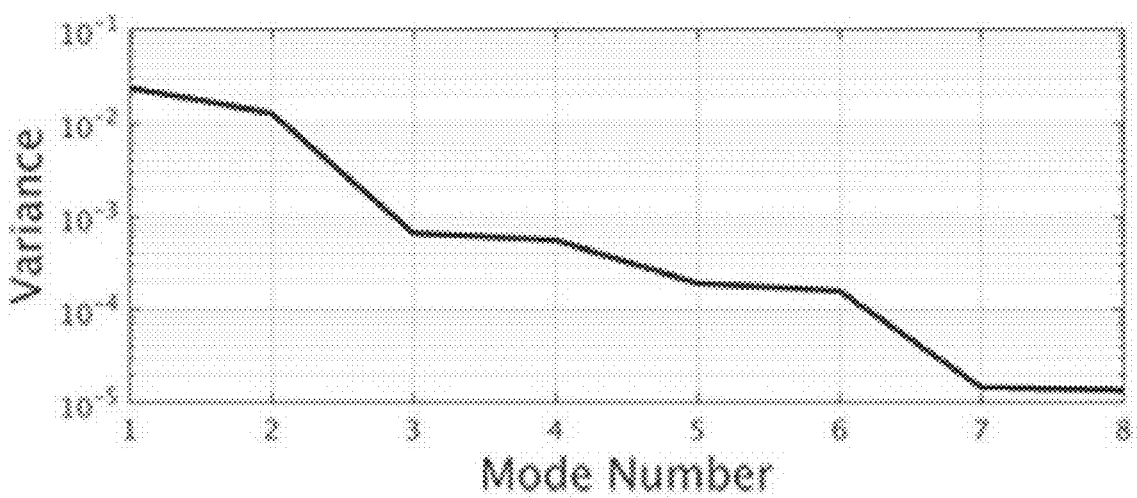
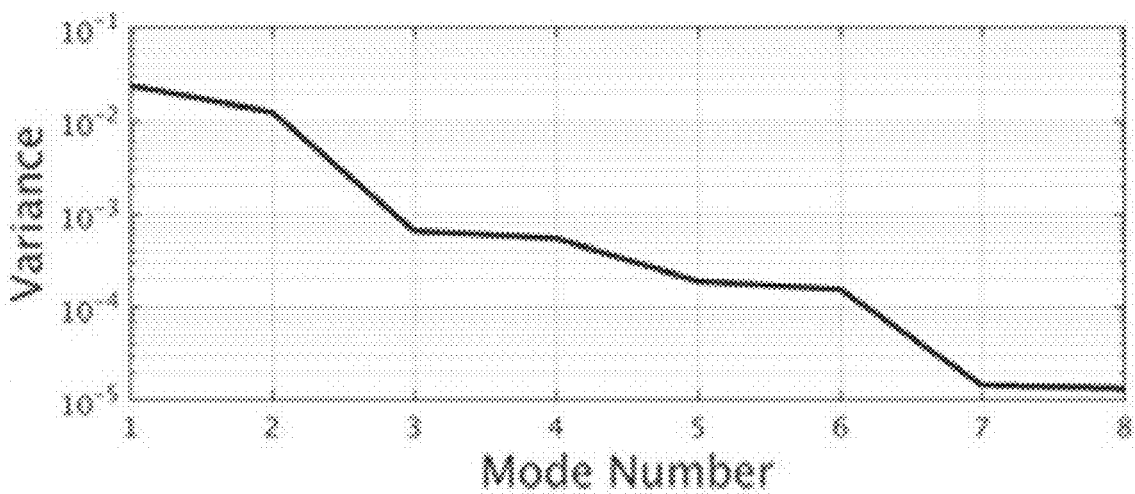
FIG. 3-11C

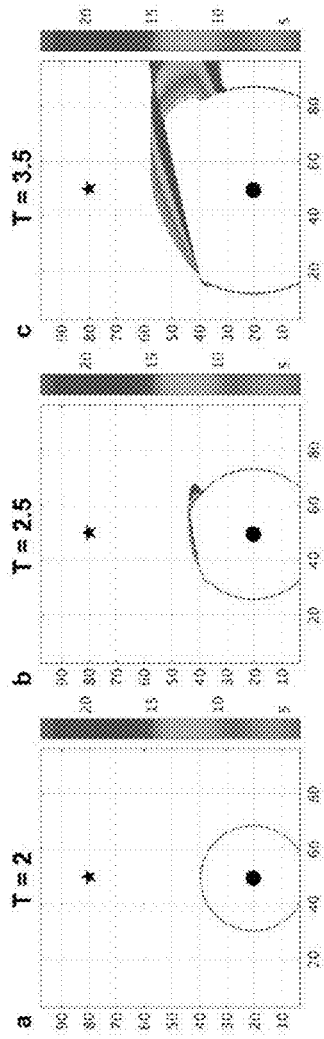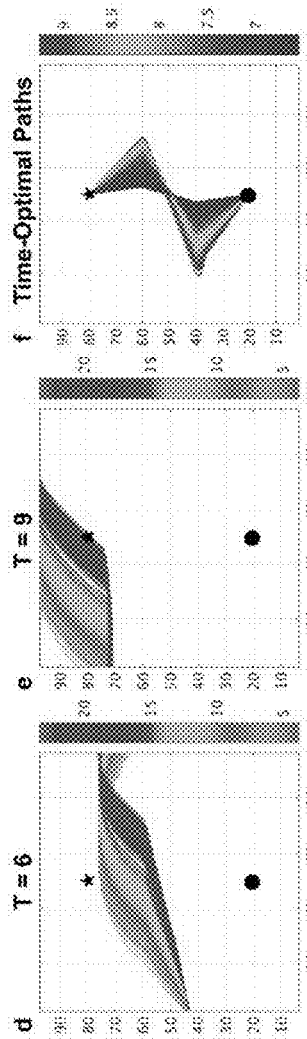

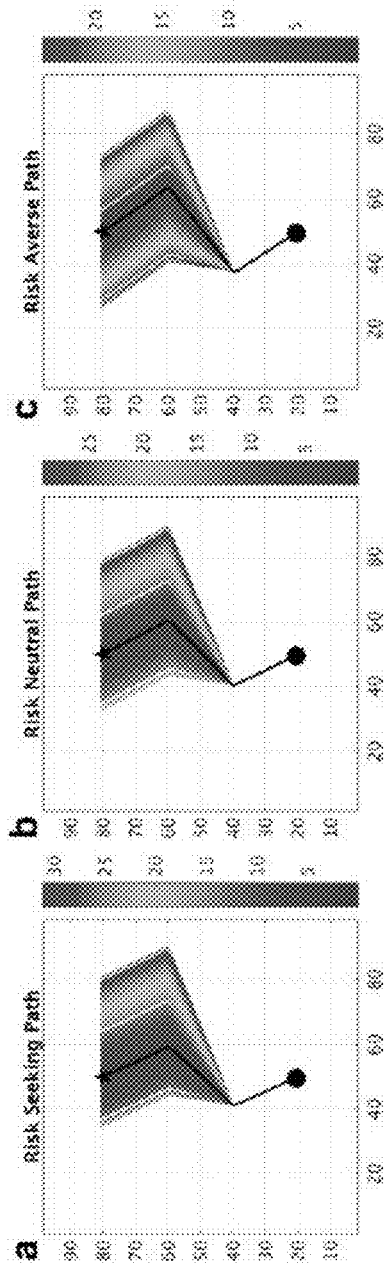

ROUTE DETERMINATION IN DYNAMIC AND UNCERTAIN ENVIRONMENTS

RELATED APPLICATIONS

The present application claims the benefit under 35 U.S.C. § 119(e) of U.S. Provisional Patent Application Ser. No. 62/689,011 entitled "OPTIMAL SHIP ROUTING IN STRONG, DYNAMIC, AND UNCERTAIN OCEAN CURRENTS AND WAVES," filed Jun. 22, 2018, which is incorporated herein by reference in its entirety.

GOVERNMENT SPONSORSHIP

This invention was made with Government support under Grant Nos. N00014-15-1-2616, N00014-14-1-0476 and N00014-09-1-0676 awarded by the Office of Naval Research (ONR). The Government has certain rights in the invention.

FIELD OF INVENTION

The techniques described herein relate to the field of automatic determination of routes in dynamic and uncertain environments, and more particularly to stochastic techniques for determining routes that optimize one or more performance criteria.

BACKGROUND

Planning optimal routes for vehicles is important in many applications. For example, shipping routes can be optimized to reduce time and/or risk or optimized to reduce cost. Planning optimal routes can increase profits associated with a shipping business or ensure the safety of a vehicle.

SUMMARY

Some aspects of the present application relate to a method for use in automatically determining an optimized route for a vehicle. The method includes, using at least one computer hardware processor to perform obtaining a target state, a fixed initial position of the vehicle, and dynamic flow information; and determining an optimized route from the fixed initial position to the target state using the dynamic flow information Some aspects of the present application relate to at least one non-transitory computer-readable storage medium storing processor executable instructions that, when executed by at least one computer hardware processor, cause the at least one computer hardware processor to perform a method for use in automatically determining an optimized route for a vehicle. The method includes, using at least one computer hardware processor to perform obtaining a target state, a fixed initial position of the vehicle, and dynamic flow information; and determining an optimized route from the fixed initial position to the target state using the dynamic flow information Some aspects of the present application relate to a system that includes at least one computer hardware processor; and at least one non-transitory computer-readable storage medium storing processor executable instructions that, when executed by the at least one computer hardware processor, cause the at least one computer hardware processor to perform a method for use in automatically determining an optimized route for a vehicle. The method includes using at least one computer hardware processor to perform obtaining a target state, a fixed initial position of the vehicle, and dynamic flow information; and determining an optimized route from the fixed initial position to the target state using the dynamic flow information The foregoing is a non-limiting summary of the invention, which is defined by the attached claims.

BRIEF DESCRIPTION OF DRAWINGS

The present patent or patent application file contains at least one drawing executed in color. Copies of this patent or patent application publication with color drawings will be provided by the Office upon request and payment of the necessary fee.

Various aspects and embodiments of the disclosure provided herein are described below with reference to the following figures. It should be appreciated that the figures are not necessarily drawn to scale. Items appearing in multiple figures are indicated by the same or a similar reference number in all the figures in which they appear.

FIG. 1-2 is a block diagram of a computer system, according to some embodiments.

FIG. 1-3 is a flowchart of a method of determining optimized routes, according to some embodiments.

FIG. 2-1 is a plot of a maximum speed profile produced by wind, according to some embodiments.

FIG. 2-2 is a plot of an optimal tacking path for a sailboat, according to some embodiments.

FIG. 2-3A is a map of a time evolution of optimal trajectories for two gliders after five days, according to some embodiments FIG. 2-3B is a map of a time evolution of the optimal trajectories for two gliders after ten days, according to some embodiments FIG. 2-3C is a map of a time evolution of the optimal trajectories for two gliders after twenty days, according to some embodiments FIG. 2-3D is a map of a time evolution of the optimal trajectories for two gliders after twenty-five days, according to some embodiments FIG. 2-4A is a magnified view of the time evolution of the optimal trajectory for the first glider, according to some embodiments, and corresponds to the region in the lower dashed box of FIG. 2-3B.

FIG. 2-4B is a magnified view of the time evolution of the optimal trajectory for the second glider, according to some embodiments, and corresponds to the region in the upper dashed box of FIG. 2-3B.

FIG. 2-5A is a plot of minimum arrival-times for the first glider, according to some embodiments.

FIG. 2-5B is a plot of minimum arrival-times for the second glider, according to some embodiments.

FIG. 3-1 is a schematic of a setup for determining a stochastic time-optimal path, according to some embodiments.

FIG. 3-2A is a plot of the mean of a coefficient for a dynamically orthogonal decomposition of a velocity field, according to some embodiments.

FIG. 3-2B is a plot of the mode of a coefficient for a dynamically orthogonal decomposition of a velocity field, according to some embodiments.

FIG. 3-2C is a plot of the probability density function (PDF) of a coefficient for a dynamically orthogonal (DO) decomposition of a velocity field, according to some embodiments.

FIG. 3-3 is a cumulative histogram of relative error in arrival-time determined between the DO decomposition approach and a Monte Carlo (MC) approach, according to some embodiments.

FIG. 3-4A is a Frechet distance (normalized) between reachability fronts computed using the MC approach and the DO approach at time T=25, according to some embodiments.

FIG. 3-4B is a Frechet distance (normalized) between reachability fronts computed using the MC approach and the DO approach at time T=50, according to some embodiments.

FIG. 3-4C is a Frechet distance (normalized) between reachability fronts computed using the MC approach and the DO approach at time T=75, according to some embodiments.

FIG. 3-4D is a Frechet distance (normalized) between reachability fronts computed using the MC approach and the DO approach at time T=100, according to some embodiments.

FIG. 3-5A is a plot of the spatial distribution of reachability fronts at time t=0.05, according to some embodiments.

FIG. 3-5B is a plot of the spatial distribution of reachability fronts at time t=25, according to some embodiments.

FIG. 3-5C is a plot of the spatial distribution of reachability fronts at time t=50, according to some embodiments.

FIG. 3-5D is a plot of the spatial distribution of reachability fronts at time t=75, according to some embodiments.

FIG. 3-5E is a plot of the spatial distribution of reachability fronts at time t=100, according to some embodiments.

FIG. 3-5F is a plot of the spatial distribution of reachability fronts at time t=125, according to some embodiments.

FIG. 3-6 is a plot of stochastic time-optimal paths for three targets, according to some embodiments.

FIG. 3-7 includes plots showing the mean field, variance of the DO coefficients, the DO mode fields for five mode fields, and the marginal PDF of the corresponding DO coefficient of a stochastic double-gyre flow field at a beginning time, t=0 days, and an end time, t=13.5 days, according to some embodiments.

FIG. 3-8 includes plots showing the stochastic flow field for a first realization with a negative first coefficient and a second realization with a positive first coefficient at a beginning time, t=0 days, and an end time, t=13.5 days, according to some embodiments.

FIG. 3-9 includes plots showing stochastic reachability fronts over time, according to some embodiments.

FIG. 3-10A is a plot of the stochastic time-optimal paths colored with the velocity DO coefficient 1, according to some embodiments.

FIG. 3-10B is a plot of the stochastic time-optimal paths colored with the arrival time at the target, according to some embodiments.

FIG. 3-11A includes plots of the DO mean flow (row A) and the DO mean flow for mode 1 and mode 2 fields (row B), according to some embodiments.

FIG. 3-11B includes plots of the marginal PDFs of coefficients 1 and 2 (row C), according to some embodiments.

FIG. 3-11C includes plots of the variance of the first eight modes (row D), according to some embodiments.

FIG. 3-12 includes plots of two realization of the stochastic flow fields at different times, according to some embodiments.

FIG. 3-13 includes plots of stochastic reachability fronts overlaid on the velocity streamlines of mode 1 (column A) and mode 2 (column B).

FIG. 3-14 includes plots of the stochastic time-optimal paths colored by velocity coefficient 1 (column A) and coefficient 2 (column B) to target 2, target 5, and four other targets, according to some embodiments.

FIG. 3-15 includes plots of arrival time distributions at each of six targets, according to some embodiments.

FIG. 4-1 is a schematic of a minimum-risk time-optimal path planning setup, according to some embodiments.

FIG. 4-2A is a plot of the domain of flow strength for a stochastic simulated front crossing, according to some embodiments.

FIG. 4-2B is a plot of the PDF flow strength for a stochastic simulated front crossing, according to some embodiments.

FIG. 4-3A is a plot of stochastic reachability fronts at time T=2, according to some embodiments.

FIG. 4-3B is a plot of stochastic reachability fronts at time T=2.5, according to some embodiments.

FIG. 4-3C is a plot of stochastic reachability fronts at time T=3.5, according to some embodiments.

FIG. 4-3D is a plot of stochastic reachability fronts at time T=6, according to some embodiments.

FIG. 4-3E is a plot of stochastic reachability fronts at time T=9, according to some embodiments.

FIG. 4-3F is a plot of a time-optimal path distribution for a vehicle navigating in a stochastic steady front with uncertain flow strength, according to some embodiments.

FIG. 4-4 includes plots of cost matrices (row 1), risks associated with each path (row 2), and the risk-optimal paths (row 3) for risk-seeking behavior (column a), risk-neutral behavior (column b), and risk-averse behavior (column c), according to some embodiments.

FIG. 4-5A is a plot of risk-optimal waypoint objectives for a stochastic steady front crossing, according to some embodiments.

FIG. 4-5B is a plot of PDF error due to following a risk-optimal path for a stochastic steady front crossing, according to some embodiments.

FIG. 4-6A is a plot of the Frechet distance between the time-optimal path and the risk-optimal, risk-seeking path, according to some embodiments.

FIG. 4-6B is a plot of the Frechet distance between the time-optimal path and the risk-optimal, risk-neutral path, according to some embodiments.

FIG. 4-6C is a plot of the Frechet distance between the time-optimal path and the risk-optimal, risk-averse path, according to some embodiments.

FIG. 4-7A is a plot of risk-optimal heading objectives for a stochastic steady front crossing, according to some embodiments.

FIG. 4-7B is a plot of the PDF of errors due to following the risk-optimal heading objectives for a stochastic steady front crossing, according to some embodiments.

FIG. 4-8A is a plot of a realized risk-seeking path corresponding to a particular flow realization and is colored by the discrete Frechet distance between this path and the true-optimal path for the realized environmental flow, according to some embodiments.

FIG. 4-8B is a plot of a realized risk-neutral path corresponding to a particular flow realization and is colored by the discrete Frechet distance between this path and the true-optimal path for the realized environmental flow, according to some embodiments.

FIG. 4-8C is a plot of a realized risk-averse path corresponding to a particular flow realization and is colored by the discrete Frechet distance between this path and the true-optimal path for the realized environmental flow, according to some embodiments.

FIG. 4-9 includes plots of the mean (first row), standard deviation (second row), skewness (third row), perturbation from the DO mean using a first realization (fourth row), and perturbation from the DO mean using a second realization (fifth row) for a stochastic wind-driven double-gyre flow at times T=0 days (first column), T=6.75 days (second column), and T=13.5 days (third column), according to some embodiments.

FIG. 4-10 includes plots of cost matrices (row 1), risks associated with each path (row 2), and the risk-optimal paths (row 3) for risk-seeking behavior (column a), risk-neutral behavior (column b), and risk-averse behavior (column c), according to some embodiments.

FIG. 4-11A is a plot of risk-optimal waypoint objectives for a stochastic double gyre flow field, according to some embodiments.

FIG. 4-11B is a plot of PDF error due to following a risk-optimal path in a stochastic double gyre flow field, according to some embodiments.

FIG. 4-12A is a plot of the Frechet distance between the time-optimal path and the risk-optimal, risk-seeking path, according to some embodiments.

FIG. 4-12B is a plot of the Frechet distance between the time-optimal path and the risk-optimal, risk-neutral path, according to some embodiments.

FIG. 4-12C is a plot of the Frechet distance between the time-optimal path and the risk-optimal, risk-averse path, according to some embodiments.

FIG. 4-13A is a plot of risk-optimal heading objectives for a stochastic double gyre flow field, according to some embodiments.

FIG. 4-13B is a plot of the PDF of errors due to following the risk-optimal heading objectives for a stochastic double gyre flow field, according to some embodiments.

FIG. 4-14A is a plot of a realized risk-seeking path corresponding to a particular flow realization and is colored by the discrete Frechet distance between this path and the true-optimal path for the realized environmental flow, according to some embodiments.

FIG. 4-14B is a plot of a realized risk-neutral path corresponding to a particular flow realization and is colored by the discrete Frechet distance between this path and the true-optimal path for the realized environmental flow, according to some embodiments FIG. 4-14C is a plot of a realized risk-averse path corresponding to a particular flow realization and is colored by the discrete Frechet distance between this path and the true-optimal path for the realized environmental flow, according to some embodiments FIG. 4-15A includes plots of the mean (first row), mode 1 (second row), mode 2 (third row), and mode 3 (fourth row) for a stochastic flow exiting a strait at times T=0 minutes (first column), T=50 minutes (second column), and T=100 minutes (third column), according to some embodiments.

FIG. 4-15B includes plots of the marginal PDF for the coefficient of mode 1 (first row), the marginal PDF for the coefficient of mode 2 (second row), and the marginal PDF for the coefficient of mode 3 (third row) for a stochastic flow exiting a strait at times T=0 minutes (first column), T=50 minutes (second column), and T=100 minutes (third column), according to some embodiments.

FIG. 4-16 includes plots of the standard deviation (first row), the skewness (second row), the kurtosis (third row), a first representative realization (fourth row), and a second representative realization (fifth row) of a velocity field for a stochastic flow exiting a strait, according to some embodiments.

FIG. 4-17 includes plots of stochastic reachability fronts colored by DO velocity coefficient #1 at different times, according to some embodiments.

FIG. 4-18 includes plots of time-optimal path distributions colored by arrival time, according to some embodiments.

FIG. 4-19 includes plots of risk-optimal paths (for risk-seeking, risk-neutral, and risk-averse choices) with waypoint objectives in a stochastic flow exiting a strait for five different target locations (column 1) and corresponding PDF of errors due to following the risk-optimal paths (column 2), according to some embodiments.

FIG. 4-20 includes plots of risk-optimal heading objectives for risk-seeking, risk-neutral, and risk-averse choices in a stochastic flow exiting a strait for five different target locations (column 1) and corresponding PDF of errors due to following the risk-optimal heading objectives (column 2), according to some embodiments.

FIG. 4-21 includes plots of trajectories obtained by following risk-optimal headings (for risk-seeking (first column), risk-neutral (second column), and risk-averse (third column) choices) with waypoint objectives in a stochastic flow exiting a strait for five different target locations (rows a-e), according to some embodiments.

DETAILED DESCRIPTION

I. Introduction

Determining optimized paths has applications for exploratory, surveillance, and imaging missions using UABs and/or UAVs as well as in determining optimized shipping routes for container ships. In many application, water and/or air flows encountered by the vehicles may be comparable in magnitude to the nominal speeds of the vehicles.

The inventors have recognized and appreciated that rigorous and efficient techniques for determining optimized routes are needed. Any number of performance criteria may be optimized, such as travel time, energy consumed, or risk encountered.

The inventors have recognized and appreciated that a deductive forward computation of optimized trajectories of vehicles operating in dynamic and uncertain flows may be determined with a computational efficiency that is one or two orders of magnitude better than conventional techniques. In some embodiments, a time-optimized route to a target state is determined by starting with a fixed initial position and determining a forward reachable set of fronts using an unsteady Hamilton-Jacobi (HJ) equation.

The inventors have further recognized and appreciated combining decision theory with stochastic path-planning can result in a new partial differential equation-based scheme for risk optimal route planning in uncertain and dynamic flows. By combining a principled risk optimality criterion grounded in decision theory with stochastic dynamical orthogonal level-set equations, an efficient computational scheme to predict optimized paths from a distribution of stochastic optimized paths is determined.

The inventors have further recognized and appreciated that accounting for uncertainty in optimized route path planning results is important for many applications. To efficiently solve the partial differential equations involved, some embodiments use dynamically orthogonal reduced-order projections that result in several orders of magnitude in computational speed-up relative to Monte Carlo techniques.

Figure 1:
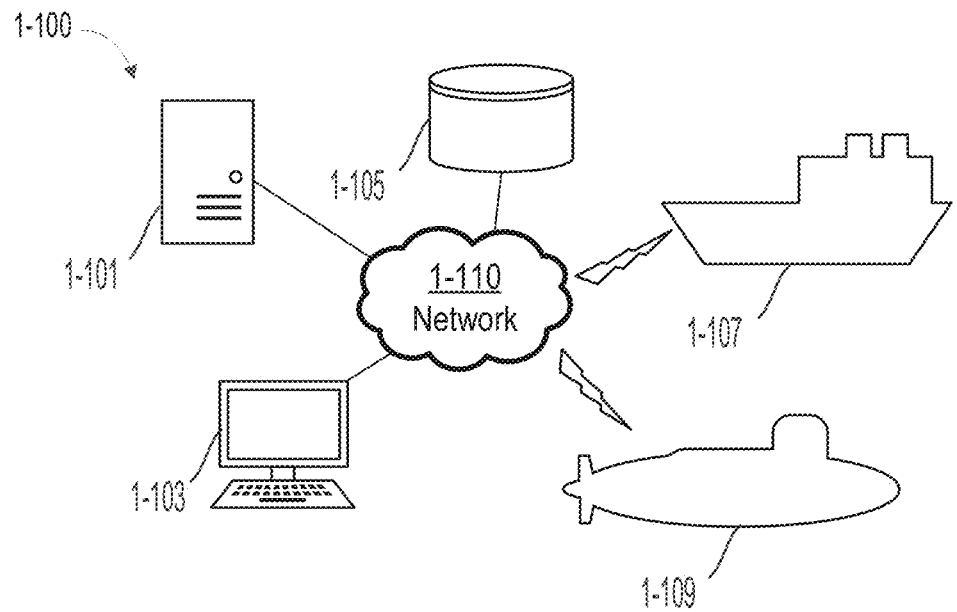
FIG. 1-1 is a block diagram of a route determination system, according to some embodiments.

FIG. 1 is a schematic diagram of a route determination system 1-100, according to some embodiments. The route determination system 1-100 includes a computer server 1-101, a computer 1-103, a data storage device 1-105, a first vehicle 1-107, and a second vehicle 1-109, which may be communicatively coupled together by a network 1-110. The network 1-110 comprises one or more networking devices for transmitting information from one point of the network 1-110 to another. The network 1-110 may include a local area network (LAN), a wide area network (WAN), and/or the internet. The network 1-110 may include connections, such as wired links, wireless communications links, and/or fiber optic cables. The network 1-110 may include wireless access points, switches, routers, gateways, and/or other networking equipment as well as any suitable wired and/or wireless communication medium or media for exchanging data between two or more computers, including the Internet. The wireless connections may be implemented using radio signals, optical communication signals, and/or satellite links. Computer server 1-101, computer 1-103, and data storage device 1-105 are illustrated as connected to network 1-110 with a wired connection (either electrical or optical). The first vehicle 1-107 and a second vehicle 1-109 are illustrated as being wirelessly connected to the network 1-110. However, embodiments are not so limited. For example, any of the components may be connected with a wired connection or a wireless connection.

As depicted, the first vehicle 1-107 is illustrated as a shipping vessel and a second vehicle 1-109 is illustrated as a submarine. In some embodiments, the vehicles may be other watercraft such as tankers, bulk carriers, container vessels, passenger vessels, autonomous underwater vehicles (AUVs), sailboats, underwater gliders, or yachts. In other embodiments, the vehicle need not be watercraft. For example, in some embodiments, the vehicles may include aircraft, such as airplanes, helicopters, drones, or unmanned aerial vehicles (UAVs). In some embodiments, the vehicles may be manned or unmanned. In some embodiments, the vehicles may be autonomous or manually controlled by a human operator.

The data storage device 1-105 may be one or more storage devices, such as hard drives, tape drives, optical drives, and other suitable types of devices. The data storage device 1-105 may be located in a single location or may be distributed in different locations. In some embodiments, the data storage device 1-105 may provide data and other information to the computer server 1-101, the computer 1-103, the first vehicle 1-107, or the second vehicle 1-109. For example, the data storage device 1-105 may contain information about the environment associated with one or more vehicles, such as dynamic flow information associated with the air or water. For example, the dynamic flow information may include one or more flow fields.

Figures 1, 2:
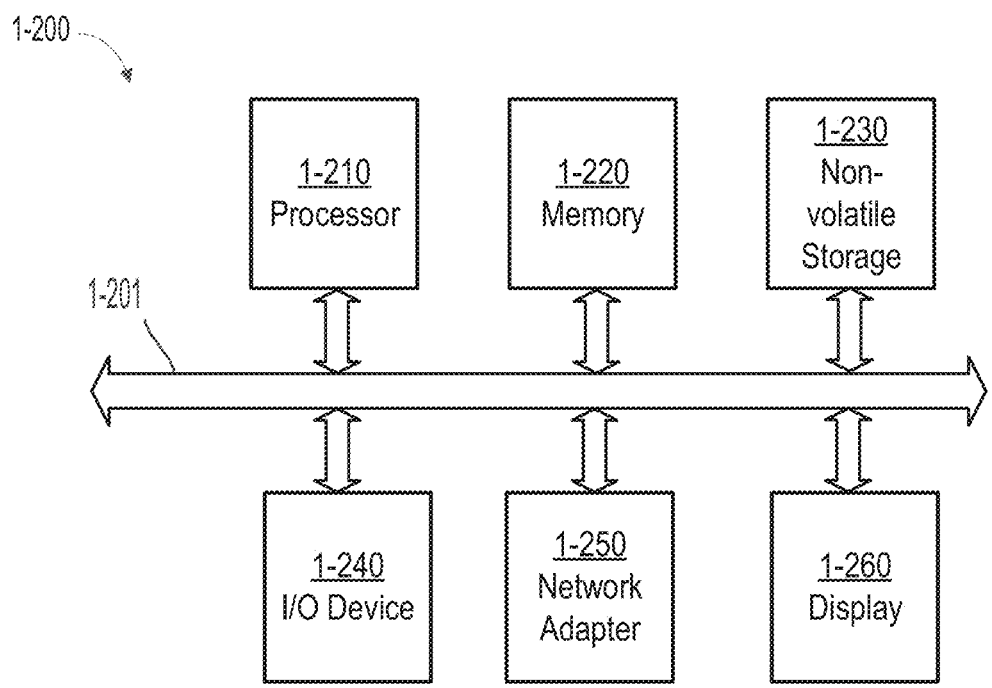

FIG. 1-2 is block diagram of a computing device 2-100 according to some embodiments. The computer server 1-101 or the computer 1-103 may have one or more of the components described in connection with the computing device 2-100. Additionally, the first vehicle 1-107 and/or the second vehicle 1-109 may include a computer with one or more of the components described in connection with the computing device 2-100.

Computing device 2-100 may include at least one computer hardware processor 1-210, a memory 1-220, a non-volatile storage 1-230, an input/output (I/O) device 1-240, a network adapter 1-250, and/or a display 1-260. Computing device 1-200 may be, for example, a desktop or laptop personal computer, a personal digital assistant (PDA), a smart mobile phone, a tablet computer, a computer server, or any other suitable computing device.

Network adapter 1-250 may be any suitable hardware and/or software to enable the computing device 1-200 to communicate wired and/or wirelessly with any other suitable computing device over any suitable computing network, such as network 1-100. The network adapter 1-250 may be used to obtain information from the data storage device 1-105. For example, dynamic flow information and flow uncertainty information may be obtained from the data storage device 1-105.

The display 1-260 may be any suitable display for displaying to a user a visual representation of the optimized route determination results. For example, the display 1-260 may be a computer monitor, a LCD display, or a touchscreen display. The results displayed may include a map, a list of headings, and/or instructions for following the determined route.

The non-volatile storage 1-230 may be adapted to store data to be processed and/or instructions to be executed by processor 602. For example, the non-volatile storage 1-230 may include at least one non-transitory computer-readable storage medium storing processor executable instructions that, when executed by at least one computer hardware processor, such as the processor 1-210, cause the at least one computer hardware processor to perform a method for use in automatically determining an optimized route for a vehicle.

The memory 1-220 may be a volatile memory device such as random-access memory (RAM) that may be controlled by the processor 1-210.

Computer hardware processor 1-210 enables processing of data and execution of instructions. The processor 1-210 may cause computer executable instructions stored in the non-volatile storage 1-230 to be loaded into the memory 1-220. The processor 1-210 may then the instructions to perform a method for use in automatically determining an optimized route for a vehicle.

The data and instructions stored on the non-volatile storage 1-230 may comprise computer-executable instructions implementing techniques which operate according to the principles described herein.

While not illustrated in FIG. 1-2, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Figures 1, 2, 3:
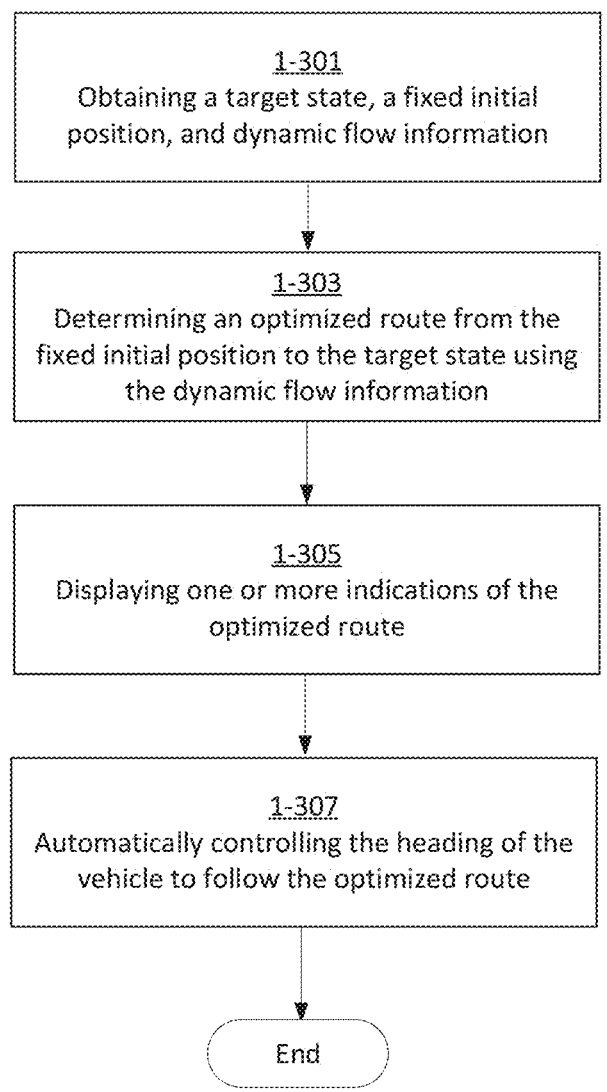

FIG. 1-3 is a flowchart of a method 1-300 for determining an optimized route for a vehicle, according to some embodiments. The method 1-300 may be implemented using all or a portion of the route determination system 1-100. For example, a computer on the first vehicle 1-107 or the second vehicle 1-109 may perform all of the actions in the method 1-300. Alternatively, the server 1-101 and/or the computer 1-103 may perform a portion of the method 1-300, while other actions of the method 1-300 may be executed by the first vehicle 1-107 or the second vehicle 1-109. For example, the server 1-101 may determine an optimized route for the first vehicle 1-109 using flow information from data storage device 1-105 and then send information detailing the optimized route to the first vehicle 1-109 where a computer on the first vehicle 1-109 may control the first vehicle 1-109 to implement the optimized route.

At act 1-301, the method includes obtaining a target state, a fixed initial position, and dynamic flow information. In some embodiments, one or more computers performing the method 1-300 may perform the act of obtaining 1-301. For example, any of the computers or servers described above may perform the act of obtaining. In some embodiments, the target state includes a desired destination for the vehicle. In some embodiments, the fixed initial position may include the current position of the vehicle. For example, radar or GPS may be used to determine the initial position of the vehicle. The dynamic flow information may include, for example, a flow field. The dynamic flow information may be obtained from a third party, such as a weather service. The dynamic flow information may also include uncertainty information pertaining to the certainty that the flow field is accurate. The dynamic flow information may, for example, be stored on the data storage device 1-105 and obtained via the network 1-110.

At act 1-303, the method 1-300 includes determining an optimized route from the fixed initial position to the target state using the dynamic flow information. In some embodiments, the act of determining 1-303 may include any number of actions described in detail in Section II, Section III, and/or Section IV, below.

At act 1-305, the method 1-300 includes displaying one or more indication of the optimized route. This act 1-305 may not be performed in every embodiment. In some embodiments, the indications of the optimized route may include a list of speeds and/or heading to be implemented by a human operator of the vehicle. In other embodiments, the indications may include a map of the vehicle and its surrounding.

At act 1-307, the method 1-300 includes automatically controlling the heading of the vehicle to follow the optimized route. This act 1-307 may not be performed in every embodiment. In some embodiments, the act 1-307 is performed for an autonomous, unmanned vehicle. In other embodiments, the act 1-307 may be performed even when there is a human operator of the vehicle if, for example, the human operator is operating the vehicle in an autopilot mode.

Some aspects of the technology described herein may be understood further based on the disclosure and illustrative non-limiting embodiments provided below in Sections II, III, and IV. Each of Section II, III, and IV are self-contained such that equations referenced in each section only refer to the equation in the respective section. Similarly, sub-sections and appendices referenced in each section refer only to the sub-sections and appendices associated with the respective section. Similarly, references cited in each section refer only to the references associated with the respective section.

II. Minimum-Time Path Planning In Strong Dynamic Flows Using A Forward Reachability Equation 1. Introduction. This paper provides a theoretical synthesis for time-optimal control of anisotropic robotic units operating under the influence of strong and dynamic flow-fields. The deduction is based on a formulation of forward-reachability in terms of the viscosity solution to an unsteady Hamilton-Jacobi (HJ) equation. This problem is of great interest in several areas of engineering. For example, it is applicable to Unmanned Aerial Vehicles (UAVs), for exploratory, surveillance or imaging missions, transportation and delivery, as well as environmental and climate research. It is also pertinent to Autonomous Underwater Vehicles (AUVs) such as ocean gliders and surface crafts, for diverse missions including ocean mapping and sampling, naval reconnaissance and harbor protection. Flows encountered by these vehicles can often be comparable in magnitude to their nominal speeds (speed relative to the flows). For both air and sea vehicles, it is imperative to develop rigorous and efficient techniques for optimal routing, minimizing either the energy consumed, the travel time, or other performance criteria [24]. Additionally, certain "anisotropic vehicles" are characterized by direction-dependent motion constraints, which must be accounted for. In this paper, we focus on the deductive forward computation of minimum-time trajectories of anisotropic vehicles operating in complex time and space dependent flows.

Minimum-time problems have been well studied in the control theory and operations research literature. The first results are likely due to Galton who coined and employed isochrones for time-optimal ship routing problems [18, 39]. Since then, the most common approach to solve such problems uses the Dynamic Programming Principle (DPP) to derive an unsteady Hamilton-Jacobi-Bellman (HJB) equation for the globally optimal 'time-to-go', which is the minimum time required to drive the system to a fixed target state [2, 10]. The viscosity solution [13] of the governing HJB equation provides an optimal feedback control law and the resulting optimal system trajectory. Several methods have been proposed to solve this HJB equation. One of them is the extremal field approach [41, 42], in which a family of initial value Euler-Lagrange equations are solved to determine extremal (locally-optimal) trajectories. Alternatively, one can compute the time-evolving 'backward-reachable' set (also known as capture basin), the set of points from which there exist controls that drive the system to the target state in a specific time [3, 16].

The computation of backward-reachable sets is a fundamental tool in the safety verification of embedded and hybrid control systems. It enables one to ascertain the set of states from which a system may be driven (perhaps inadvertently) to potentially dangerous configurations. For instance, in air traffic control, an unsafe configuration occurs when the distance between any two aircrafts is lesser than a required minimum [37, 35]. Similar examples occur in oceanic applications, wherein the operating agents are AUVs and/or ships [14, 15]. As a result, the design of efficient optimal control methods to compute the backward-reachable set is receiving much attention. Specifically, the DPP can be used to arrive at an unsteady HJ equation that governs the evolution of the backward-reachable set, as explored in [35, 33] and references therein. It is important to note that this HJ equation generally does not hold in a classical sense, i.e., the value function is not differentiable everywhere. In fact, the optimal time-to-go may not even be continuous everywhere. The formal link between 45 backward-reachability and the solution to the HJ equation is established through the framework of viscosity solutions, which may be computed numerically using level-set methods [38] for low-dimensional problems and the more recent semi-Lagrangian schemes [8] for higher dimensional ones. The unsteady HJ equation offers an expedient and robust characterization of the backward-reachable set, even for systems with complex non-autonomous dynamics [6] and state constraints (i.e., requirement that system trajectories remain inside a given set at all times) [7]. We refer to [34, 2.3] and [33] for detailed discussions of other algorithms for computing the backward-reachable sets in a variety of applications and dynamics, both discrete and continuous.

The optimal time-to-go is equivalently characterized by a static HJ equation, when the system is locally controllable [16, 3, 50, 5]. In our application, the local controllability property holds only when the speed of the external flow is lower than that of the operating vehicle. Moreover, in this case, the optimal time-to-go is a uniformly continuous function [3]. Similarly, when the external flow is steady, the time-derivative term of the unsteady HJ equation drops out and we arrive at a static HJ equation for the optimal time-to-go. In both of these cases, Fast Marching Methods [44], Ordered Upwind Methods (OUMs) [45, 43] or Fast Sweeping Methods [23] can be then used (see also [50]). For other references to path-planning in dynamic flows (not necessarily optimal), the reader is referred to [29, 42].

A complementary view-point to backward reachability and control is the concept of 'forward reachability'. The forward reachable set is the set of all states to which a system can be driven at a given time, starting from a fixed initial state (recall that in the definition of backward reachability, it is the target state that is fixed). While not extensively studied—as it leads to an open-loop control law—, forward reachability has potential advantages in several applications. Examples include predictive path-planning and safe guidance of vehicles operating in dynamic fluid environments using data-assimilative forecasts of the environmental fields. In such examples, which are a main emphasis of this paper, it is critical to accurately forecast the regions that can be explored or reached by vehicles in a given time, prior to deployment. In ocean applications, as gliders surface only once every few hours to communicate, their continuous feedback control is not strictly possible. Moreover, predictions of currents (which directly affect AUVs) are periodically updated by assimilating sensor observations and therefore, optimal AUV trajectories need to be frequently recomputed to account for such updates. Similar comments can be made for the planning of specific air vehicles (e.g. drones) based on data-assimilative wind forecasts. Finally, an open-loop control that is quick to recompute serves equally well as a feedback control. Due to all of the above, we focus on forward reachability in this paper. cations, as gliders surface only once every few hours to communicate, their continuous feedback control is not strictly possible. Moreover, predictions of currents (which directly affect AUVs) are periodically updated by assimilating sensor observations and therefore, optimal AUV trajectories need to be frequently recomputed to account for such updates. Similar comments can be made for the planning of specific air vehicles (e.g. drones) based on data-assimilative wind forecasts. Finally, an open-loop control that is quick to recompute serves equally well as a feedback control. Due to all of the above, we focus on forward reachability in this paper.

We determine the time-optimal control by computing the optimal 'arrival time', which is the minimum time required by a system to reach a target state, starting from a fixed initial state. Using various concepts rooted in the theory of non-smooth calculus, we demonstrate that the forward reachable set of anisotropic vehicles is governed by the viscosity solution of an unsteady HJ equation, even in cases when the arrival time is discontinuous. This result provides a foundation for extending the use of numerical tools such as the level-set method to solve for the forward reachable set and the optimal trajectories. For completeness, we also show that when the system is locally controllable, the arrival time is continuous and satisfies a static HJ equation. All the above results are the main contributions of this paper, providing a synthesis for forward minimum-time path-planning in dynamic flows. An exposition of the corresponding methodology for strictly isotropic vehicles and its application to a variety of ocean-specific path-planning scenarios is provided in [31, 30].

The paper is structured as follows. § 2 formally defines the minimum arrival time problem and the notation used. The main theoretical results and discussions are presented in 3. In 4, these results are used to illustrate properties of minimum-time trajectories and arrival time fields for a sailboat operating in a uniform wind field, and autonomous gliders in the Sulu Archipelago, where the flow-field estimates are obtained from a realistic data-assimilative ocean modeling system. Conclusions are listed in § 5.

2. Problem Statement. Let $\Omega \subset R^n$ be an open set and U be the set of unit vectors $\hat{u}$ in $R^n$. Let $F(\hat{u}, t):U\times[0,\infty)\to R^+$ be a given bounded time-dependent function. Consider a vehicle (P) moving in Q under the influence of a dynamic (non-homogeneous, unsteady) flow-field, $V(x,t):\Omega\times[0,\infty)\to R^n$. We wish to predict a control for P that minimizes its travel time between given start and end points, denoted by $y_s$ and $y_f$ respectively. Let a general continuous trajectory from $y_s$ to $y_f$ be denoted as $X_P(t;y_s)$. Any vehicle's motion, being the sum of nominal motion due to steering and advection due to the flow-field, is governed by the kinematic relation $$\frac{dX_P}{dt} = U(X_P(t; y_s), t) = F_P(\hat{h}(t), t)\hat{h}(t) + V(X_P(t; y_s), t), \quad (2.1)$$

where $F_P(\hat{h}(t),t)$ is the direction-dependent speed of the vehicle relative to the flow, satisfying $0 \leq F_P(\hat{h}(t),t) \leq F(\hat{h}(t),t)$; $\hat{h}(t)$ is the unit vector in any vehicle's heading (steering) direction at time t; and $U(X_P(t;y_s),t)$ is the total vehicle velocity. Let $\tilde{T}(y):\Omega\to R$ denote the 'first arrival time' function for a given $F_P$, $\hat{h}(t)$; i.e., $\tilde{T}(y)$ is the first time the vehicle reaches any point y, starting from $y_s$ for the given $F_P$. Clearly, $\tilde{T}(y_s)=0$. The limiting conditions on $X_P(t; y_s)$ are $$X_P(0;y_s)=y_s, X_P(\tilde{T}(y_f);y_s)=y_f \quad (2.2)$$

We aim to predict the optimal controls for $\hat{h}(t)$ and $F_P(\hat{h}(t),t)$ that minimize $\tilde{T}(y_f)$ subject to constraints (2.1) and (2.2). Let the optimal travel time to reach $y_f$ be $T^*(y_f)$ and the corresponding optimal trajectory be $X^*_P(t;y_s)$. We assume that $V(x,t)$ is exactly known. In realistic ocean applications, forecast flow-fields are always associated with some levels of uncertainty [26, 27]. $V(x,t)$ can correspond to, for example, the mode or mean of the predicted flow-field, up to the predictability limit. We consider cases where the distance traveled by the vehicle is much larger than its dimensions and thereby assume the interaction between the vehicle and the flow-field to be purely kinematic. The notation |●| in this paper denotes the L-2 norm of ●. We assume that $F_P(\hat{h}(t),t)$ and $\hat{h}(t)$ are Lipschitz continuous and that $V(x,t)$ is bounded and Lipschitz continuous in both x and t, i.e. $\exists C$, $C_V>0$ such that $$\max_{x\in\Omega, t\geq 0}\{|V(x,t)|\} \leq C, \text{ and} \tag{2.3}$$

$$|V(x_1, t_1) - V(x_2, t_2)| \leq C_V(|x_1 - x_2| + |t_1 - t_2|), \tag{2.4}$$
$$x_1, x_2 \in \Omega, t_1, t_2 \geq 0$$

The forward reachable set $R(t;y_s)$ of points at time $t \geq 0$ is defined as the set of all points $y \in \Omega$ such that there exists a trajectory $\tilde{X}_P(\tau; y_s)$ satisfying (2.1), with $\tilde{X}_P(0; y_s) = y_s$ and $\tilde{X}_P(t; y_s) = y$. The boundary of this set is called the reachability front and is denoted by $\partial R(t; y_s)$. Recall that the subset of trajectories $\tilde{X}_P(t; y_s)$ that reach $y_f$ was denoted by $X_P(t; y_s)$. Just as $\tilde{X}_P(t; y_s)$ represents any feasible trajectory starting at $y_s$, $\tilde{T}(y)$ denotes the first arrival time (not optimal) at any point $y$. We refer to Appendix A for relevant definitions and theorems that will be used in the following section, which synthesizes the main theoretical results. Next, we also omit the time dependency on several quantities where no confusion is expected.

3. Main Theoretical Results. Let $\phi$ be the viscosity solution of the HJ equation:

$$\frac{\partial \phi}{\partial t} + \max_{\hat{h}}\{F(\hat{h}, t)\hat{h} \cdot \nabla \phi\} + V(x, t) \cdot \nabla \phi = 0 \text{ in } \Omega \times (0, \infty), \tag{3.1}$$

with initial conditions $$\phi(x, 0) = v(x), \tag{3.2}$$

where $v: \Omega \to \mathbb{R}$ is Lipschitz continuous, and the boundary conditions on $\phi$ are open (see Appendix B). In the following lemma, we prove a monotonicity result related to $\phi$. We show that the generalized gradient of $\phi$ is non-positive on trajectories $\tilde{X}_P(t; y_s)$, along the direction $$\left(\frac{d\hat{X}_P(t; y_s)}{dt}, 1\right) \text{ for } t > 0.$$

This lemma is then used in a theorem that establishes the relationship between forward reachable sets and the viscosity solution of an unsteady HJ equation, which can also be viewed as a modified level-set equation. For the definitions, lemmas and theorems used in the proofs here, we refer to Appendix A.

LEMMA 1. Let $\Omega \subseteq \mathbb{R}^n$ be open, $F(\hat{h}, t): U \times [0, \infty) \to \mathbb{R}^+$ and let $V(x, t)$ satisfy assumptions (2.3)-(2.4). Let $\phi$ be the viscosity solution to (3.1). Let the trajectory $\tilde{X}_P(t; y_s)$ satisfy (2.1) with initial conditions $\tilde{X}_P(0; y_s) = y_s$ and open boundary conditions. Then, $$\phi^g\left(\tilde{X}_P(t; y_s), t; \left(\frac{d\tilde{X}_P(t; y_s)}{dt}, 1\right)\right) \leq 0 \text{ for all } t > 0, \tag{3.3}$$

where $\phi^g$ denotes the generalized gradient.

Proof. The function $H(x, t, \nabla\phi) = \max_{\hat{h}}\{F(\hat{h}, t)\hat{h} \cdot \nabla\phi\} + V(x, t) \cdot \nabla\phi$ is Lipschitz in all three arguments and convex in the third argument, by Claim 1. The viscosity solution to (3.1) is unique, by Remark 3 and locally Lipschitz, by Lemma 6. Let us fix $t > 0$ and let $(q, p) \in \partial\phi(\tilde{X}_P(t; y_s), t)$. We first derive a useful inequality. From Theorem 4, $$p + \max_{\hat{h}}\{F(\hat{h}, t)\hat{h} \cdot q\} + V(\tilde{X}_P(t; y_s), t) \cdot q \leq 0. \tag{3.4}$$

Consequently, $$p\left|\frac{d\tilde{X}_P(t; y_s)}{dt} \cdot q\right| = p + F_P(\hat{h}(t), t)\hat{h}(t) \cdot q \mid V(\tilde{X}_P(t; y_s), t) \cdot q \tag{3.5}$$

$$\leq p + F(\hat{h}(t), t)\hat{h}(t) \cdot q + V(\tilde{X}_P(t; y_s), t) \cdot q \leq 0,$$

where the first inequality follows from $F_P(\hat{h}(t), t) \leq F(\hat{h}(t), t)$. Since (3.5) must hold for any $(q, p) \in \partial\phi(\tilde{X}_P(t; y_s), t)$, we obtain $$\max_{(q,p) \in \partial\phi(\tilde{X}_P(t; y_s), t)}\left\{p + \frac{d\tilde{X}_P(t; y_s)}{dt} \cdot q\right\} \leq 0. \tag{3.6}$$

From Corollary 1, $$\phi^g\left(\tilde{X}_P(t; y_s), t; \left(\frac{d\tilde{X}_P(t; y_s)}{dt}, 1\right)\right) = \tag{3.7}$$

$$\limsup_{\substack{x' \to \tilde{X}_P(t; y_s) \\ t' \to t}}\left\{\nabla\phi(x', t') \cdot \frac{d\tilde{X}_P(t; y_s)}{dt} + \frac{\partial\phi}{\partial t}(x', t') : (x', t') \notin \Omega_{nd}\right\},$$

Where $\Omega_{nd} \subset \Omega \times (0, \infty)$ is the set of points at which $\phi$ is not differentiable. We now show by contradiction that the RHS of (3.7) is non-positive.

Since $\phi$ is locally Lipschitz, there exist $\epsilon_x, \epsilon_t > 0$ such that for all $(x', t') \notin \Omega_{nd}$ and $|x' - \tilde{X}_P(t; y_s)| < \epsilon_x$, $|t' - t| < \epsilon_t$, the derivatives $\nabla\phi(x', t')$ and $\partial\phi/\partial t(x', t')$ are bounded in magnitude. Let us assume that the RHS of (3.7) equals $k > 0$. Then, there exists a sequence $\{(x'_i, t'_i) \notin \Omega_{nd}\}_{i \geq 1} \to (\tilde{X}_P(t; y_s), t)$ such that $$\frac{\partial\phi}{\partial t}(x'_i, t'_i) + \nabla\phi(x'_i, t'_i) \cdot \frac{d\tilde{X}_P(t; y_s)}{dt} > \frac{k}{2} \text{ for all } i \geq 1. \tag{3.8}$$

By the Bolzano-Weierstrass theorem, the sequence $\{(x'_i, t'_i)\}_{i \geq 1}$ admits a subsequence $\{(x''_i, t''_i)\}_{i \geq 1}$ such that the sequence $\{\nabla\phi(x''_i, t''_i), \partial\phi/\partial t(x''_i, t''_i)\}_{i \geq 1}$ converges. Let this limit be $(q'', p'')$. From $$\frac{\partial\phi}{\partial t}(x''_i, t''_i) + \nabla\phi(x''_i, t''_i) \cdot \frac{d\tilde{X}_P(t; y_s)}{dt} > \frac{k}{2} \text{ for all } i \geq 1. \tag{3.8}$$

Taking limits as $i \to \infty$ yields $$p'' + q'' \cdot \frac{d\tilde{X}_P(t; y_s)}{dt} \geq \frac{k}{2} > 0. \tag{3.9}$$

This contradicts (3.6) since $(q'', p'') \in \partial\phi(\tilde{X}_P(t; y_s), t)$, by construction. Therefore from (3.7), $$\phi^g\left(\tilde{X}_P(t;y_s), t; \left(\frac{d\tilde{X}_P(t, y_s)}{dt}, 1\right)\right) \le 0.$$

Since the choice of t>0 was arbitrary, we obtain (3.3).

THEOREM 1. Let $\Omega \subseteq \mathbb{R}^n$ be an open set and U be the set of unit vectors in $\mathbb{R}^n$. Let $V(x,t):\Omega \times [0,\infty) \to \mathbb{R}^n$ satisfy (2.3)-(2.4), and $F(\hat{h},t):U \times [0, \infty) \to \mathbb{R}^+$ be given. Let $T^o(y): \Omega \to \mathbb{R}$ denote the optimal first arrival time at y. Let the trajectory $\tilde{X}_P(t;y_s)$ satisfy (2.1) with initial conditions $\tilde{X}_P(0; y_s)=y_s$. Let $\phi^o(x,t)$ be the viscosity solution to the Hamilton-Jacobi equation $$\frac{\partial \phi^o}{\partial t} + \max_{\hat{h}}\{F(\hat{h},t)\hat{h}\cdot\nabla\phi^o\} + V(x,t)\cdot\nabla\phi^o = 0 \text{ in } \Omega\times(0,\infty), \quad (3.10)$$

with $$\phi^o(x,0)=|x-y_s|. \quad (3.11)$$

Then,
1. $\phi^o(\tilde{X}_P(t,y_s),t) \le 0$ for all $t \ge 0$.
2. The optimal arrival time $T^o$ satisfies $$T^o(y) = \inf_{t \ge 0}\{t: \phi^o(y,t) = 0\}, \quad (3.12)$$

and the optimal trajectories $X_P^o(t;y_s)$ correspond to characteristics of (3.10).

3. If $\min_{\hat{h}}\{F(\hat{h},t)\} > \max_{x \in \Omega}|V(x,t)|$, then for any $y \in \Omega$, $T^o(y)$ is the viscosity solution of the static HJ (modified Eikonal) equation $$\max_{\hat{h}}\{F(\hat{h}, T^o(y))\hat{h}\cdot\nabla T^o(y)\} + V(y, T^o(y))\cdot\nabla T^o(y) - 1 = 0. \quad S(3.13)$$

Proof. (1). Let $\phi^o(t):=\phi^o(\tilde{X}_P(t;y_s),t)$ for $t \ge 0$. From Remark 3, the viscosity solution to (3.10) is unique and by Lemma 6, it is locally Lipschitz. We now argue that $\phi_P^o$ is locally Lipschitz. Observe that $\phi_P^o(t)=\phi^o(g_P(t))$ where $g_P(t):=(\tilde{X}_P(t;y_s),t)$. Since $g_P(t)$ is continuously differentiable in $(0, \infty)$ with $$\frac{dg_P(t)}{dt} = \left(\frac{d\hat{X}_P}{dt}, 1\right)$$

and $\phi^o$ is locally Lipschitz, $\phi_P^o$ is also locally Lipschitz in $(0, \infty)$ by the chain rule stated in Theorem 6.

Let $t_1 > 0$ be fixed. Since $\phi_P^o$ is locally Lipschitz, there exists an open interval around $t_1$ in which $\phi_P^o$ is Lipschitz. Thus, for any $t_2 > t_1$ in this interval, Lebourg's Mean Value Theorem (Theorem 5) implies that there exist $t_3 \in (t_1, t_2)$ and $s \in \partial \phi_P^o(t_3)$ such that $$\phi_P^o(t_2) - \phi_P^o(t_1) = s = (t_2 - t_1). \quad (3.14)$$

Using the chain rule of Theorem 6 again (* denotes the adjoint), $$\partial \phi_P^o(t_3) \subseteq (g_P'(t_3))^* \partial \phi^o(g_P(t_3)) = \left\{p + q \cdot \frac{d\tilde{X}_P(t_3; y_s)}{dt} : (q, p) \in \partial\phi^o(\tilde{X}_P(t_3; y_s), t_3)\right\}. \quad (3.15)$$

Hence, for any $s \in \partial\phi_P^o(t_3)$, there exists $(q,p) \in \phi^o(\tilde{X}_P(t_3;y_s), t_3)$ such that $$s = p + q \cdot \frac{d\tilde{X}_P(t_3; y_s)}{dt}. \quad (3.16)$$

From (3.6), any $(q,p) \in \partial\phi^o(\tilde{X}_P(t_3;y_s),t_3)$ satisfies $$p + q \cdot \frac{d\tilde{X}_P(t_3; y_s)}{dt} \le 0,$$

implying that for any $s \in \partial\phi_P^o(t_3)$, $s \le 0$. Using this result in (3.14) yields $\phi_P^o(t_2) \le \phi_P^o(t_1)$ for all $t_1, t_2$. Since $\phi_P^o$ is locally Lipschitz in $(0, \infty)$, we conclude that $\phi_P^o(t)$ is non-increasing on $(0, \infty)$. Moreover, since $\phi_P^o$ is continuous on $[0, \infty)$, with $\phi_P^o(0)=0$ (from (3.11)) and non-increasing in $(0, \infty)$, we have $\phi_P^o(t)=\phi^o(\tilde{X}_p(t; y_s),t) \le 0$ for all $t \ge 0$.

(2). It was shown in part (1) that $\phi^o(\tilde{X}_p(t;y_s),t) \le 0$ for all $t \ge 0$, for any trajectory $\tilde{X}_P(t;y_s)$ that satisfies (2.1) and the initial conditions $\tilde{X}_P(0;y_s)=y_s$. Therefore, for a trajectory $X_P(t; y_s)$ that reaches a given end point $y \in \Omega$ at time $\tilde{T}(y)$ (not necessarily optimal), $$\phi^o(y,\tilde{T}(y))=\phi^o(\tilde{X}_P(\tilde{T}(y);y_s),\tilde{T}(y)) \le 0. \quad (3.17)$$

Since this inequality holds for any arbitrary arrival time $\tilde{T}(y)$, it will also hold for the optimal arrival time $T^o(y)$, implying $$\phi^o(y,T^o(y)) \le 0 \text{ for all } y \in \Omega \quad (3.18)$$

For $y=y_s$, (3.12) holds trivially. For any $y \ne y_s$, $\phi^o(y, 0) > 0$ by (3.11). The continuity of $\phi^o$ and (3.18) together then yield $$T^o(y) \ge \inf_{t \ge 0}\{t: \phi^o(y, t) = 0\}. \quad (3.19)$$

Finally, any point on the zero level-set of $\phi^o$ belongs to a characteristics of (3.10) emanating from $y_s$, since $y_s$ is the only point in $\Omega$ where $\phi^o$ is initially zero. Therefore, when the zero level-set reaches y for the first time, it implies the existence of a trajectory $X_P^o(t;y_s)$ with $X_P^o(0;y_s)=y_s$ that satisfies (2.1). For this trajectory, (3.19) holds with an equality, thereby establishing (3.12). Physically, this means that the fastest arrival time at any end point $y \in \Omega$ occurs when the zero level-set of $\phi^o$ reaches y for the first time, and equivalently that the reachability front (boundary of the forward reachable set) coincides with the zero level-set of $\phi^o$ at time t.

(3). Under the assumption $\min_{\hat{h}}\{F(\hat{h},t)\} > \sup_{x \in \Omega}\{|V(x,t)|\}$, the start point $y_s$ belongs to the interior of the forward reachable set $R(t;y_s)$ for all $t > 0$, i.e. for any $t > 0$, there exists $\epsilon_t > 0$ such that all points x' satisfying $|y_s - x'| < \epsilon_t$ are members of $R(t;y_s)$. This is equivalent to the 'Small Time Local Controllability' condition discussed in [3] as a result of which, $T^o$ is continuous in $\Omega$. See [3] for a formal proof of this statement. Let us fix $y \in \Omega$. By definition, $T^o(y)$ satisfies $$T^o(y) = \inf\{T^o(\tilde{y}) + h\}, \qquad (3.20)$$

where $\tilde{y} \in \Omega$ is a point such that there exists a trajectory $\tilde{X}_P(t;y_s)$ satisfying (2.1) and the limiting conditions $$\tilde{X}_P(T^o(\tilde{y});y_s) = \tilde{y}, \tilde{X}_P(T^o(\tilde{y})+h;y_s) = y. \qquad (3.21)$$

In order to show that T is a viscosity solution to (3.13), we show that it is both a viscosity subsolution and a supersolution to (3.13).

Viscosity Subsolution. From Definition 4 and Remark 1, $T^o \in C(\Omega)$ is a viscosity subsolution to (3.13) if at every $y \in \Omega$ and for every $C^1$ function $\tau_s:\Omega \to \mathbb{R}$ such that $\tau_s(y) = T^o(y)$ and $\tau_s - T^o$ has a local minima at y, $$\max_{\hat{h}}\{F(\hat{h}, T^o(y))\hat{h} \cdot \nabla \tau_s(y)\} + V(y, T^o(y)) \cdot \nabla \tau_s(y) - 1 \leq 0. \qquad (3.22)$$

Since $\tau_s \geq T^o$ in a neighborhood of y, we obtain for $h>0$ small enough, $$\tau_s(y) - t_s(\tilde{y}) \leq T^o(y) - T^o(\tilde{y}).$$

Moreover, for this choice of h and the resulting $\tilde{y}$, (3.20) implies $$T^o(y) \leq T^o(\tilde{y}) + h.$$

Combining the above two inequalities yields $$\tau_s(y) - \tau_s(\tilde{y}) \leq T^o(y) - T^o(\tilde{y}) \leq h. \qquad (3.23)$$

Since $\tau_s$ is differentiable at y, Taylor's theorem may be used to expand $\tau_s(\tilde{y})$ near y.

$$\tau_s(\tilde{y}) = \tau_s(y) + \nabla \tau_s(y) \cdot (\tilde{y} - y) + o(|\tilde{y} - y|) \qquad (3.24)$$

$$= \tau_s(y) - \int_{T^o(\tilde{y})}^{T^o(y)+h} \nabla \tau_s(y) \cdot \frac{d\tilde{X}_P}{dt} dt + o(|\tilde{y} - y|)$$

Inserting (3.24) in (3.23) and dividing by h, $$\frac{1}{h}\int_{T^o(\tilde{y})}^{T^o(\tilde{y})+h} \nabla \tau_s(y) \cdot \frac{d\tilde{X}_P}{dt} dt + \frac{o(|\tilde{y} - y|)}{h} \leq 1.$$

As $h \downarrow 0$, and after noting that the second term on the left vanishes under this limit, we obtain $$\nabla \tau_s(y) + \frac{d\tilde{X}_P}{dt}(T^o(y); y_s) \leq 1. \qquad (3.25)$$

Since (3.25) holds for any valid choice of $$\frac{d\tilde{X}_P}{dt},$$

we may choose $$\frac{d\tilde{X}_P}{dt}(T^o(y); y_s) = F(\hat{h}_s, T^o(y))\hat{h}_s + V(y, T^o(y)),$$

where $\hat{h}_s = \arg\max_{\hat{h}}\{F(\hat{h}, T^o(y))\hat{h} \cdot \nabla \tau_s(y)\}$, to obtain $$\nabla \tau_s(y) \cdot \frac{d\tilde{X}_P}{dt}(T^o(y); y_s) =$$
$$F(\hat{h}_s, T^o(y))\hat{h}_s \cdot \nabla \tau_s(y) + V(y, T^o(y)) \cdot \nabla \tau_s(y) \leq 1,$$

thereby establishing (3.22). Therefore, $T^o$ is a viscosity subsolution to (3.13).

Viscosity Supersolution. $T^o$ is a viscosity supersolution to (3.13) if at any $y \in \Omega$ and for every $C^1$ function $\tau^s:\Omega \to \mathbb{R}$ such that $\tau^s(y) = T^o(y)$ and $\tau^s - T^o$ has a local maxima at y, $$\max_{\hat{h}}\{F(\hat{h}, T^o(y))\hat{h} \cdot \nabla \tau^s(y)\} + V(y, T^o(y)) \cdot \nabla \tau^s(y) - 1 \geq 0. \qquad (3.26)$$

For any $0 < h < T^o(y)$, there exists $\hat{y} \in \Omega$ satisfying $T^o(\hat{y}) + h = T^o(y)$ and a trajectory $\hat{X}_P(t;y_s)$ satisfying (2.1) and the limiting conditions $$\tilde{X}_P(T^o(\hat{y});y_s) = \hat{y}, \tilde{X}_P(T^o(y);y_s) = y. \qquad (3.27)$$

Of course, the optimal trajectory leading to y is a valid choice for $\hat{X}_P(t;y_s)$. For $h > 0$ small enough, $$h = T^o(y) - T^o(\hat{y}) \leq \tau^S(y) - \tau^S(\hat{y}) \qquad (3.28)$$

As in the earlier section, we may use Taylor's theorem to expand $\tau^s(\hat{y})$ near y to obtain $$\tau^s(\hat{y}) = \tau^s(y) + \nabla \tau^s(y) \cdot (\hat{y} - y) + o(|\hat{y} - y|) \qquad (3.29)$$

$$= \tau^s(y) - \int_{T^o(\hat{y})}^{T^o(\hat{y})+h} \nabla \tau^s(y) \cdot \frac{d\tilde{X}_P}{dt} dt + o(|\hat{y} - y|)$$

Inserting (3.29) in (3.28) and dividing by h, $$\frac{1}{h}\int_{T^o(\hat{y})}^{T^o(\hat{y})+h} \nabla \tau^s(y) \cdot \frac{d\tilde{X}_P}{dt} dt + \frac{o(|\hat{y} - y|)}{h} \geq 1. \qquad (3.30)$$

Observe that from (2.1), $$\nabla \tau^s(y) \cdot \frac{d\hat{X}_P(t; y_s)}{dt} \leq \max_{\hat{h}}\{F(\hat{h}, t)\hat{h} \cdot \nabla \tau^s(y)\} + V(\hat{X}_P(t; y_s), t) \cdot \nabla \tau^s(y).$$

Taking limits of (3.30) as $h \downarrow 0$ gives $$1 \leq \nabla \tau^s(y) \cdot \frac{d\hat{X}_P}{dt}(T^o(y); y_s) \leq$$
$$\max_{\hat{h}}\{F(\hat{h}, t)\hat{h} \cdot \nabla \tau^s(y)\} + V(y, T^o(y)) \cdot \nabla \tau^s(y),$$

which proves that $T^o$ is a viscosity supersolution of (3.13). Therefore, $T^o$ is a viscosity solution to (3.13).

THEOREM 2. Let the assumptions of Theorem 1 hold.
1. In addition, if $\phi^o$ is regular at $(X_P^o(t;y_s),t)$, for all $t>0$ and $X_P^o$ satisfies $$\frac{dX_P^o}{dt} = F(\hat{h}^o, t)\hat{h}^o + V(X_P^o(t; y_s), t), \quad t > 0, \text{ where} \quad (3.31a)$$

$$\hat{h}^o = \operatorname{argmax}_{\hat{h}}\{F(\hat{h}, t)\hat{h} \cdot q^o\} \quad (3.31b)$$

for some member $(q^o, p^o)$ of $\partial \phi^o(X_P^o(t;y_s),t)$, then $\phi^o(X_P^o(t;y_s),t)=0$ for all $t \geq 0$.

2. At points $(X^*_P(t;y_s),t)$ where $\phi^o$ is differentiable, every optimal trajectory to $y_f \in \Omega$ satisfies $$\frac{dX_P^*}{dt} = F(\hat{h}^*(t), t)\hat{h}^*(t) + V(X_P^*, t), \quad (3.32a)$$

$$\hat{h}^*(t) = \operatorname{argmax}_{\hat{h}}\{F(\hat{h}, t)\hat{h} \cdot \nabla \phi^o(X_P^*, t)\}. \quad (3.32b)$$

Proof. (1). When the trajectory $X_P^o(t;y_s)$ is regular, i.e. when $\phi^o$ is regular at points $(X_P^o(t;y_s),t)$ for all $t>0$, Lemma 4 implies $\partial_- \phi^o(X_P^o(t;y_s),t) = \partial \phi^o(X_P^o(t;y_s),t)$ for all $t>0$. Since $\phi^o$ is the viscosity solution to (3.10), we obtain from Theorem 4 that for any $t>0$, $p+\max_{\hat{h}}\{F(\hat{h},t)\hat{h} \cdot q\} + V(X_P^o(t;y_s),t) \cdot q = 0$ for all $(q,p) \in \partial_- \phi^o(X_P^o(t;y_s),t) = -\phi^o(X_P^o(t;y_s),t)$. Specifically, for the member $(q^o, p^o)$ of $\partial \phi^o(X_P^o(t;y_s),t)$ that satisfies (3.31), the definition of generalized gradient (A.9) implies $$\phi^{og}\left(X_P^o(t; y_s), t; \left(\frac{dX_P^o(t; y_s)}{dt}, 1\right)\right) \geq p^o + q^o \cdot \frac{dX_P^o(t; y_s)}{dt} \quad (3.33)$$

$$= p^o + F(\hat{h}^o, t)\hat{h}^o \cdot q^o +$$

$$V(X_P^o(t; y_s), t) \cdot q^o$$

$$= 0$$

Combining this result with (3.3), we obtain $$\phi^{og}\left(X_P^o(t; y_s), t; \left(\frac{dX_P^o(t; y_s)}{dt}, 1\right)\right) = 0$$

Since $\phi^o$ is regular at $(X_P^o(t;y_s),t)$ by assumption, we then also have $$\phi^{od}\left(X_P^o(t; y_s), t; \left(\frac{dX_P^o(t; y_s)}{dt}, 1\right)\right) = 0 \quad (3.34)$$

For any $h>0$, the definition of $\phi_P^o$ implies $$\left|\frac{\phi_P^o(t+h) - \phi_P^o(t)}{h}\right| = \left|\frac{\phi^o(X_P^o(t+h; y_s), t+h) - \phi^o(X_P^o(t; y_s), t)}{h}\right| \quad (3.35)$$

Since $\phi^o$ is locally Lipschitz, $\exists C > 0$ such that for $h>0$ small enough, $$\left|\phi(X_P^o(t+h; y_s), t+h) - \phi^o\left(X_P^o(t; y_s) + h\frac{dX_P^o(T; y_s)}{dt}, t+h\right)\right| \leq \quad (3.36)$$

-continued $$C\left|X_P^o(t+h; y_s) - X_P^o(t; y_s) - h\frac{dX_P^o(t; y_s)}{dt}\right| = C|o(h)|,$$

where $o(h) \in \mathbb{R}^n$ denotes a vector whose individual components are $o(h)$. Adding and subtracting $\phi^o$ from the numerator of (3.35) and using the triangle inequality, we obtain $$\left|\frac{\phi_P^o(t+h) - \phi_P^o(t)}{h}\right| \leq$$

$$\left|\frac{\phi^o\left(X_P^o(t; y_s) + h\frac{dX_P^o(t; y_s)}{dt}, t+h\right) - \phi^o(X_P^o(t; y_s), t)}{h}\right| + C\left|\frac{o(h)}{h}\right|.$$

From (A.7), the first term on the right converges to $$\phi^{od}\left(X_P^o(t; y_s), t; \left(\frac{dX_P^o(t; y_s)}{dt}, 1\right)\right)$$

as $h \downarrow 0$ and by (3.34), its value is zero. The second term uniformly converges to zero as $h \downarrow 0$, by definition. This implies $$\lim_{h \downarrow 0}\left|\frac{\phi_P^o(t+h) - \phi_P^o(t)}{h}\right| = 0,$$

and consequently that $$\lim_{h \downarrow 0}\frac{\phi_P^o(t+h) - \phi_P^o(t)}{h} = 0. \quad (3.37)$$

Since (3.37) holds for all $t>0$, $\phi_P^o$ is right differentiable in $(0, \infty)$ and the value of the right-derivative is zero for all $t>0$. This implies that $\phi_P^o$ is constant in $(0, \infty)$. Since $\phi_P^o(0)=0$, we obtain $\phi_P^o(X_P^o(t;y_s),t)=0$ for all $t>0$. Therefore, trajectories $X_P^o(t;y_s)$ that are regular and satisfy (3.31) always remain on the zero level-set of $\phi^o$.

(2). For the second part of the proof, we fix $y_f \in \Omega$. From Theorem 1, the optimal trajectory to $y_f$ satisfies $\phi^o(X^*_P(t;y_s),t)=0$ for all $t>0$. Hence, $\phi_P^o(t) := \phi^o(X^*_P(t;y_s),t)$ equals zero for all $0 \leq t \leq T^*(y_f)$. Let us fix a time $t$ such that $\phi^o$ is differentiable at $(X^*_P(t;y_s),t)$. The usual chain rule then yields $$0 = \frac{d\phi_P^o(t)}{dt} = \frac{\partial \phi^o}{\partial t} + \nabla \phi^o \cdot \frac{dX_P^*(t; y_s)}{dt}, \quad (3.38)$$

where the derivatives of $\phi^o$ are evaluated at $(X^*_P(t;y_s),t)$. Since $\phi^o$ is assumed to be differentiable at this point, (3.10) holds in the classical sense and $$\frac{\partial \phi^o}{\partial t} = -\max_{\hat{h}}\{F(\hat{h}, t)\hat{h} \cdot \nabla \phi^o(X_P^*, t)\} - V(X_P^*, t) \cdot \nabla \phi^o(X_P^*, t).$$

Substituting this in (3.38) gives $$\frac{dX_P^*}{dt} \cdot \nabla \phi^o(X_P^*, t) = \max_{\hat{h}} \{F(\hat{h}, t)\hat{h} \cdot \nabla \phi^o(X_P^*, t)\} + V(X_P^*, t) \cdot \nabla \phi^o(X_P^*, t). \quad (3.39)$$

Using (2.1), $$\frac{dX_P^*}{dt} \cdot \nabla \phi^o(X_P^*, t) = F_P^*(\hat{h}(t), t)\hat{h}^*(t) \cdot \nabla \phi^o(X_P^*, t) + V(X_P^*, t) \cdot \nabla \phi^o(X_P^*, t) \leq \max_{\hat{h}} \{F(\hat{h}, t)\hat{h} \cdot \nabla \phi^o(X_P^*, t)\} + V(X_P^*, t) \cdot \nabla \phi^o(X_P^*, t),$$

equality holding iff $F_P = F$ and $\hat{h}^*(t) = \mathrm{argmax}_{\hat{h}}\{F(\hat{h},t)\hat{h}\cdot\nabla\phi^o(X^*_P,t)\}$. Using this result in (3.39) yields $$\frac{dX_P^*}{dt} = F(\hat{h}^*(t), t)\hat{h}^*(t) + V(X_P^*, t),$$

which completes the proof.

3.1. Remarks.
Relationship between forward reachability and $\phi^o$: Theorem 1 lays down the mathematical foundation for computing forward reachable sets of vehicles operating in dynamic flow-fields, for any given anisotropic, time-dependent maximum relative speed function $F(\hat{h}(t),t)$. As shown, the forward reachable set coincides with the Set of non-positive $\phi^o$, i.e., for any $t \geq 0$, $$R(t;y_s) = \{y \in \Omega : \phi^o(y,t) \leq 0\}, \quad (3.40)$$

where $\phi^o$ is the continuous viscosity solution of (3.10). Therefore, the problem of forward reachability reduces to that of accurately computing the viscosity solution to (3.10). This unsteady formulation also has several merits over the stationary one given by (3.13).
Advantages of the unsteady formulation: As mentioned in § 1, $T^o$ can become discontinuous when $|V(x,t)| > F(\hat{h}(t),t)$, i.e., when local controllability does not hold. Accurate treatment of such discontinuities requires expensive and often ambiguous grid refinements. All of this is avoided by the unsteady formulation (3.10): by construction, it governs a continuous $\phi^o$. Note that (3.10) contains the extra dimension of time t when compared to (3.13). This higher dimensional embedding is what al-lows us to continuously track the forward reachable set (and reachability front). This may seem to add cost, but powerful solvers for (3.10) can be obtained by leveraging schemes (e.g. level-set solvers) dedicated to such unsteady HJ equations and allowing subgrid-scale accuracy. Moreover, one is typically not as interested in the actual value of $\phi^o(x,t)$ as much as in its sign. In other words, since $R(t;y_s)$ depends only on the sign of $\phi^o(x,t)$, it suffices to track the zero level-set of $\phi^o$. Narrow-band level-set methods [1] can be used for this purpose, achieving significant reduction in computational cost [31], when compared to the regular level-set method.
unit vector normal to the contours of $\phi^o$.

Our approach to reachability differs from common techniques used to derive HJ equations for backward reachable sets [7, 33, 16]. Such schemes first characterize the target set using a scalar function, and consider a control problem that optimizes this function for various admissible trajectories. Using the DPP and a constructive definition of the value function, they show that it satisfies an unsteady HJ equation. Presently, using non-smooth calculus, we showed that all admissible trajectories lie in the region where $\phi^o$ is non-positive. This result was then used to show, in a deductive fashion, that $\phi^o(y,t) \leq 0$ is equivalent to the forward reachable set. We note that this was obtained without invoking convex reachability [36].

4. Applications. We now illustrate our minimum-time path-planning results using two examples. The first example is that of a sailboat navigating in still water, downstream of a uniform wind field. Here, the maximum relative speed of the sailboat (F) is anisotropic, since it depends on the angle of the sail relative to the wind. In the second example, we use our methodology to compute the time-optimal trajectories of two isotropic autonomous underwater gliders operating in complex and realistic ocean flows of the Sulu Archipelago in the Philippines.

4.1. Minimum-time tacking of a sailboat in a uniform wind. Mobile agents such as sailboats cannot be steered at the same speed in all directions. They rely on wind drag for thrust, and their speeds vary with the magnitude of the wind and angle of the sail. Anisotropy is also exhibited by surface crafts, kayaks and AUVs that encounter wave effects. This anisotropy poses an additional challenge for the computation of minimum-time trajectories, with many racing and historical ramifications [18]. Through this example, we illustrate how the methodology developed in this work can be utilized to perform time-optimal path planning, rigorously accounting for such anisotropic motion constraints. Specifically, we consider a sailboat operating in a steady and spatially uniform wind field and compute its time-optimal trajectory to a point located directly downwind from its starting location.

FIG. 2-1 depicts a polar diagram of the sailboat's maximum relative speed (F) produced by wind blowing in the horizontal direction.

FIG. 2-1: Maximum speed profile $(\hat{h}, t, \hat{\iota})$ produced by wind blowing in the positive-x direction $\hat{\iota}$.

This idealized speed profile F that we employ represents the effect of wind drag on the sailboat and is given by the analytical expression $$F(\hat{h}, t, \hat{h}_\omega) = 1 + \frac{\theta(\hat{h}; \hat{h}_\omega)}{\pi}\cos(\theta(\hat{h}; \hat{h}_\omega)) + \left(1 - \frac{\theta(\hat{h}; \hat{h}_\omega)}{\pi}\right)\sin\theta(\hat{h}; \hat{h}_\omega) \quad (4.1)$$

for $\hat{h}$ such that $0 \leq \theta(\hat{h};\hat{h}_\omega) \leq \pi$. Here, $\theta(\hat{h};\hat{h}_\omega):U \to [0,2\pi)$ denotes the angle between $\hat{h}$ and the wind direction $\hat{h}_\omega$. For $\hat{h}$ such that $\pi < \theta(\hat{h};\hat{h}_\omega) < 2\pi$, we replace $\theta(\hat{h};\hat{h}_\omega)$ by $2\pi - \theta(\hat{h};\hat{h}_\omega)$ in (4.1) so as obtain a symmetric polar diagram (see FIG. 1). We see that for this speed profile, the sailboat cannot be steered directly upwind, and that the maximum speed is achieved when the sailboat is steered at an angle of approximately 60° to the wind. This analytical form for F is chosen so that the resulting polar diagram qualitatively matches the speed profile of a typical sailboat [40]. Nonetheless, the path planning methodology is also valid for other sailboats with varied speed profiles and those operating in unsteady and spatially variable winds. The sailboat starts at a point with coordinates $y_s = (0.2, 0.5)$ and must navigate to the point $y_f = (0.8, 0.2)$ in minimum time. These points are depicted in FIG. 2-2 as a shaded circle and star, respectively. The sailboat experiences a steady and uniform wind field in the positive-x direction, i.e., $\hat{h}_\omega = \hat{\iota}$. The minimum-time trajectory of the sailboat is determined using a two-step numerical algorithm, extending [32, 31] to anisotropic motions. In the first step, the forward reachable set $R(t;y_s)$ is computed by numerically solving the unsteady HJ equation (3.10), using a narrow-band level-set method. $R(t;y_s)$ is evolved until time $T^*(y_f)$, where $T^*(y_f)=\inf\{t:\phi^o(y_f,t)\leq 0\}$. Since F does not vary with time, the optimization in (3.10) is performed offline, prior to the start of the time-marching loop. We note that $$F(\hat{h}, t; \hat{h}_\omega)\hat{h}\cdot\nabla\phi^o = (F(\hat{h}, t; \hat{h}_\omega)\hat{h}\cdot\hat{n})|\nabla\phi^o| \text{ where } \hat{n} = \frac{\nabla\phi^o}{|\nabla\phi^o|}$$

is the unit vector in the direction of $\nabla\phi^o$. Prior to the time-marching loop, we populate a lookup table of the optimal values of $F(\hat{h},t;\hat{h}_\omega)\hat{h}\cdot\hat{n}$ (optimization done over $\hat{h}$) for various choices of $\hat{n}$. At each time-step, the optimal value of $F(\hat{h},t;\hat{h}_\omega)\hat{h}\cdot\hat{n}$ at every grid point is simply read-off from the lookup table, based on the unit vector $\hat{n}$ at that grid point. The boundary of $R(t;y_s)$ (i.e., $\partial R(t;y_s)$) is extracted from the scalar field $\phi^o$ and stored for later use. The second step of the algorithm then determines the optimal trajectory by solving the ordinary differential equation (3.32) backward in time, starting at $T^*(y_f)$. Recall that (3.32) is valid only at points where $\phi^o$ is differentiable. Since $\phi^o$ is locally Lipschitz (from Lemma 6), it is differentiable almost everywhere by Rademacher's theorem. Therefore, the backtracking equation (3.32) is also valid almost everywhere. At trajectory points where $\phi^o$ is not differentiable, the numerical approximation of $\nabla\phi^o$ yields one of the generalized spatial gradients of $\phi^o$. As a consequence, only one of the optimal trajectories from the family (3.31) is retrieved. The required optimal heading directions are computed using the discrete contours $\partial R(t;y_s)$ that were stored during the first step. We emphasize that even though in the present setup, we use F that does not vary with time, the algorithm is valid even in the case where F is time-dependent. The numerical schemes used to solve eqs. (3.10) and (3.32) are summarized in Appendix B.

The optimal trajectory of the sailboat is shown in FIG. 2-2.

FIG. 2-2: Optimal sailboat tacking path superimposed on intermediate zero level-sets of $\phi^o$.
Also shown are the intermediate reachability fronts $\partial R(t;y_s)$, uniformly spaced in time.
We observe that since the sailboat can move faster sideways of the wind direction, the intermediate reachability fronts are elongated normal to the wind direction. Secondly, the speeds in the upwind direction (negative-x) are much lower than those downwind. As a consequence, the reachability fronts are more closely spaced in the upwind direction. An optimal trajectory to the end point is the inverted 'V' shape: the sailboat tacks at an optimal angle to the wind for the first half of its journey and at the symmetrically opposite angle for the second half. This numerical result agrees well with intuition and basic sailboat racing (e.g. the sailboat can be navigated faster at an angle to the wind than downwind). Of course, for boats that can be steered fastest downwind, the time-optimal trajectory is the straight line connecting the start and end points. Such tests have been completed [22], but are not shown here. A key feature of our path-planning methodology is that it applies to any physical speed profiles and wind-fields, time-dependent and inhomogeneous. In all cases, it determines the time-optimal trajectory in a rigorous but also computationally efficient manner.

4.2. Minimum-time path-planning in the Sulu Archipelago. We now illustrate minimum-time path-planning results for the case of two autonomous gliders operating in the Sulu Archipelago in the Philippines. The geometry is complex, with numerous islands and passages of varied sizes. The ocean flows are also complex and of a multi-scale nature, due to the geometry and internal dynamics, but also due to the variable forcing from the larger-scale open ocean, tides, and atmosphere. Therefore, the flow fields are highly unsteady, with many dynamic features such as strong tidal currents, intermittent eddies, coastal currents and larger-scale streams.

In this example, we consider two underwater gliders that are deployed in the Sulu sea at coordinates 6.84° N 120.71° E and 7.61° N 121.51° E. These two start points are depicted by full black circles on FIG. 3-FIG. 5. They are to be driven, in minimum time, to a common target end point in the Sulawesi sea, with coordinates $y_f$: 4.26° N 120.42° E, shown as a full black star. The gliders are assumed to be isotropic and capable of speeds up to 0.25 m/s (~0.5 knots) relative to the flow, i.e., $F(\hat{h},t)=0.25$ m/s. Since F is isotropic, the term $\max_{\hat{h}}\{F(\hat{h},t)\hat{h}\cdot\nabla\phi^o\}$ in (3.10) reduces to $F|\nabla\phi^o|$. Hence, in this case, no optimizations are required at each time-step to solve (3.10).

The multi-scale ocean flow dynamics are modeled using the MIT Multidisciplinary Simulation, Estimation and Assimilation System (MSEAS) [21]. The flow-field estimates are obtained from data-assimilative simulations during Feb. 5-Mar. 24, 2009 as a part of the Philippine Straits Dynamics Experiment (PhilEx, [19]). Details regarding the numerical schemes used to solve the governing ocean equations may be found in [28, 21]. As they execute their mission, the gliders are assumed to follow a yo-yo pattern in the vertical (from the near surface to 400 m depth or near the seabed if shallower), and the horizontal flow they encounter during this process is integrated over the yo-yo pattern. The resultant horizontal velocity is assumed to force the simulated gliders, i.e. this horizontal velocity is V(x,t). For $\phi^o$, a spatial discretization of 3 km×3 km resolution and a time step of 5 min are employed.

FIG. 2-3 depicts the time-evolution of the optimal trajectories of the two gliders, overlade on the flow-field, colored by its magnitude (cm/s).

Figures 1, 2:
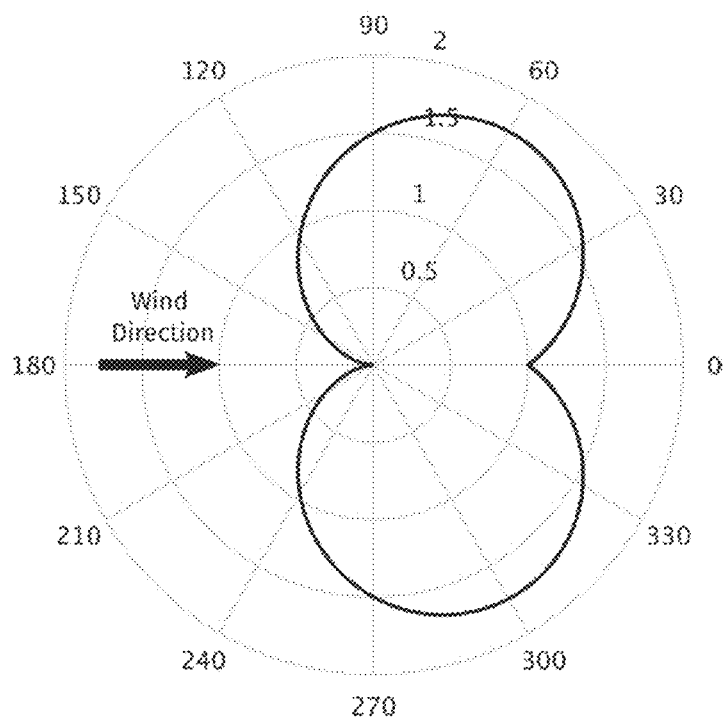
Figure 2:
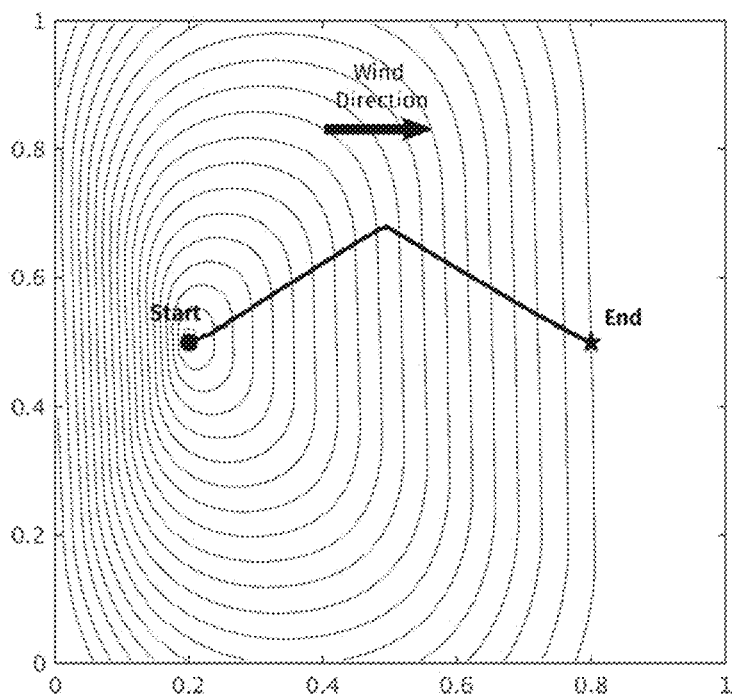
Figures 2, 3, 3A, 3B:
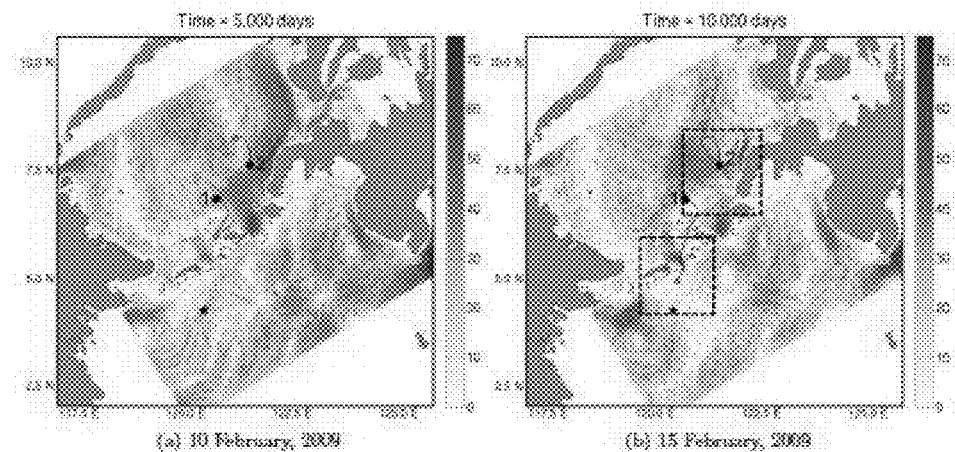
Figures 2, 3, 3C, 3D:
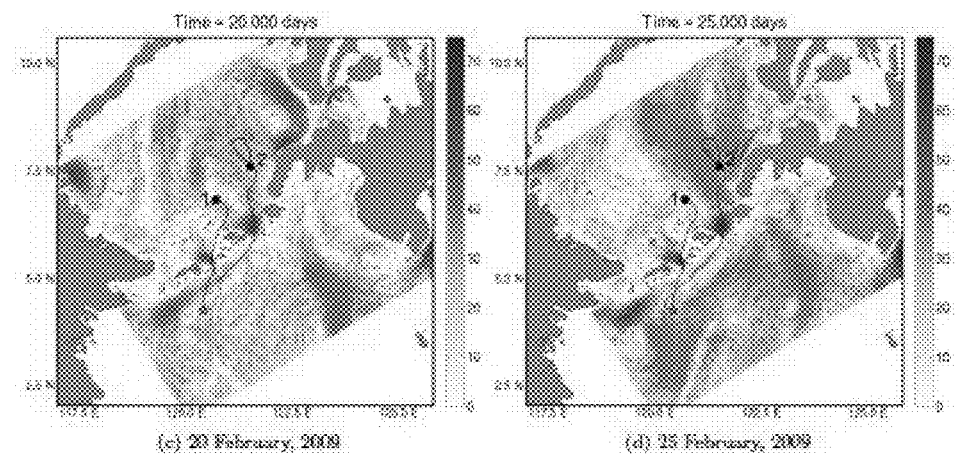
Figures 2, 3, 4, 4A:
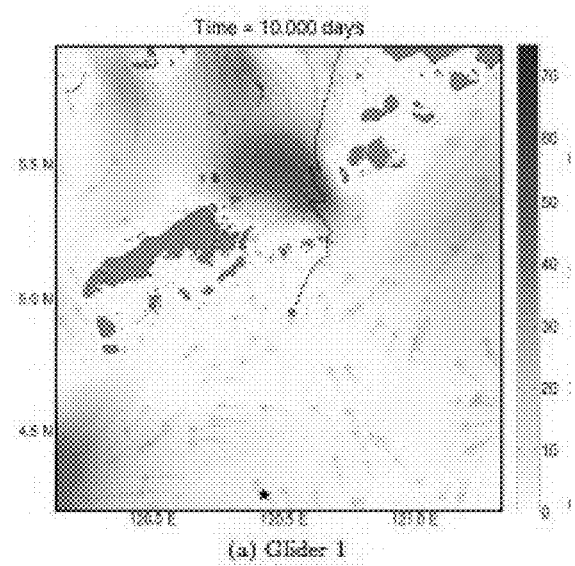
Figures 2, 3, 4, 4B:
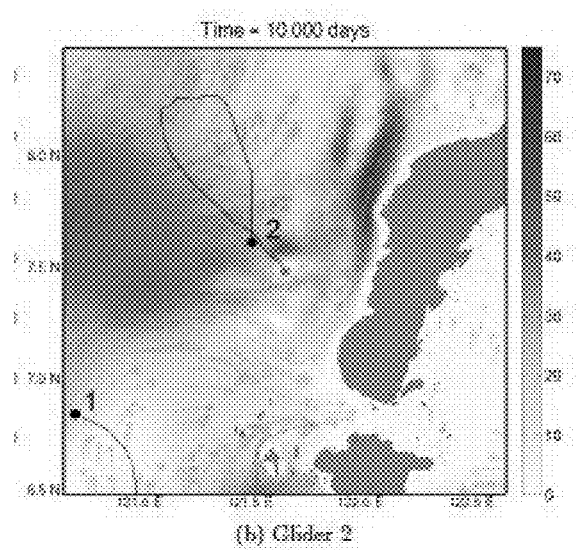

FIG. 2-3: Time-evolution of the optimal trajectories of two gliders released in the Sulu sea (start locations numbered 1 and 2, and marked by full black circles). The target end state in the Sulawesi sea is marked by a full black star. Glider positions at intermediate times are grey shaded circles. Streamlines of the ocean currents are overlaid on a colored map of the flow magnitude (cm/s).
Intermediate glider positions are shown as gray shaded circles. In panel (a), we see that Glider 2 encounters a strong cyclonic gyre, frequent features in the Sulu sea. As a result, it is forced to move northwards, away from the end point. Glider 1, in contrast does not experience this eddy and is able to directly head south. Along the way, it encounters strong tidal flows as it traverses through passages between islands, as Shown in panel (b) and in the corresponding magnified view in FIG. 2-4a.
FIG. 2-4: Magnified views of optimal glider trajectories, 10 days after their release. These magnified areas correspond to the regions marked in FIG. 2-3b.
These strong and oscillatory flows cause the glider to take a zig-zag back-and-forth path as it crosses the islands. Glider 2, initially forced offtrack by the strong eddy, turns and resumes its journey towards the end point after roughly 10 days of deployment, completing a remarkable loop in the process (FIG. 3b, FIG. 4b). Panels (c) and (d) of FIG. 3 display the remaining portions of the optimal trajectories of both gliders. Overall, Glider 1 takes roughly 15 days to reach the end point, while Glider 2, though deployed at the same time, arrives at the target in 25 days. These are striking differences in optimal paths and shortest arrival times. The results also show that due to the strong currents (e.g. tides and gyres), certain points along the optimal trajectory may be visited multiple times, indicating discontinuities in the field of the optimal arrival time $T^o(y)$.

FIG. 2-5 shows the fields of optimal arrival times $T^o(y)$ for each of the two deployment locations.

FIG. 2-5: Minimum arrival-time fields $T^o(y)$, corresponding to the deployment location of each glider.

Such maps are generated by recording the first time each point in the domain becomes a member of the forward reachable set $R(t;y_s)$. Various ridges in FIGS. 2-5a and 2-5b clearly indicate the discontinuities in $T^o(y)$. This example, therefore, illustrates the applicability of the unsteady formulation (3.10) for forward reachability and the ability to implicitly handle strong flows, without requiring expensive and often ambiguous grid refinements near the boundary of the reachable set.

5. Conclusions. We presented a theoretical synthesis of forward reachability for minimum-time control of anisotropic autonomous vehicles navigating in dynamic flow-fields. A motivation of this work is to optimally operate such vehicles by utilizing the numerical predictions of environmental flow fields. The approach is based on exactly evolving a forward reachable set, which is the set of all states to which the system can be driven, at a given time. An open-loop control is derived for the minimum-time trajectories, taking into consideration the infrequent communication between the vehicles and the central controller. We showed that the forward reachable set is governed by the viscosity solution of an unsteady Hamilton-Jacobi equation. This equation is shown to be valid even when environmental flow speeds exceed the maximum relative speed of the vehicles, i.e., when local controllability does not hold. The unsteady HJ formulation is shown to be equivalent to a static one under the restriction of local controllability. The algorithm is applied to determine the minimum-time trajectory of a sailboat moving in a uniform wind-field and the optimal arrival-time fields of two autonomous underwater gliders deployed in the Sulu sea with target end points in the Sulawesi sea. These applications demonstrate the usability of the algorithm in realistic scenarios, highlighting the general validity of the unsteady HJ formulation, including overcoming the limitations of the static one.

6. Definitions/Theories

In this section, we describe some of the relevant definitions and other theoretical details needed for the main results. Most of the material presented in this section may be found in [3, 12, 11, 17, 9]. In what follows, we let $n \in \mathbb{N}$, $\Omega \subseteq \mathbb{R}^n$ be an open set and $\xi : \Omega \to \mathbb{R}$.

CLAIM 1. Let $x, q \in \mathbb{R}^n$, $t \geq 0$ and $F(\hat{u}, t): U \times [0, \infty) \to \mathbb{R}^+$. Let $V(x, t)$ satisfy (2.3) and (2.4). Then, the function $H(x, t, q) := \max_{\hat{u}} \{F(\hat{u}, t) \hat{u} \cdot q\} + V(x, t) \cdot q$ is
1. convex in the third argument and
2. Lipschitz continuous in all arguments, i.e. $\exists C_q, C_s \geq 0$ such that $$|H(x, t, q_1) - H(x, t, q_2)| \leq C_q |q_1 - q_2| \forall q_1, q_2 \in \mathbb{R}^n \quad (A.1)$$

and for all $x_1, x_2 \in \mathbb{R}^n$ and $t_1, t_2 \geq 0$, $$|H(x_1, t_1, q) - H(x_2, t_2, q)| \leq C_s |q| \times (|x_1 - x_2| + |t_1 - t_2|). \quad (A.2)$$

The proof of this claim uses a straight-forward application of the triangle and Cauchy-Schwarz inequalities, and is omitted.

DEFINITION 1. Let $x_0 \in \Omega$. The set of super-differentials of $\xi$ at $x_0$ is defined as $$\partial_+ \xi(x_0) := \left\{ q \in \mathbb{R}^n : \limsup_{x \to x_0} \frac{\xi(x) - \xi(x_0) - q \cdot (x - x_0)}{|x - x_0|} \leq 0 \right\}. \quad (A.3)$$

Similarly, the set of sub-differentials of $\xi$ at $x_0$ is $$\partial_- \xi(x_0) := \left\{ q \in \mathbb{R}^n : \liminf_{x \to x_0} \frac{\xi(x) - \xi(x_0) - q \cdot (x - x_0)}{|x - x_0|} \geq 0 \right\}. \quad (A.4)$$

REMARK 1. Let $\xi \in C(\Omega)$. Then $q \in \partial_+ \xi(x_0)$ (resp. $\partial_- \xi(x_0)$) if and only if there exists a function $\gamma \in C^1(\Omega)$ such that $\gamma(x_0) = \xi(x_0), \nabla \gamma(x_0) = q$ and the function $\gamma - \xi$ has a strict local minima (resp. maxima) at $x_0$.

REMARK 2. Let $\xi \in C(\Omega)$.
1. If is differentiable at $x_0$, then $$\partial_+ \xi(x_0) = \partial_- \xi(x_0) = \{\nabla \xi(x_0)\}. \quad (A.5)$$

2. If $\partial_+ \xi(x_0)$ and $\partial_- \xi(x_0)$ are both non-empty, then $\xi$ is differentiable at $x_0$ and (A.5) holds.

DEFINITION 2. Let be locally Lipschitz at $x_0$. The generalized directional derivative, $\xi^g(x_0; u): \mathbb{R}^n \to \mathbb{R}$, for any $u \in \mathbb{R}^n$ is defined as $$\xi^g(x_0; u) := \limsup_{\substack{x \to x_0 \\ h \downarrow 0}} \frac{\xi(x + hu) - \xi(x)}{h}. \quad (A.6)$$

The directional derivative, $\xi^d(x_0; u): \mathbb{R}^n \to \mathbb{R}$ for any $u \in \mathbb{R}^n$ is defined as $$\xi^d(x_0; u) := \lim_{h \downarrow 0} \frac{\xi(x_0 + hu) - \xi(x_0)}{h}, \quad (A.7)$$

whenever the limit exists. The lower Dini derivative, $D_+ \xi(x_0; u): \mathbb{R}^n \to \mathbb{R}$ for any $u \in \mathbb{R}^n$ is $$D_+ \xi(x_0; u) := \liminf_{\substack{u' \to u \\ h \downarrow 0}} \frac{\xi(x_0 + hu') - \xi(x_0)}{h}. \quad (A.8)$$

The set of generalized gradients of $\xi$ at $x_0$ is the non-empty set $$\partial \xi(x_0) = \{q \in \mathbb{R}^n : \forall u \in \mathbb{R}^n, q \cdot u \leq \xi^g(x_0; u)\}. \quad (A.9)$$

DEFINITION 3. (Regular Function.) $\xi$ is said to be regular at $x_o \in \Omega$ if it is Lipschitz near $x_0$ and admits directional derivatives $\xi^d(x_0; u)$ for all $u \in \mathbb{R}^n$, with $\xi^g(x_0; u) = \xi^d(x_0; u)$.

NOTE 1. If is continuously differentiable at $x_0$, then it is regular at $x_0$. Furthermore, $\xi^d(x_0; u) = \nabla \xi(x_0) \cdot u = \xi^g(x_0; u)$ for all $u \in \mathbb{R}^n$.

NOTE 2. If is convex and Lipschitz near $x_0$, then it is regular at $x_0$.

LEMMA 2. Under the assumptions of Definition 2, $D_+ \xi(x_0; u) \leq \xi^g(x_0; u)$ for all $u \in \mathbb{R}^n$ and equality holds iff $\xi$ is regular at $x_0$.

LEMMA 3. For all $x_0 \in \Omega$, $$\partial_- \xi(x_0) = \{q \in \mathbb{R}^n : \forall u \in \mathbb{R}^n, D_+ \xi(x_0; u) \geq q \cdot u\}, \quad (A.10a)$$

$$\partial_+ \xi(x_0) = \{q \in \mathbb{R}^n : \forall u \in \mathbb{R}^n, D_+(-\xi(x_0; u)) \geq -q \cdot u\}. \quad (A.10b)$$

LEMMA 4. Let $\xi$ be regular at $x_0 \in \Omega$. Then, $$\partial_-\xi(x_0) = \partial\xi(x_0). \tag{A.11}$$

LEMMA 5. If $\xi$ is locally Lipschitz at $x_0 \in \Omega$, then $$\partial_+\xi(x_0) \cup \partial_-\xi(x_0) \subseteq \partial\xi(x_0). \tag{A.12}$$

THEOREM 3. (Generalized Gradient Formula.) Let $\Omega \subseteq \mathbb{R}^n$ be open. Let $\xi: \Omega \to \mathbb{R}$ be locally Lipschitz and $\Omega_{nd} \subset \Omega$ be the set of points at which is not differentiable. Let co$\{A\}$ denote the convex hull of set A. The set of generalized gradients, $\partial\xi(x_0)$ can be characterized as $$\partial\xi(x_0) = co\left\{\lim_{x_i \to x_0} \nabla\xi(x_i): x_i \notin \Omega_{nd}\right\}, \tag{A.13}$$

where the limit is taken over sequences $\{x_i\}_{i \geq 1}$ converging to $x_0$ such that the sequence of partial derivatives $\{\nabla\xi(x_i)\}_{i \geq 1}$ converges.

COROLLARY 1. Let the hypothesis of Theorem 3 hold. Then for any $u \in \mathbb{R}^n$, $$\xi^g(x_0; u) := \limsup_{x \to x_0}\{\nabla\xi(x) \cdot u: x \notin \Omega_{nd}\}. \tag{A.14}$$

DEFINITION 4. Consider the Hamilton-Jacobi equation (3.1). A function $\phi \in C(\Omega \times [0, \infty))$ is a viscosity subsolution of (3.1) if for every $(x,t) \in \Omega \times (0, \infty)$ and $(q,p) \in \partial_+\phi(x,t)$, $$p + \max_{\hat{h}(t)}\{F(\hat{h}(t), t)\hat{h}(t) \cdot q\} + V(x, t) \cdot q \leq 0. \tag{A.15}$$

A function $\phi \in C(\Omega \times [0, \infty))$ is a viscosity supersolution of (3.1) if for every $(x,t) \in \Omega \times (0, \infty)$ and $(q,p) \in \partial_-\phi(x,t)$, $$p + \max_{\hat{h}(t)}\{F(\hat{h}(t), t)\hat{h}(t) \cdot q\}\hat{h}(t) + V(x, t) \cdot q \geq 0. \tag{A.16}$$

REMARK 3. (Uniqueness.) The Cauchy problem (3.1)-(3.2) admits at most one bounded, uniformly continuous viscosity solution (see Corollary 5.5 of [9]).

LEMMA 6. Let $\phi$ be the unique viscosity solution to (3.1) and (3.2). Then, $\phi$ is locally Lipschitz, i.e. for every $(x_0, t_0) \in \Omega \times (0, \infty)$, there exists a neighborhood of $(x_0, t_0)$ in which $\phi$ is Lipschitz continuous. The proof of this lemma uses convexity of $H(x,t,q) = \max_{\hat{u}}\{F(\hat{u},t)\hat{u} \cdot q\} + V(x,t) \cdot q$ in the third argument and may be found in [48] (Proposition 1.18) or [4] (Proposition 3.20) or [11] (Theorem 7.2.3).

THEOREM 4. A locally Lipschitz function $\phi: \Omega \times (0, \infty) \to \mathbb{R}$ is a viscosity solution to (3.1) iff for every $(x,t) \in \Omega \times (0, \infty)$, $$\max_{(q,p) \in \partial\phi(x,t)}\left\{p + \max_{\hat{u}}\{F(\hat{u}, t)\hat{u} \cdot q\} + V(x, t) \cdot q\right\} = 0 \tag{A.17}$$

and for all $(q,p) \in \partial_-(x,t)$, $$p + \max_{\hat{u}}\{F(\hat{u}, t)\hat{u} \cdot q\} + V(x, t) \cdot q = 0. \tag{A.18}$$

The proof of this theorem may be found in [17].

THEOREM 5. (Lebourg's Mean Value Theorem.) Let $\mathbb{R} \subseteq \mathbb{R}$ be an open set. Let $x, y \in \mathbb{S}$ and suppose that f: $\mathbb{S} \to \mathbb{R}$ is Lipschitz on an open set containing the segment $[x, y]$. Then there exists $0 < \lambda < 1$ such that $$f(y) - f(x) = g \times (y - x), \tag{A.19}$$

for some $g \in \partial f(z)$, where $z = \lambda x + (1-\lambda)y$.

THEOREM 6. (Chain Rule.) Let $\Omega_1 \subseteq \mathbb{R}_n$ and $\Omega_2 \subseteq \mathbb{R}^m$ be two open sets with $m, n \in \mathbb{N}$. Let $g: \Omega_1 \to \Omega_2$ be continuously differentiable near $x \in \Omega_1$, and let $F: \Omega \to \mathbb{R}$ be Lipschitz near $g(x)$. Then $f := F \circ g$ is Lipschitz near x and $$\partial f(x) \subseteq (g'(x))^* \partial F(g(x)), \tag{A.20}$$

where * denotes the adjoint. The proofs of Theorems 5 and 6 may be found in [12].

7. Numerical Schemes

We now summarize the numerical schemes utilized to discretize and solve (3.10) and (3.32). These equations are solved using a Finite Volume framework. The term $\nabla\phi^\circ$ in (3.10) is discretized using either a first-order [29] or a higher-order upwind scheme [51]; $V(x,t) \cdot \nabla\phi^\circ$ is discretized using a second-order Total Variation Diminishing scheme on a staggered C-grid [49].

Evolution of the forward reachable set: We discretize (3.10) in time as follows:

$$\frac{\phi^\circ(x, t + \Delta t) - \phi^\circ(x, t)}{\Delta t} = \tag{B.1}$$
$$-\max_{\hat{u}}\{F(\hat{u}, t)\hat{u} \cdot \nabla\phi^\circ(x, t)\} - V(x, t) \cdot \nabla\phi^\circ(x, t).$$

(B.1) is solved only in the interior cells of the domain. For boundaries that are open inlets, outlets or side walls (i.e. not interior obstacles), a zero normal flux can be used on $\phi^\circ$. We have also used weaker open boundary conditions such as zero second-order derivatives, so as to allow free advection of non-zero gradients, e.g. [47, 46]. In general, more complex open boundary conditions can be used, as done in regional ocean modeling [25, 20]. Obstacles in the domain are masked. For points adjacent to the mask, the necessary spatial gradients are evaluated using neighboring nodes that do not lie under the mask.

The reachability front $\partial R$ is extracted from the narrow-band $\phi^\circ$ field at every time step using a contour algorithm. We also note that instead of this extraction, we Backtracking: (3.32) is discretized using first order [29] or higher-order [51] time integration schemes. Ideally, it suffices to solve (3.10) until the level-set front first reaches $y_f$. However, due to the discrete time steps, a more convenient stopping criterion is the first time, T, when $\phi^\circ(y_f, T) \leq 0$. Due to this, $y_f$ does not lie on the final contour $\partial R(T; y_s, t_s)$ exactly. Thus, we first project $y_f$ onto $\partial R(T; y_s, t_s)$. Starting from this projected point, the discretized form of (3.32), $$\frac{X_P^*(t - \Delta t; y_s) - X_P^*(t; y_s)}{\Delta t} = -V(X_P^*, t) - F(\hat{h}^*(t), t)\hat{h}^*(t), \tag{B.2}$$

is marched backward in time until we reach a point on the first saved contour and this process generates a discrete representation of $X_P^*(t; y_s)$. Along the way, we project each newly computed trajectory point, $X_P^*(t-\Delta t; y_s)$ onto the corresponding intermediate level-set contour (see [29]). For F that does not vary with time, the optimal heading $\hat{h}^*(t)$ in (B.2) is read off from the lookup table (described in 4.1) based on the direction of the gradient $\nabla\phi^\circ(X_P^*(t; y_s), t)$.

Further algorithmic and implementation details may be found in [29].

REFERENCES

[1] David Adalsteinsson and James A. Sethian, A fast level set method for propagating inter-faces, Journal of Computational Physics, 118 (1995), pp. 269-277.

[2] M. Athans and P. L. Falb, Optimal Control: An Introduction to the Theory And Its Applications, Dover Books on Engineering Series, Dover Publications, 2006.

[3] M. Bardi and I. Capuzzo-Dolcetta, Optimal Control and Viscosity Solutions of Hamilton-Jacobi-Bellman Equations, Modern Birkläuser Classics, Birkläuser Boston, 2008.

[4] S. Bianchini and D. Tonon, SBV Regularity for Hamilton-Jacobi equations with Hamiltonian depending on (t,x), SIAM Journal on Mathematical Analysis, 44 (2012), pp. 2179-2203.

[5] A. M. Bloch, Nonholonomic Mechanics and Control, Interdisciplinary Applied Mathematics, Springer, 2003.

[6] O. Bokanowski, A. Briani, and H. Zidani, Minimum time control problems for non-autonomous differential equations, Systems & Control Letters, 58 (2009), pp. 742-746.

[7]. Bokanowski, N. Forcadel, and H. Zidani, Reachability and minimal times for state constrained nonlinear problems without any controllability assumption, SIAM Journal of Optimal Control, 48 (2010), pp. 4292-4316.

[8] Olivier Bokanowski, Jochen Garcke, Michael Griebel, and Irene Klompmaker, An adaptive sparse grid semilagrangian scheme for first order hamilton-jacobi bellman equations, Journal of Scientific Computing, 55 (2013), pp. 575-605.

[9] Alberto Bressan, Viscosity solutions of Hamilton-Jacobi Equations and Optimal Control Problems, An Illustrated Tutorial, Penn State University, Spring 2011.

[10] A. E. Bryson and Y. C. Ho, Applied Optimal Control: Optimization, Estimation and Control, John Wiley and Sons, 1975.

[11] P. Cannarsa and C. Sinestrari, Semiconcave Functions, Hamilton-Jacobi Equations, and Optimal Control, Progress in Nonlinear Differential Equations and Their Applications, Birkläuser Boston, 2004.

[12] F. H. Clarke, Yu. S. Ledyaev, R. J. Stern, and P. R. Wolenski, Nonsmooth analysis and control theory, Springer-Verlag New York, Inc., Secaucus, N.J., USA, 1998.

[13] M. G. Crandall and P. L. Lions, Viscosity solutions of hamilton-jacobi equations, Transactions of the American Mathematical Society, 277 (1983), pp. 1-43.

[14] T. B. Curtin, D. M. Crimmins, J. Curcio, M. Benjamin, and C. Roper, Autonomous underwater vehicles: Trends and transformations, Marine Technology Society Journal, 39 (2005-09-01T00:00:00), pp. 65-75.

[15] R. E. Davis, N. E. Leonard, and D. M. Fratantoni, Routing strategies for underwater gliders, Deep Sea Research Part II: Topical Studies in Oceanography, 56 (2009), pp. 173-187.

[16] M. Falcone, T. Giorgi, and P. Loreti, Level sets of viscosity solutions: some applications to fronts and rendezvous problems, SIAM Journal on Applied Mathematics, 54 (1994), pp. 1335-1354.

[17] Hélène Frankowska, Hamilton-Jacobi Equations: Viscosity Solutions and Generalized Gradients, Journal of Mathematical Analysis and Applications, 141 (1989), pp. 21-26.

[18] Francis Galton, On the employment of meteorological statistics in determining the best course for a ship whose sailing qualities are known, Proceedings of the Royal Society of London, 21 (1872), pp. 263-274.

[19] Arnold L. Gordon and Cesar L. Villanoy, Oceanography. Special issue on the Philippine Straits Dynamics Experiment, vol. 24, The Oceanography Society, 2011.

[20] P. J. Haley Jr. and P. F. J. Lermusiaux, Multiscale two-way embedding schemes for free-surface primitive equations in the multidisciplinary simulation, estimation and assimilation systems, Ocean Dynamics, 60 (2010), pp. 1497-1537.

[21] Patrick J. Haley Jr. and Pierre F. J. Lermusiaux, Multiscale two-way embedding schemes for free-surface primitive equations in the multidisciplinary simulation, estimation and assimilation system, Ocean Dynamics, 60 (2010), pp. 1497-1537.

[22] Benjamin Hessels, Time-optimal path planning for sea-surface vehicles under the effects of strong currents and winds, Bachelor's Thesis, Department of Mechanical Engineering, Massachusetts Institute of Technology, June 2014.

[23] Chiu-Yen Kao, Stanley Osher, and Yen-Hsi Tsai, Fast sweeping methods for static hamilton-jacobi equations, SIAM journal on numerical analysis, 42 (2005), pp. 2612-2632.

[24] Naomi Ehrich Leonard, Derek Paley, Francois Lekien, Rodolphe Sepulchre, David Fratantoni, and Russ Davis, Collective motion, sensor networks, and ocean sampling, Proceedings of the IEEE, special issue on the emerging technology of networked control systems, 95 (2007), pp. 48-74.

[25] P. F. J. Lermusiaux, Error Subspace Data Assimilation Methods for Ocean Field Estimation: Theory, Validation and Applications, PhD thesis, Harvard University, May 1997.

[26] P. F. J. Lermusiaux, Uncertainty estimation and prediction for interdisciplinary ocean dy-namics, Journal of Computational Physics, 217 (2006), pp. 176-199.

[27] P. F. J. Lermusiaux, C-S. Chiu, G. G. Gawarkiewicz, P. Abbot, A. R. Robinson, R. N. Miller, P. J. Haley, W. G. Leslie, S. J. Majumdar, A. Pang, and F. Lekien, Quantifying uncertainties in ocean predictions, Oceanography, 19 (2006), pp. 90-103.

[28] P. F. J. Lermusiaux, P. J. Haley, W. G. Leslie, A. Agarwal, O. Logutov, and L. J. Burton, Multiscale physical and biological dynamics in the philippines archipelago: Pre-dictions and processes., Oceanography, 24 (2011), pp. 70-89.

[29] T. Lolla, Path planning in time dependent flows using level set methods, master's thesis, Department of Mechanical Engineering, Massachusetts Institute of Technology, September 2012.

[30] T. Lolla, P. J. Haley Jr., and P. F. J. Lermusiaux, Time-optimal path planning in dynamic flows using level set equations: realistic applications, Ocean Dynamics, 64 (2014), pp. 1399-1417.

[31] T. Lolla, P. F. J. Lermusiaux, M. P. Ueckermann, and P. J. Haley Jr., Time-optimal path planning in dynamic flows using level set equations: theory and schemes, Ocean Dynamics, 64 (2014), pp. 1373-1397.

[32] T. Lolla, M. P. Ueckermann, K. Yigit, P. J. Haley Jr., and P. F. J. Lermusiaux, Path planning in time dependent flow fields using level set methods, in Proceedings of IEEE International Conference on Robotics and Automation, 2012, pp. 166-173.

[33] John Lygeros, On reachability and minimum cost optimal control, Automatica, 40 (2004), pp. 917-927.
[34] Ian Mitchell, Application of Level Set Methods to Control and Reachability Problems In Continuous and Hybrid Systems, PhD thesis, Scientific Computing and Computational Mathematics Program, Stanford University, August 2002.
[35] Ian Mitchell and Claire Tomlin, Overapproximating reachable sets by hamilton-jacobi projections, Journal of Scientific Computing, 19 (2003), pp. 323-346.
[36] I. Mitchell and C. J. Tomlin, Level set methods for computation in hybrid systems, in Hybrid Systems: Computation and Control, Nancy Lynch and Bruce H. Krogh, eds., vol. 1790 of Lecture Notes in Computer Science, Springer Berlin Heidelberg, 2000, pp. 310-323.
[37] I. M. Mitchell, A. M. Bayen, and C. J. Tomlin, A time-dependent Hamilton-Jacobi formulation of reachable sets for continuous dynamic games, IEEE Transactions on Automatic Control, 50 (2005), pp. 947-957.
[38] Stanley Osher and James A Sethian, Fronts propagating with curvature-dependent speed: Algorithms based on Hamilton-Jacobi formulations, Journal of Computational Physics, 79 (1988), pp. 12-49.
[39] A. Philpott and G. Leyland, Rowing to barbados, in Algorithms for Optimization with In-complete Information, Susanne Albers, Rolf H. Möthring, Georg Ch. Pflug, and Rüdiger Schultz, eds., no. 05031 in Dagstuhl Seminar Proceedings, Dagstuhl, Germany, 2005, Inter-nationales Begegnungs—and Forschungszentrum für Informatik (IBFI), Schloss Dagstuhl, Germany.
[40] Yoav Raz, Sailboat speed vs. wind speed, Catalyst, Journal of the Amateur Yacht Research Society, (April, 2009), pp. 263-274.
[41] B. Rhoads, I. Mezic, and A. Poje, Minimum time feedback control of autonomous underwater vehicles, in Decision and Control (CDC), 2010 $49^{th}$ IEEE Conference on, December 2010, pp. 5828-5834.
[42] Blane Rhoads, Igor Mezić, and Andrew C. Poje, Minimum time heading control of un-derpowered vehicles in time-varying ocean currents, Ocean Engineering, 66 (2013), pp. 12-31.
[43] J. Sethian and A. Vladimirsky, Ordered upwind methods for static Hamilton-Jacobi equations: Theory and algorithms, SIAM Journal on Numerical Analysis, 41 (2003), pp. 325-363.
[44] J. A. Sethian, Fast marching methods, SIAM Rev., 41 (1999), pp. 199-235.
[45] J. A. Sethian and A. Vladimirsky, Ordered upwind methods for static hamilton? jacobi equa-tions, Proceedings of the National Academy of Sciences, 98 (2001), pp. 11069-11074.
[46] D. N. Subramani and P. F. J. Lermusiaux, Energy-based path planning by stochastic dynamically orthogonal level-set optimization, Ocean Modeling, (2015). in preparation.
[47] D. N. Subramani, T. Lolla, P. J. Haley Jr., and P. F. J. Lermusiaux, A stochastic optimization method for energy-based path planning, in Dynamic Data-driven Environmental Systems Science Conference, Lecture Notes in Computer Science (eds. Ravela, S. and Sandu, A.), Springer International Publishing, 2015. in press.
[48] Daniela Tonon, Regularity Results For Hamilton-Jacobi Equations, PhD thesis, Scuola Inter-nazionale Superiore di Studi Avanzati, September 2011.
[49] M. P. Ueckermann and P. F. J. Lermusiaux, 2.29 Finite Volume MATLAB Framework Documentation, tech. report, MSEAS Group, Massachusetts Institute of Technology, Cam-bridge, MA USA, 2011.
[50] Alexander Vladimirsky, Static pdes for time-dependent control problems, Interfaces and Free Boundaries, 8 (2006), p. 281.
[51] K. Yigit, Path planning methods for autonomous underwater vehicles, master's thesis, De-partment of Mechanical Engineering, Massachusetts Institute of Technology, June 2011.

III. Stochastic Time-Optimal Path Planning In Uncertain, Strong, Dynamic Fields

1. Introduction

Planning optimal paths of autonomous platforms in dynamic environments such as the ocean and atmosphere is important for maximally utilizing the platforms' capabilities. In the ocean, commonly used autonomous vehicles—underwater gliders, propelled underwater vehicles and surface crafts—often undertake complex missions such as oceanographic data collection, search and rescue operations, oil and gas discovery, and acoustic surveillance and security tasks [1-3]. Path planning is the task of predicting paths for these vehicles to navigate between any two points while optimizing some or all operational parameters such as time, energy, data collected, and safety. A related concept is dynamic reachability forecasts, the task of predicting the dynamic set of all the locations that can be reached by these vehicles.

One major challenge in dynamic reachability forecasting and optimal path planning for realistic ocean conditions is that current forecasts are uncertain. There could be uncertainties in the initial conditions, boundary conditions, parameters and even terms in the equations themselves [4]. In the present paper, our objective is to develop fundamental and efficient stochastic equations and methodology for computing the reachability fronts and time-optimal paths of vehicles navigating in uncertain, strong, and dynamic flow fields. As we will see, such an approach also helps us in quantifying the sensitivity of optimal paths to errors in flow predictions.

A traditional focus of path planning has been on autonomous agents in complex but static environments. These traditional methods can be broadly grouped into graph-based search methods, nonlinear optimization methods including those with evolutionary algorithms, and dynamics-based approaches including Lagrangian Coherent Structures. For a review, see, e.g., [5-8], and references therein. Recently, fundamental level-set Partial Differential Equations (PDEs) that govern reachability have been developed for time-optimal [7, 9, 10] and energy-optimal [11] path planning of autonomous swarms in strong and dynamic deterministic flows. This level-set PDE-based methodology overcomes the limitations of traditional path planning methods designed for robotic motion in static environments. It can indeed directly utilize a prediction of the dynamic environment to plan time- or energy-optimal paths that intelligently utilize favorable flows and avoid adverse currents. It also directly avoids physical obstacles (e.g., islands) and forbidden regions due to operational constraints (e.g., minimum water depth) thereby ensuring vehicle safety. It has been employed to solve pursuit-evasion games in dynamic flows [12,13]. Its use with realistic deterministic ocean re-analyses was demonstrated in several ocean regions [14,15] and in real-time sea exercises with real AUVs [16]. However, the corresponding PDEs and methodology need to be extended to dynamic stochastic environments.

Progress has been made on path planning for autonomous robots in uncertain environments. Wellman et al. [17]

extended graph-based search methods to account for uncertain edge costs with applications to stochastic bus networks. Kewlani et al. [18] extend graph-based algorithms to explicitly consider uncertainty in the mobility and terrain parameterizations using stochastic surface response methods. Potential field methods have been used in a Monte Carlo approach to solve path planning problems in uncertain flows by Barraquand and Latombe [19]. Rathbun et al. [20] report the use of evolutionary algorithms to plan paths of Unmanned Aerial Vehicles (UAV) in an airspace with uncertain obstacles. Wang et al. [21] perform path planning of autonomous vehicles in dynamic and uncertain ocean currents using an ensemble approach. The authors solve the deterministic Boundary Value Problem (BVP) for each member of the ensemble to compute the statistics of optimal trajectories. Considering all of these approaches, on the one hand, the extension of graph-based methods is not suitable for dynamic environments as their cost increases exponentially and there is a lack of optimality guarantee. On the other hand, the Monte Carlo and ensemble approaches can have slow convergence and prohibitive costs that increase with the complexity of uncertainty. For optimal path planning in dynamic stochastic environments, fundamental and efficient stochastic PDEs (S-PDEs) are needed.

In what follows, we first outline the problem statement, present our exact planning level-set S-PDEs and new efficient stochastic DO level-set PDEs (Section 2). Next, we showcase applications that validate and demonstrate the capabilities of our equations (Section 3). Finally, we provide some concluding remarks (Section 4).

2. Stochastic Time-Optimal Planning PDEs 2.1. Problem Statement

Consider an open set $D \in \mathbb{R}^{n_D}$ ($n_D=2$ or 3 for 2-D or 3-D in space), time $t \in [0,\infty)$ and a probability space $(\Omega, B, P)$ where $\Omega$ is the sample space, $B$ $\sigma$-algebra associated with $\Omega$, and $P$ is a probability measure. Starting at $t=0$, let a vehicle (P) navigate in D from $x_s$ to $x_f$ with a nominal speed $F(\bullet)>0$ under the influence of a stochastic dynamic flow-field $v(x, t;\omega):D \times [0,\infty)$, where $\omega \in \Omega$ is a random event. Let $X_P(x_s,t;\omega)$ be a general continuous trajectory from $x_s$ to $x_f$ (FIG. 3-1). The main notation is provided in Table 1.

FIG. 3-1. Schematic of stochastic time-optimal path planning setup: Our goal is to compute the distribution of reachability fronts for vehicles starting from $x_s$ in an uncertain flow-field $v(x,t;\omega)$, and the distribution of time-optimal paths $X_P(x_s,t;\omega)$ to $x_f$. The effective velocity, U experienced by the vehicle is the vector sum of the vehicle's forward motion $F(t)\hat{n}(t)$ and the background flow V.

The main notation is provided in Table 1.

Our goal is to predict the stochastic reachability fronts and time-optimal paths.

2.2. Stochastic Level-Set Partial Differential Equations

We approach the above stochastic time-optimal path planning problem starting with the exact level-set PDEs for deterministic path planning [7]. Here, the source of stochasticity is the uncertain dynamic flow $v(x,t;\omega)$ (in comparison, the vehicle speed was artificially made stochastic for energy optimization in [11]). The stochastic reachability front for P is thus governed by the stochastic Hamilton-Jacobi (HJ) level-set equation $$\frac{\partial \phi(x,t;\omega)}{\partial t} + F(t)|\nabla \phi(x,t;\omega)| + v(x,t;\omega) \cdot \nabla \phi(x,t;\omega) = 0, \quad (1)$$

with the initial condition $\phi(x,0;\omega)=|x-x_s|$ and, where needed, open boundary conditions such as $$\left.\frac{\partial^2 \phi(x,t;\omega)}{\partial n^2}\right|_{\partial D} = 0,$$

where n is the outward normal to the boundary $\delta D$, $\omega$ is a random event, and $\phi$ is the reachability-front-tracking scalar level-set field (e.g., signed distance function). For every $\omega$, the optimal arrival-time $T^*(x_f;\omega)$ at $x_f$ is obtained by integrating Eq. (1) until the first time t such that $\phi(x_f,t;\omega) \leq 0$. The corresponding optimal trajectory $X^*_P(x_s,t;\omega)$ is then given by the particle backtracking equation (where $\phi$ is differentiable)

$$\frac{dX_P^*(x_s,t;\omega)}{dt} = -v(X_P^*(x_s,t;\omega),t;\omega) - F(t)\frac{\nabla \phi(X_P^*(x_s,t;\omega),t;\omega)}{|\nabla \phi(X_P^*(x_s,t;\omega),t;\omega)|},$$

$$0 \leq t \leq T^*(x_f;\omega) \text{ and } X^*_P(x_s,T^*;\omega)=x_f \quad (2)$$

Solving the S-PDEs (1) and (2) would fulfill our goal. Eq. (1) can be integrated by direct Monte Carlo methods; however, the computational cost of such a method is prohibitive for practical applications. Classic reduced-order stochastic methods could be utilized [22-25]. However, due to the variable propulsion and advection terms, and the highly dynamic flows, they can sometimes diverge or be inefficient. We thus employ a dynamic stochastic order reduction, specifically the Dynamically Orthogonal (DO) field equations [26,27] that were shown to be an instantaneously optimal reduction using differential geometry arguments [28]. Next, we obtain these efficient stochastic DO level-set equations.

2.3. Stochastic Dynamically Orthogonal Level-Set Equations for Uncertain Flow Fields A brief overview of the DO theory is provided in Appendix A. As mentioned previously, in [11] we obtained the stochastic DO level-set equations when the vehicle-speed $F(t)$ in Eq. (1) was made stochastic (i.e., $F(t) \to F(t;w)$).

TABLE 1

| | | Relevant notation |
|---|---|---|
| i, j | $\in \mathbb{N}$ | Stochastic subspace index |
| F | $\in \mathbb{R}^+$ | Vehicle speed |
| $D$ | $\in \mathbb{R}^{n_D}$ | Physical domain |
| $n_D$ | $\in \mathbb{N}$ | Dimension of $D$ |
| $n_x$ and $n_y$ | $\in \mathbb{N}$ | Number of discrete grid points in the x-direction and y-direction |
| $n_g$ | $\in \mathbb{N}$ | Total number of discrete grid points in $D$ |
| $n_{s,\phi}$ | $\in \mathbb{N}$ | Dimension of the stochastic subspace of $\phi$, the level-set scalar field |

TABLE 1-continued

Relevant notation

| Symbol | Set | Description |
|---|---|---|
| $n_{s,v}$ | $\in \mathbb{N}$ | Dimension of the stochastic subspace of v, the velocity vector field |
| $Y_i$ | $\in \mathbb{R}$ | Random variable describing the PDF of the orthonormal level-set ($\phi$) modes $\tilde{\phi}_i$ |
| $\mu_i$ | $\in \mathbb{R}$ | Random variable describing the PDF of the orthonormal velocity (v) modes $\tilde{v}_i$ |
| $n_r$ | $\in \mathbb{N}$ | Number of Monte Carlo realizations of the level-sets (and velocity vector fields) |
| r | $\in \mathbb{N}$ | Realization index |
| v | $\in \mathbb{R}^{n_D n_g}$ | Velocity vector field |
| $\bar{v}$ | $\in \mathbb{R}^{n_D n_g}$ | Mean velocity vector field |
| $\tilde{v}$ | $\in \mathbb{R}^{n_D n_g}$ | DO mode i of v: Dynamically orthogonal basis for the stochastic subspace of v |
| $\phi$ | $\in \mathbb{R}^{n_g}$ | Level-Set field |
| $\bar{\phi}$ | $\in \mathbb{R}^{n_g}$ | Mean Level-Set field |
| $\tilde{\phi}_i$ | $\in \mathbb{R}^{n_g}$ | DO mode i of $\phi$: Dynamically orthogonal basis for the stochastic subspace of $\phi$ |
| $C_{Y_i Y_j}$ | $n_{s,\phi} \times n_{s,\phi}$ | Covariance matrix between $Y_i$ and $Y_j$ for i, j = 1 ... $n_{s,\phi}$ |
| $C_{\mu_j Y_k}$ | $n_{s,v} \times n_{s,\phi}$ | Covariance matrix between $\mu_j$ and $Y_k$ for j = 1 ... $n_{s,v}$ and k = 1 ... $n_{s,\phi}$ |
| $\Omega$ | | Sample space of uncertain velocity |
| $\mathcal{B}$ | | σ-algebra associated with $\Omega$ |
| $\mathcal{P}$ | | Probability measure that returns the probability of events in $\mathcal{B}$ |
| $\mathbb{E}[\ ]$ | $\in \mathbb{R}^{n_g}$ | Expectation operator returning the mean of • |
| $\langle\ ,\ \rangle$ | $\in \mathbb{R}$ | Spatial inner-product operator between any two fields |
| $\omega$ | $\in \Omega$ | A random event |
| $x_s, x_f$ | $\in \mathcal{D}$ | Start and final target locations |
| $X_P^*(x_s, t; \omega)$ | $\in \mathcal{D} \times [0, \infty)$ | Stochastic time optimal path from $x_s$ to $x_f$ corresponding to the random event $\omega$ |
| $T^*(x_f; \omega)$ | $\in \mathbb{R}^+$ | Optimal arrival time at target $x_f$ corresponding to the random event $\omega$ |

Here, the difference is that we have a deterministic F(t) and the stochasticity comes from the uncertain flow-field v(x,t; ω). This stochastic flow-field can be computed before solving the stochastic level-set equations and considered as an external forcing to the S-PDE (1).

Let us introduce DO decompositions to the uncertain flow-field v and the stochastic level-set φ as $$v(x, t; \omega) = \bar{v}(x, t) + \sum_{j=1}^{n_{s,v}} \mu_j(t; \omega) \tilde{v}_j(x, t) \quad (3)$$

$$\phi(x, t; \omega) = \bar{\phi}(x, t) + \sum_{i=1}^{n_{s,\phi}} Y_i(t; \omega) \tilde{\phi}_i(x, t), \quad (4)$$

where $\mu_j(t;\omega)$, $\forall j=1 \ldots n_{s,v}$, and $y_i(t;\omega)$, $\forall i=1 \ldots n_{s,\phi}$, are zero-mean stochastic processes that represent the generally complex probability density functions of the velocity and level-set fields respectively.

Henceforth, we drop the spatial and temporal variables in parenthesis for brevity of notation. We use repeated indices to indicate a summation over $n_{s,v}$ velocity DO modes or $n_{s,\phi}$ level-set DO modes, as the case may be. We also define $\gamma \equiv |\nabla \phi|$.

Substituting Eqs. (3) and (4) in Eq. (1), we obtain $$\frac{\partial \bar{\phi}}{\partial t} + Y_i \frac{\partial \tilde{\phi}_i}{\partial t} + \tilde{\phi}_i \frac{dY_i}{dt} = -F\gamma - (\bar{v} + \mu_j \tilde{v}_j) \cdot \nabla(\bar{\phi} + Y_i \tilde{\phi}_i). \quad (5)$$

We then derive the mean equation by applying the expectation operator to Eq. (5), the coefficient equations by projecting Eq. (5) onto the modes $\tilde{\phi}_i$, and the mode equations by multiplying Eq. (5) with $Y_i$ and then applying the expectation operator. We provide the detailed derivation in Wei [29]. The results are as follows:

$$\frac{\partial \bar{\phi}}{\partial t} = -\left[F\mathbb{E}[\gamma] + \bar{v} \cdot \nabla \bar{\phi} + C_{\mu_j Y_i} \tilde{v}_j \cdot \nabla \tilde{\phi}_i\right], \quad (6a)$$

$$\frac{dY_i}{dt} = \quad (6b)$$
$$-\langle F(\gamma - \mathbb{E}[\gamma]) + Y_k \bar{v} \cdot \nabla \tilde{\phi}_k + \mu_j \tilde{v}_j \cdot \nabla \bar{\phi} + \tilde{v}_j \cdot \nabla \tilde{\phi}_k (\mu_j Y_k - C_{\mu_j Y_k}), \tilde{\phi}_i \rangle,$$

$$\frac{\partial \tilde{\phi}_i}{\partial t} = Q_i - \langle Q_i, \tilde{\phi}_n \rangle \tilde{\phi}_n, \quad (6c)$$

Where $Q_i = -C_{Y_j Y_i}^{-1} [F\ \mathbb{E}[Y_j \gamma] + C_{Y_j \mu_k} \tilde{v}_k \cdot \nabla \bar{\phi} + \mathbb{E}[Y_j \mu_k Y_l] \tilde{v}_k \cdot \nabla \tilde{\phi}_l] - \bar{v} \cdot \nabla \tilde{\phi}_i$, where C denotes the covariance matrix between the two stochastic variables indicated in the respective subscripts (Table 1).

Here, we do not consider a separate DO decomposition for the non-polynomial nonlinearity γ but choose to handle only that term realization-by-realization and compute the required statistical quantities $\mathbb{E}[\gamma]$ and $\mathbb{E}[z\gamma]$. Other approaches for handling the non-polynomial nonlinearity, viz., KL-Gamma and Taylor-Gamma [11] could also be utilized (not shown here).

The solution of DO Eqs. (6) provides reachability fronts for all realizations ω. The minimum arrival time for each realization is the first time t for which $\phi(x_f, t; \omega) \leq 0$. Subsequently, the stochastic particle backtracking Eq. (2) can be solved to obtain the time-optimal trajectories $X^*_P(x_s, t; \omega)$. The solution also provides the time-series of time-optimal headings $\hat{h}^*(t; \omega)$, again for all ω. In Section 3, we validate the solution obtained by the DO level-set Eq. (6) by comparing it with that obtained from direct Monte Carlo (MC) methods. We also showcase applications for predicting the stochastic reachability fronts, sets, and time-optimal trajectories for vehicles navigating in uncertain flow-fields.

2.4. Computational Costs

The computational cost of solving the level-set PDE (1) for ω fixed is commonly dominated by the cost of the advection term. Thus, the cost of a MC method scales with the number of realizations and grid points as $O(n_r, n_g)$. The cost of solving the stochastic DO level-set equations is also often dominated by the advection terms (by the velocity mean and modes). This cost scales as $O((n_{s,v}+1)(n_{s,\phi}+1)n_g)$ and is independent of $n_r$. $n_r$ only affects the cost of solving the coefficient Eq. (6b), which is simply an ODE independent of $n_g$. For typical values of $n_g$, $n_r$, $n_{s,\phi}$, and $n_{s,v}$ of realistic applications, the computational speed-up can be several orders of magnitude.

3. Applications

We apply the efficient stochastic DO level-set PDEs to compute stochastic reachability fronts and time-optimal paths in three test cases. They correspond to different stochastic flow configurations: (i) a simple canonical steady front where only the strength of the flow is uncertain, (ii) a stochastic dynamic barotropic quasi-geostrophic double-gyre circulation, and (iii) a stochastic flow past a circular island. We employ the first test case to verify the solution of the DO equations by comparing it with its corresponding Monte Carlo (MC) solution. In all test cases, we describe and study the variability in reachability fronts and time-optimal paths. The numerical parameters are listed in Table 2.

3.1. Test Case 1: Stochastic Steady-Front with Uncertain Flow Strength

The first test case is a canonical flow a steady zonal jet with uncertain flow strength. In addition to being a good candidate for developing and testing numerical schemes, this flow scenario is commonly encountered in the ocean. For example, the crossing of a shelfbreak front [15] or of channels [16] can be idealized by this canonical flow. Hence,

TABLE 2

Numerical parameters for all three test cases
(notation defined in Table 1).

| Test Case | $n_x$ | $n_y$ | dx | dy | dt | $n_r$ | $n_{s,v}$ | $n_{s,\Phi}$ |
|---|---|---|---|---|---|---|---|---|
| 1 | 300 | 150 | 1 | 1 | 5e−2 | 2000 | 1 | 50 |
| 2 | 100 | 100 | 0.01 | 0.01 | 1e−5 | 5000 | 5 | 50 |
| 3 | 240 | 90 | 0.067 | 0.067 | 1e−2 | 10000 | 8 | 50 |

Studying the properties of time optimal paths in such flows is a valuable first step for planning in realistic ocean flows later on.

The domain, flow configuration (mean, modes, and coefficients), and start and end points are provided in FIG. 3.2.

FIG. 3.2. Mean, Mode, and PDF of coefficient for the DO decomposition of the velocity field used in Test Case 1: The zonal jet is from West to East between y=40 and y=60, and has an uncertain strength of uniform density distribution with lower limit 0.5 and upper limit 1.5. The velocity is 0 elsewhere in the domain. The start point is marked with a circular marker and three end points with a star marker.

The front is a steady jet flow from west to east, that is confined and constant in the region 40<y<60. The strength of the flow is a random variable uniformly distributed from 0.5 to 1.5 within the jet proper. The flow is zero elsewhere in the domain. To represent the stochastic steady front with a uniformly distributed uncertain strength, we need only one DO mode for velocity, i.e., $n_{s,v}=1$. We utilize $n_r=2,000$ realizations to represent the uniform PDF of flow strength (see FIG. 2a). We consider missions with a vehicle moving at a non-dimensional nominal speed of $F(t)=1$, $\forall t=[0,\infty)$. The start point is (150,20) and the three targets are (90,80), (150,80), and (210,80). We compute the reachability fronts and sets by solving the stochastic DO level-set Eqs. (6), and time-optimal paths by solving the backtracking Eq. (2).

First, we verify the solution of Eqs. (6) by comparing it to the solution of Eq. (1) computed by the MC method. Then, we study the properties of the reachability fronts, sets and time-optimal paths.

3.1 Verification of the DO Solution

To verify the DO solution, we first compute the corresponding MC solution and then compare the two. The MC solution is obtained by solving the level-set PDE for each of the $n_r$ realizations of the velocity field separately. We look at the differences in arrival time at the target (210,80) and in the reachability front of all realizations. FIG. 3 shows the histogram of relative error in arrival time at the target (210,80).

FIG. 3. Cumulative histogram of relative error in arrival-time (between DO and MC solutions) for Test Case 1: 82.80% realizations have a relative error in arrival-time (between the DO and MC solutions) of less than 0.0008 (0.1%), and the maximum relative error across all realizations is 0.0024 (0.24%). This error is negligible for the 4 orders of magnitude computational speed-up achieved by the DO level-set method.

The arrival times computed by the DO method are nearly identical to the corresponding times computed by the MC method. 26.55% of the realizations have zero error and 82.8% of realizations have less than 0.1% error in arrival times. The maximum error is 0.24%, which is 0.15 non-dimensional time or three discrete time-steps. Overall the error in arrival-time is negligible, especially considering that the DO method is 4 orders of magnitude faster than the MC method.

To quantify the difference in the reachability front, we utilize the discrete Frechet distance [11, 30, 31] which measures the maximum distance between two discrete curves in 2-D. FIG. 3-4 shows the discrete Frechet distance normalized by the grid spacing for all realizations, plotted at four non-dimensional times. All Frechet distances are less than the grid spacing, which indicates that the reachability front computed by the DO and MC methods are identical and the errors are less than or of the order of the spatial discretization. We also compared qualitatively by plotting the reachability fronts computed by both methods for some characteristic realizations and observed that DO and MC compute identical reachability fronts (not shown here, see [29]). We thus verified that the reachability front and arrival times computed using the DO level-set equations are accurate for our applications.

FIG. 3-4. Frechet distance (normalized) between reachability fronts computed by the MC and DO methods for Test Case 1. The difference between the reachability front computed by DO and MC increases with time, but always remains less than the spatial resolution. The difference can be further reduced by increasing the number of DO modes if the application requires higher precision. Frechet distances are normalized by grid spacing.

All Frechet distances are less than the grid spacing, which indicates that the reachability front computed by the DO and MC methods are identical and the errors are less than or of the order of the spatial discretization. We also compared qualitatively by plotting the reachability fronts computed by both methods for some characteristic realizations and observed that DO and MC compute identical reachability fronts (not shown here, see [29]). We thus verified that the reachability front and arrival times computed using the DO level-set equations are accurate for our applications.

3.2 Analysis of Stochastic Reachability Fronts and Time-Optimal Paths

Figures 2, 3, 4, 5, 5A:
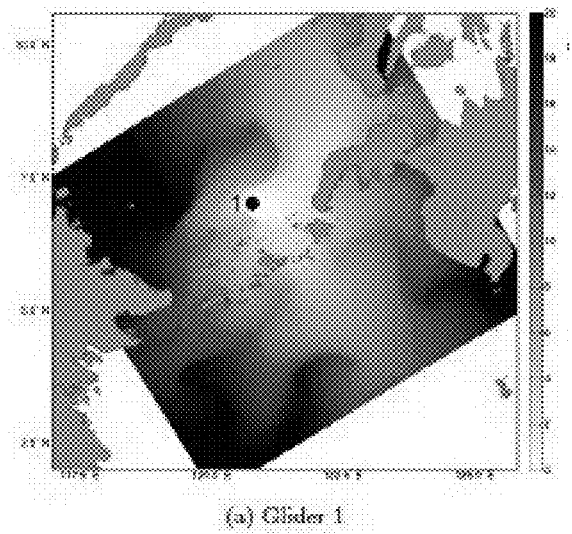

FIG. 3-5 shows the distribution of the stochastic reachability fronts computed by solving the stochastic DO level-set Eqs. (6).

Each reachability front is colored with the flow strength of that realization. The six panels show snapshots of the spatial distribution of the reachability fronts at six non-dimensional times.

There is no uncertainty in the flow field outside the jet proper. Hence, the reachability fronts for all realizations are identical until the time when they first experience the uncertain flow. As shown in FIG. 3-5b, the part of the reachability fronts in the jet proper spreads out while the part that has not yet reached the jet remains identical for all realizations. As time progresses, the spread in the reachability fronts increases as each flow realization has a different flow strength.

FIG. 3-5. Stochastic reachability fronts for Test Case 1: The reachability front for each of the flow realizations is colored with the strength of that flow realization.

(FIG. 3-5c-f). Most notably, there is a locus of points where pairs of reachability fronts corresponding to different flow realizations cross-over in FIGS. 3-5c and d. For target points downstream of this locus of cross-over points, the higher the flow strength, the faster the vehicle arrives at the target. On the other hand, for target points upstream of this locus, the lower the flow strength of the stochastic jet, the faster the arrival-time at the target. In the former situation, the flow aids the motion of the vehicle to the target and thus stronger flows are favorable; however, in the latter situation, the flow hinders the motion of the vehicle to the target and thus weaker flows are favorable. By t=75 (FIG. 3-5d), vehicles in all flow realizations have arrived at the target (150,80). By t=100 (FIG. 3-5e), vehicles in all flow realizations have crossed the target (210,80) also and the reachability front of the weakest flow strength is just arriving at the target (90,80). By t=125 (FIG. 3-5f), vehicles of almost all flow realizations have crossed (90,80).

FIG. 3-6 shows the stochastic time-optimal paths for all three targets. As before, each path is colored with the strength of the flow realization corresponding to that path. FIG. 3-6. Stochastic time-optimal paths for Test Case 1: All time-optimal paths are colored with the flow strength of the corresponding flow realization. The variability of the time-optimal paths is greatest for the target point upstream of the start point.

The spread of the paths increases progressively as the target moves upstream from the start point. The spatial distribution of the time-optimal paths to target (210,80) is narrow. In other words, the sensitivity of the time-optimal paths to errors in the flow field prediction is low. On the other hand, the spatial distribution of the time-optimal paths to (90,80) is wide. The sensitivity of the paths to errors in the flow field prediction is higher than the other two targets. For this test case, the more upstream the end point is, the larger the effect of the flow strength uncertainty is on the time-optimal paths.

non-dimensional stochastic barotropic quasi-geostrophic model (e.g., [32,33]), written as conservation of momentum in the Langevin form, $$\frac{\partial v(x, t; \omega)}{\partial t} + \nabla \cdot (v(x, t; \omega)v(x, t; \omega)) + f\hat{k} \times v(x, t; \omega) = \qquad (7a)$$
$$-\nabla p(x, t; \omega) + \frac{1}{\text{Re}}\nabla^2 v(x, t; \omega) + a\tau,$$

$$\nabla \cdot v(x, t; \omega) = 0 \qquad (7b)$$

$$v(x, 0; \omega) = v_0(x; \omega), \qquad (7c)$$

where Re is the Reynold's number, f is the Coriolis coefficient, and a is the strength of the wind stress. For the Coriolis coefficient, we employ a β-plane approximation $f=f_o+\beta y$ with $f_0=0$. We utilize a horizontal length scale $L=10^6$ m, vertical length scale $D=10^3$ m, velocity scale U=1.98 cm/s, time scale T=1.6 yrs, density ρ=1025 kg/m3, stress scale $\tau_0=0.16$ MPa, eddy viscosity $A_H=19.77$ m²/s, and $\beta_0=1.977\times10^{11}$ ms. This leads to non-dimensional numbers $$\text{Re} = \frac{UL}{A_H} = 1000, a = \frac{\tau_0^Z L}{\rho D U^2} = 1{,}000 \text{ and } \beta = \frac{\beta_0 L^2}{U} = 1{,}000.$$

A deterministic non-dimensional steady zonal wind stress $$\tau = \left[-\frac{1}{2\pi}\cos 2\pi y, 0\right]^T,$$

forces the flow in the basin. The DO equations corresponding to the stochastic barotropic quasi-geostrophic dynamics Eq. (7) are provided in Appendix A.2.

We simulate the flow in a basin of size 1000 km×1000 km by solving Eq. (A.8) and using the relevant numerical parameters in Table 2. The barotropic zonal and meridional velocities are initialized (Eq. (7c)) from a spatial correlation kernel with a length scale of 500 km and uniform variance. Five velocity DO modes and 5000 DO realizations are utilized (Table 2), and the simulation is spun-up for 1 non-dimensional time, i.e., 1.6 yrs. For path planning, we utilize the next 13.5 days of stochastic flow. We consider a vehicle with a nominal speed of 40 cm/s ([34], e.g.). FIG. 3-7 illustrates the DO mean, DO modes, and marginal PDF of the DO coefficients for the flow field at the beginning (t=0 days) and end (t=13.5 days) of the planning horizon.

FIG. 3-7. Stochastic flow field for Test Case 2: The mean field and variance of the DO coefficients, then the 5 DO mode fields and the marginal PDF of the corresponding DO coefficients of the stochastic double-gyre flow field are shown at the beginning and end of the planning horizon. Streamlines are overlaid on a color plot of the flow magnitude (color axis in cm/s) for the DO mean and modes. The x- and y-axes have units of 1000 km. Realizations can be constructed by adding the mean to the sum of the product of each mode with a sample from the PDF of the corresponding coefficient.

Over the 13.5 day period, the mean flow is a strong zonal jet from east to west with a cyclonic gyre to the north of the jet and an anti-cyclonic gyre to the south (FIG. 3-7 Mean). From the variance of the coefficients (FIG. 3-7 Variance of Coeffs.), we see that Mode 1 has the most stochastic energy and explains the broad features of the uncertainty in the flow. Mode 1 has two zonal jets and three gyres (FIG. 3-7 Mode 1). The two jets are located north and south of the zonal jet of the mean. The stochastic coefficient corresponding to this mode has a bimodal distribution. For positive coefficients, the southern jet (0.2<y<0.5) contributes a flow from west to east and the northern jet (0.5<y<0.8) from east to west. For negative coefficients, the direction of this contribution is reversed. The northern and southern jets can be locally considered to be similar to the stochastic front crossing example (Test Case 1). Higher positive (negative) coefficients correspond to greater variation from the mean in the (opposite) direction of the modes. Modes 2-5 and their coefficients contribute to non-symmetric flow realizations (FIG. 3-7 Modes 2-5), such as the non-symmetric wind-driven gyres seen in the North Atlantic (e.g., [35,36]). Two realizations with most negative Coeff.1 (Realiz. #1) and with most positive Coeff. 1 (Realiz #5000) are shown in FIG. 3-8.
FIG. 3-8. Two realizations of the stochastic flow field for Test Case 2: Streamlines of the flow are overlaid on a color plot of the flow magnitude. Realiz. #1 corresponds to the most negative Coeff. 1 and realiz #5000 to the most positive Coeff. 1. All such realizations are integrated in time by one DO flow field simulation.

Both these and 4998 other realizations are all simulated y one DO flow field simulation 3.3 Analysis of Stochastic Reachability Fronts and Time-Optimal Paths
Now we plan stochastic time-optimal paths from a start point (0.2, 0.2) to the target (0.4, 0.8). FIG. 3-9 illustrates the evolution of stochastic reachability fronts (i.e., zero level-set contours) over the planning horizon, showing snapshots at nine discrete times.

FIG. 3-9. Stochastic reachability fronts for Test Case 2: The reachability front for each of the flow realizations is colored with its corresponding velocity DO coefficient 1, $\mu_1(t;\omega)$. Time t is in days, and x- and y-axes are in thousands of km.

Each flow realization has a reachability front and all such fronts are computed by one DO simulation. Overall, the reachability front gets advected by the mean flow, but individual realizations experience the effect of the modes and coefficients of the flow. As such, the reachability fronts spread, leading to a density distribution (FIG. 3-9). The mean double-gyre and clockwise in the cyclonic northern gyre. To study the spread, we look at FIG. 3-9. Here, the reachability fronts are overlade on streamlines of velocity DO mode 1, $\tilde{v}_1(x,t)$ and colored with velocity DO coefficient 1, $\mu_1(t;\omega)$. The initial spreading of the reachability fronts (FIG. 3-9b-d) in the southern part of the domain (y<0.5) is due to the flow contribution by the southern jet of velocity DO mode 1. The reachability fronts corresponding to positive coefficients are advected to the east more than those corresponding to negative coefficients. The spreading of the reachability fronts in the northern part of the domain (y>0.5) (FIG. 3-9f-i) is due to the flow contribution by the northern jet of velocity DO mode 1. Here, the effect on the reachability fronts is opposite to the effect due to the southern jet, i.e., more positive coefficients are advected to the west more than the realizations corresponding to more negative coefficients. The spread of the reachability fronts in the strong mean zonal jet (approximately 0.45<y<0.55) is not affected much, as the contribution to the flow by all velocity modes in this region is weak (FIG. 3-9c-f). The finer details in the shape of the reachability fronts are due to contributions of the velocity modes with lower stochastic energy (modes 2-5).

Next, we study the spatial distribution of the time-optimal paths (FIG. 3-10).
FIG. 3-10. Stochastic time-optimal paths for Test Case 2: The time-optimal paths are colored with (a) the velocity DO coefficient 1, $\mu_1(t;\omega)$, and (b) the arrival time (in days) at the target shown. x- and y-axes are in thousands of km.

In FIG. 3-10a, each path is colored with the corresponding flow realization's velocity DO coefficient 1, $\mu_1(t;\omega)$. In FIG. 10b, each path is colored with the arrival-time for that path. All paths cross the strong mean zonal jet by riding the anti-cyclonic southern gyre first and then the cyclonic northern gyre. The spread in the paths is a result of the variability in the reachability fronts as described above. The most negative coefficient $\mu_1(t;\omega)$ defines the western edge of the spatial distribution of paths and the most positive $\mu_1(t;\omega)$ defines the eastern edge as seen in FIG. 3-10a. When paths are colored by the arrival time (FIG. 3-10b), one sees that the arrival time for paths that are very different spatially (and corresponding to different flow realizations) can be nonetheless similar. This is due to the complex PDF of the stochastic velocity field. In this test case, the arrival time range varies from 12.1 to 13.6 days. For reference, under no flow conditions, a vehicle with a speed of 40 cm/s would take 18.3 days to travel between the start and target points considered in this test case 2.

The examples so far also show that the time-optimal path can be very sensitive to the uncertainty in the flow field. A strength of the stochastic DO level-set equations is that they allow the rigorous prediction of this sensitivity in a computationally efficient manner. The examples also raise the need of computing risk-optimal paths in uncertain flows, a topic addressed in [37].

3.4 Test Case 3: Stochastic Flow Past a Circular Island
In the third test case, we consider time-optimal path planning in a stochastic flow behind a circular island in a channel. FIG. 3-11 shows the domain and flow configuration (vorticity overlaid with streamlines). The flow is governed by the stochastic barotropic quasi-geostrophic Eq. (7c), but with f=0 and $\tau=[0, 0]^T$.

FIG. 3-11. Flow field for Test Case 3: Row A shows the DO mean flow, with streamlines overlaid on colored vorticity. Row B shows the same for mode 1 and mode 2 fields. Row C shows the marginal PDF of coefficients 1 and 2. Row D shows the decay in variance of the first eight modes. Each column is a snapshot, at the time specified at the top. The starting point of the propelled vehicle is indicated by a circular marker and the 6 targets by star markers.

We model a channel 16 km×6 km with a circular island of diameter 1 km. Here, we utilize a turbulent eddy viscosity AH=10 m2/s, length scale L=1 km, velocity scale U=1 m/s, and time scale T=1000 s, leading to a non-dimensional Reynold's number of 100. We consider a deterministic barotropic inlet into the channel of $v=[1, 0]^T$ m/s on the western boundary. The northern and southern boundaries have free-slip wall conditions and the eastern boundary has open conditions. The barotropic initial conditions are generated from a covariance kernel with a spatial correlation length scale of 5 km in the zonal direction and 2 km in the meridional direction. 8 velocity DO modes and 10,000 DO realizations are employed here (Table 2). The simulation is spun-up until stochastic eddies are generated downstream from the island. Then, the flow for 1.5 h (non-dimensional time of 5.4) is considered for path planning.

FIG. 3-11 shows the velocity mean (row A), the first two velocity DO modes (row B), marginal PDF of the corresponding DO coefficients (row C), and the variance of first eight DO modes (row D). Each column of FIG. 3-11 shows the above quantities at t 0, 2700, and 5400 s. From the decay in variance (row D), we see that most of the flow uncertainty is captured by the DO modes 1 and 2, and hence other modes and coefficients are not shown (but we used 8 modes). The mean flow accelerates to the south and north of the island as it is confined by the channel and has almost zero magnitude in the lee just behind the island. The stochastic initial conditions result in uncertainty in the eddy strength, shedding frequency, and whether the eddies are first shed to the north or south of the island. The modes 1 and 2 have eddies downstream from the island which together with the coefficients explain the uncertainty in the flow downstream.

FIG. 3-12 shows two realizations corresponding to the most negative (Realiz. #1) and positive (Realiz. #10,000) coeff. 1.

FIG. 3-12. Two realizations of the stochastic flow field for Test Case 3: Streamlines are overlaid on a color plot of vorticity. Realiz. #1 corresponds to the most negative Coeff. 1 while realiz. #10,000 to the most positive Coeff. 1. All such realizations are integrated in time by one DO flow field simulation.

We see that in Realiz. #1, eddies shed to the north of the island while for realiz. #10,000, they shed to the south of the island.

3.5 Analysis of Stochastic Reachability Fronts and Time-Optimal Paths

Now we plan stochastic time-optimal paths for navigating a propelled vehicle with a nominal speed of 1 m/s from a start point (2,3) upstream of the island to six possible target points (see FIGS. 3-11-12: the start point is indicated by circular markers and targets by star markers). FIG. 3-13 shows the evolution of the stochastic reachability front overlaid on streamlines of velocity modes 1 (column A) and 2 (column B).

FIG. 3-13. Stochastic reachability fronts for Test Case 3: In column A (B) the reachability fronts are overlaid on the velocity streamlines of Mode 1 (2) and colored by coefficient 1 (2). Rows i-vi are snapshots at the indicated times. Starting point of the propelled vehicle is indicated by a circular marker and the six possible targets by star markers.

In each plot, we color the reachability fronts with their respective coefficients. The level-sets do not grow west of the start point as the vehicle speed and the mean flow there are equal and opposite, making the reachability front stationary at the start point. Until t 1800 s, the reachability fronts for all flow realizations are almost identical as the flow uncertainty in the reachable sets is insignificant (FIG. 3-13A.i, B.i). The shape of the reachability fronts is set by the mean flow between t 1800 and 2400 s. The reachability front grows normal to itself at the nominal vehicle speed in the close-to-zero mean flow region behind the cylinder (FIG. 3-13A.ii, B.ii). After t 1800 s, the spreading of the reachability fronts due to the effect of velocity DO modes start. The mean flow advects all the reachability fronts to the east. From t=3000 s, the reachability fronts start splitting into two groups roughly corresponding to positive and negative values of coefficient 1. At t=3600 s, the group of reachability fronts with positive coefficient 1 have a kink near y 3.5 and those with negative coefficient 1 have a kink near y 2.5 corresponding to the eddy direction (FIG. 3-13A.iv). At t=4500 s, the reachability fronts have two groups corresponding to positive and negative coefficient 2 (FIG. 3-13A.v). At t=5400 s, the behavior is similar to t=3600 s, with two distinct groups of reachability fronts corresponding to positive and negative values of coefficient 1.

Next, we study the spatial distribution of the time-optimal paths (FIG. 3-14).

FIG. 3-14. Stochastic time-optimal paths for Test Case 3: Column A (B) has paths colored by velocity coefficient 1 (2). Row i shows all paths to target 2, row ii to target 5, and row iii to the other 4 targets. The x- and y-axes are in kms.

In FIG. 3-14, column A has all paths colored with velocity coefficient 1, and column B has all paths colored with velocity coefficient 2. Row i has all paths to target 2, row ii to target 5, and row iii to all other targets. Paths to targets 1, 3, 4, and 6 (row iii) have little variance, since these paths are mostly outside the regions of flow uncertainty. Paths to target 5 (row ii) have the maximum variance followed by paths to target 2 (row i), as these are affected by the flow uncertainty. There are two sets of paths: one set that goes north of the island and another that goes south. The combination of velocity modes and coefficients creates flow realizations that lead to northern paths or southern paths. This bifurcation mirrors the uncertainty in eddy shedding downstream from the island. An error in estimating the direction of eddy shedding will result in large errors in the time-optimal path predictions to targets 2 and 5 (e.g., north vs. south) for this test case. However, predictions to targets 1, 3, 4, and 6 are largely unaffected by such an error. This illustration quantitatively confirms the fact that sensitivity of path predictions depends not only on the flow itself but also on the target locations, and all such paths and sensitivities can one reachability front simulation is required for one start location and start time. The paths to multiple targets are obtained by solving the backtracking stochastic ODE Eq. (2), which is very inexpensive to solve.

FIG. 3-15 shows the distribution of arrival times at the six targets.

FIG. 3-15. Arrival time distribution at each of the six targets for Test Case 3: The distribution at targets 1 and 4, 2 and 5, and 3 and 6, are similar, respectively. The distributions at targets 1 and 3, and targets 4 and 6 are almost mirror images due to their symmetric spatial location north and south of the circular island, respectively.

As expected from the distributions of time-optimal paths, the distributions of arrival times at targets 1, 3, 4, and 6 are tighter compared to other two targets. Target 5 indeed has the most variance in arrival time, and the distribution is bimodal similar to the bimodal distribution of velocity DO coefficients 1 and 2.

4. Conclusion

We obtained and applied fundamental equations for time-optimal path planning in uncertain, dynamic and strong flows. We first presented the stochastic level-set PDEs that govern the exact evolution of reachability fronts for vehicles navigating in uncertain, strong, and dynamic flow fields. We then developed efficient stochastic dynamically orthogonal level-set PDEs that solve the above equations in a reduced dynamic subspace, providing several orders of magnitude computational speed-up when compared to direct Monte Carlo methods. To compute stochastic time-optimal paths, we utilized the governing stochastic particle backtracking ODE. We then applied the equations to compute stochastic reachability fronts and time-optimal paths in three different scenarios: a steady-front of uncertain strength, a stochastic double-gyre circulation, and a stochastic flow past a circular island. We utilized the first test case to verify that our DO level-set equations can compute the distribution of stochastic reachability fronts and time-optimal paths as accurately as traditional Monte Carlo methods. In the second case, we quantitatively explained the effect of the first DO velocity mode (with the most stochastic energy) on setting the shape and distribution of the reachability fronts and time-optimal paths. We also showed that the paths corresponding to different flow realizations can have large spatial differences but similar arrival times, due to the complex PDF of the stochastic velocity fields. In the third case, we described how the variance of time-optimal paths and arrival times depended mostly on the first two DO velocity modes. We showed that the variability could be large due to the uncertainty in estimating the direction of eddy shedding for targets directly downstream of an island. Importantly, all these paths are computed by one simulation of the stochastic DO level-set equations.

Overall, our analysis offers insights into the behavior of vehicles navigating in canonical uncertain flows often encountered in coastal ocean regions. In addition to computing stochastic reachability fronts and time-optimal paths, the new equations provide a rigorous framework for quantifying the sensitivity of time-optimal paths to variability and errors in flow field predictions. In the future, our methodology can be applied with realistic uncertainty flow predictions (e.g., [16, 38, 39]). The stochastic DO level-set equations can be augmented with decision theory to compute risk-optimal paths for vehicles navigating in uncertain flow fields. Even though we emphasized the navigation of autonomous vehicles in ocean flows, the methodology and equations are general: they can be utilized for aerial vehicles, land robots, or ships (e.g., [40]).

5. Dynamically Orthogonal Field Equations

In this appendix, we first outline generic Dynamically Orthogonal field equations and then provide the barotropic quasi-geostrophic DO equations. We refer to Table 1 for the notation.

5.1 Generic DO Equations

Prior to describing the Dynamically Orthogonal field equations [26, 27, 41], we first provide some definitions. For any two fields $\tilde{\psi}_1(x,t)$ and $\tilde{\psi}_2(x,t)$, the spatial inner product is defined as $$\langle \tilde{\psi}_1(\bullet,t), \tilde{\psi}_2(\bullet,t) \rangle = \int_D \tilde{\psi}_1(x,t)^T \tilde{\psi}_2(x,t) dx, \quad (A.1)$$

the orthogonal component operator as $$\Gamma_{\tilde{\psi}}^\perp G(x) = G(x) - \sum_{k=1}^{n_{s,\psi}} \langle G(\bullet), \tilde{\psi}_k(\bullet, t) \rangle \tilde{\psi}_k(x, t), \quad (A.2)$$

and the expectation operator as $$\mathbb{E}[\psi(x,t;\omega)] = \int_\Omega \psi(x,t;\omega) dP(\omega). \quad (A.3)$$

Consider the time evolution of a general stochastic continuous field $\psi(x,t;\omega)$ (e.g., $\psi(x,t;\omega) = \phi(x,t;\omega)$ for the level-set scalar field and $\psi(x,t;\omega) = v(x,t;\omega)$ for the velocity vector field), described by a S-PDE $$\frac{\partial \psi(x, t; \omega)}{\partial t} = \mathcal{L}[\psi(x, t; w), x, t; w]. \quad (A.4)$$

Where L is a general nonlinear operator. Introducing a generalized dynamic Karhunen-Loeve (KL) decomposition (a DO decomposition)

$$\psi(x, t; \omega) = \bar{\psi}(x, t) + \sum_{i=0}^{n_{s,\psi}} Y_i(t; \omega) \tilde{\psi}_i(x, t), \quad (A.5)$$

into (Eq. (A.4)), applying the expectation (Eq. (A.3)) and spatial inner-product (Eq. (A.1)) operators, and an orthogonality condition on the evolution of the stochastic subspace, $$\left\langle \frac{\partial \tilde{\psi}_i}{\partial t}, \tilde{\psi}_j \right\rangle = 0 \ \forall \ i, j, \quad (A.6)$$

we obtain the DO equations for the statistical mean $\bar{\psi}$, stochastic coefficients $Y_i$, and deterministic modes $\tilde{\psi}_i$ as $$\frac{\partial \bar{\psi}(x, t)}{\partial t} = \mathbb{E}[\mathcal{L}], \quad (A.7a)$$

$$\frac{\partial Y_i(t; \omega)}{\partial t} = \langle \mathcal{L} - \mathbb{E}[\mathcal{L}], \tilde{\psi}_i \rangle, \quad (A.7b)$$

$$\frac{\partial \tilde{\psi}_i(x, t)}{\partial t} = \sum_{j=1}^{n_{s,\psi}} C_{ij}^{-1} \Gamma_{\tilde{\psi}}^\perp \mathbb{E}[Y_j \mathcal{L}], \quad (A.7c)$$

where we have dropped (x,t) from the inner-product terms for brevity of notation. Here, the $n_{s,\psi}$ modes $\tilde{\psi}_i$ and stochastic coefficients $Y_i$ are dynamic and governed by differential equations, distinguishing them from classic empirical orthogonal functions and proper orthogonal decomposition approaches. These dynamic modes describe an evolving subspace, and the coefficients evolve the uncertainty within that dynamic subspace. For nonlinear dynamical systems, the intrinsic nonlinearities in Eq. (A.4) and the corresponding dynamics retained in Eqs. (A.7a)-(A.7c) often enable truncating the number of $n_{s,\psi}$ modes and coefficients to a much smaller number than the dimensions (spatial and stochastic) of the original discretization of Eq. (A.4). It is this dynamics and the adaptable size $n_{s,\psi}$ that allow the DO equations to accurately capture most of the stochasticity of the original variables [27, 42, 43].

5.2 Dynamically Orthogonal Quasi-Geostrophic Equations

In this appendix, we provide the Dynamically Orthogonal barotropic Quasi-Geostrophic equations that we utilized to generate stochastic flow fields. Detailed description of similar equations for Boussinesq dynamics, their derivation and numerical schemes are provided in [41] and the implementation is provided in [44]. The equations for the DO mean (Eqs. (A.8a), (A.8b)), coefficients (Eq. (A.8c)), and modes (Eqs. (A.8d), (A.8e)) of the S-PDE (7) are $$\nabla \cdot \bar{v} = 0, \quad (A.8a)$$

$$\frac{\partial \bar{v}}{\partial t} = \frac{1}{\text{Re}} \nabla^2 \bar{v} - \nabla \cdot (\overline{vv}) - C_{\mu_m \mu_n} \nabla \cdot (\tilde{v}_m \tilde{v}_n) - f \hat{k} \times \bar{v} - \nabla \bar{p} + a\tau, \quad (A.8b)$$

$$\frac{d\mu_i}{dt} = \mu_m \left\{ \frac{1}{\text{Re}} \nabla^2 \tilde{v}_m - \nabla \cdot (\tilde{v}_m \bar{v}) - \nabla \cdot (\bar{v} \tilde{v}_m) - \nabla \tilde{p}_m - f \hat{k} \times \tilde{v}_m, v_i \right\} - (\mu_m \mu_n - C_{\mu_m \mu_n}) \langle \nabla \cdot (\tilde{v}_m \tilde{v}_n), \tilde{v}_i \rangle, \quad (A.8c)$$

$$\nabla \cdot \tilde{v}_i = 0, \quad (A.8d)$$

$$\frac{\partial \tilde{v}_i}{\partial t} = Q_i^v - \langle Q_i^v \tilde{v}_k \rangle \tilde{v}_k, \quad (A.8e)$$

Where $$Q_i^v = \frac{1}{\text{Re}} \nabla^2 \tilde{v}_i - \nabla \cdot (\tilde{v}_i \bar{v}) - \nabla \cdot (\bar{v} \tilde{v}_i) - \nabla \tilde{p}_i - C_{\mu_i \mu_j}^{-1} M_{\mu_j \mu_m \mu_n} \nabla \cdot (\tilde{u}_m \tilde{u}_n),$$

where we have
dropped the parenthesis (x, t; ω) for brevity of notation. We solved Eqs. (A.8) to obtain the stochastic flow fields utilized in Test Cases 2 and 3 of the present paper (Section 3).

REFERENCES

[1] J. G. Bellingham, K. Rajan, Robotics in remote and hostile environments, Science 318 (5853) (2007) 1098-1102.

[2] T. B. Curtin, J. G. Bellingham, Progress toward autonomous ocean sampling networks, Deep-Sea Res. II 56 (3) (2009) 62-67.

[3] O. Schofield, S. Glenn, J. Orcutt, M. Arrott, M. Meisinger, A. Gangopadhyay, W. Brown, R. Signell, M. Moline, Y. Chao, S. Chien, D. Thompson, A. Balasuriya, P. F. J. Lermusiaux, M. Oliver, Automated sensor networks to advance ocean science, EOS Trans. AGU 91 (39) (2010) 345-346. http://dx.doi.org/10.1029/2010EO390001.

[4] P. F. J. Lermusiaux, Uncertainty estimation and prediction for interdisciplinary ocean dynamics, J. Comput. Phys. 217 (1) (2006) 176-199. http://dx.doi.org/10.1016/j.jcp.2006.02.010.

[5] Y. K. Hwang, N. Ahuja, Gross motion planning —a survey, ACM Comput. Surv. 24 (3) (1992) 219-291.

[6] S. M. LaValle, Planning Algorithms, Cambridge University Press, Cambridge, UK, 2006.

[7] T. Lolla, P. F. J. Lermusiaux, M. P. Ueckermann, Jr., P. J. Haley, Time-optimal path planning in dynamic flows using level set equations: theory and schemes, Ocean Dyn. 64 (10) (2014) 1373-1397. http://dx.doi.org/10.1007/s10236-014-0757-y.

[8] P. F. J. Lermusiaux, D. N. Subramani, J. Lin, C. S. Kulkarni, A. Gupta, A. Dutt, T. Lolla, P. J. Haley Jr., W. H. Ali, C. Mirabito, S. Jana, A future for intelligent autonomous ocean observing systems, in: The Sea, vol. 17, 2017. The Science of Ocean Prediction, Part 2, Special Issue, J. Marine Res. 75, in press.

[9] T. Lolla, M. P. Ueckermann, K. Yiğit, P. J. Haley Jr., P. F. J. Lermusiaux, Path planning in time dependent flow fields using level set methods, in: International Conference on Robotics and Automation, ICRA, 14-18 May 2012, 2012, pp. 166-173, http://dx.doi.org/10.1109/ICRA.2012.6 225364.

[10] T. Lolla, P. J. Haley Jr., P. F. J. Lermusiaux, Path planning in multiscale ocean flows: coordination and dynamic obstacles, Ocean Model. 94 (2015) 46-66. http://dx.doi.org/10.1016/j.ocemod.2015.07.013.

[11] D. N. Subramani, P. F. J. Lermusiaux, Energy-optimal path planning by stochastic dynamically orthogonal level-set optimization, Ocean Model. 100 (2016) 57-77. http://dx.doi.org/10.1016/j.ocemod.2016.01.006.

[12] W. Sun, P. Tsiotras, T. Lolla, D. N. Subramani, P. F. J. Lermusiaux, Pursuit-evasion games in dynamic flow fields via reachability set analysis, in: 2017 American Control Conference, ACC, Seattle, 2017, pp. 4595-4600, http://dx.doi.org/10.23919/ACC.2017.7963664.

[13] W. Sun, P. Tsiotras, T. Lolla, D. N. Subramani, P. F. J. Lermusiaux, Multiple-pursuer-one-evader pursuit evasion game in dynamic flow fields, J. Guid. Control Dyn. 40 (7) (2017). http://dx.doi.org/10.2514/1.G002125.

[14] T. Lolla, P. J. Haley Jr., P. F. J. Lermusiaux, Time-optimal path planning in dynamic flows using level set equations: Realistic applications, Ocean Dyn. 64 (10) (2014) 1399-1417. http://dx.doi.org/10.1007/s10236-014-0760-3.

[15] D. N. Subramani, P. J. Haley Jr., P. F. J. Lermusiaux, Energy-optimal path planning in the coastal ocean, J. Geophys. Res. Oceans 122 (2017) 3981-4003. http://dx.doi.org/10.1002/2016JC012231.

[16] D. N. Subramani, P. F. J. Lermusiaux, P. J. Haley Jr., C. Mirabito, S. Jana, C. S. Kulkarni, A. Girard, D. Wickman, J. Edwards, J. Smith, Time-optimal path planning: Real-time sea exercises, in: Oceans '17 MTS/IEEE Conference, Aberdeen, 2017, http://dx.doi.org/10.1109/OCEANS E.2017.8084817.

[17] M. P. Wellman, M. Ford, K. Larson, Path planning under time-dependent uncertainty, in: Proceedings of the Eleventh Conference on Uncertainty in Artificial Intelligence, UAI'95, Morgan Kaufmann Publishers Inc., San Francisco, Calif., USA, 1995, pp. 532-539. URL http://dl.acm.org/citation.cfm?id=2074158.2074219.

IV. Risk-Optimal Path Planning In Stochastic Dynamic Environments

1. Introduction

The present work is based on fundamental differential equations that govern the evolution of the reachability and time-optimal paths in strong and dynamic currents (Lolla et al., 2014b), and is related to energy-optimal paths (Subramani et al., 2015; Subramani and Lermusiaux, 2016). These equations were used to compute optimal paths, both in realistic data-driven simulations (Lolla et al., 2014a; Subramani et al., 2017a) and with real vehicles (Subramani et al., 2017b). They were also employed to solve pursuit evasion problems (Sun et al., 2017a,b). The input probabilistic predictions of flow fields are obtained from the variance-optimal reduced-order sto-chastic dynamically orthogonal equations (Sapsis and Lermusiaux, 2009; Ueckermann et al., 2013; Feppon and Lermusiaux, 2018). The resulting stochastic PDEs (S-PDEs) for time-optimal path planning have some advantages (Subramani et al., 2018): (i) for a given stochastic environmental flow prediction, the stochastic time-optimal paths are exact; (ii) the computed paths naturally avoid stationary and dynamic obstacles; and (iii) the probability of a location being reachable (or non-reachable) are directly predicted.

From the probability distribution of time-optimal paths, we have to assess the risks and make a decision of risk-optimal path. This subject of decision making under uncertainty has been well studied in the fields of economics and management. One widely used model is the expected utility theory and its several variants as reviewed in Schoemaker (1982). The key ingredients of this model are the evaluation of the utility cost of the outcome due to a decision and the probability of that outcome. The expected utility theory can be utilized in a prescriptive or normative framework to inform optimum decision making under complex decision scenarios and can be customized to fit the risk behavior of users (Schoemaker, 1982; Epstein, 1992; Von Neumann and Morgenstern, 2007). Specific utility functions are also available for different risk behaviors (e.g. Arrow, 1958; Fishburn, 1988; LiCalzi and Sorato, 2006).

In literature, the combination of expected utility theory and robot motion planning in dynamic environments has been limited. For example, Rapidly-exploring Random Trees (RRTs) with utility-based random trees have been used for single-query robot planners (Bry and Roy, 2011). An expectation driven iterative refinement approach with a heuristic has been proposed for robotic path planning problems (Boddy and Dean, 1989). The A* search approach has been combined with expected utility (Burns and Brock, 2007). A maximum utility based central arbiter for distributed architecture for mobile navigation has been developed (Rosenblatt, 2000). A risk-aware planner based on a Markov Decision Process has also been used to minimize the expected risk of surfacing of gliders along paths (Pereira et al., 2013).

Our goal here is to combine a principled risk optimality criterion grounded in decision theory with our stochastic dynamically orthogonal level-set equations to develop efficient computational schemes to predict risk-optimal paths from the distribution of stochastic time-optimal paths. We also seek to apply the new schemes to several stochastic flow scenarios, analyze the effects of different risk metric and criteria, and discuss the properties of risk-optimal paths.

The remainder of this section is organized as follows. Next, we provide a brief review of prior path planning results. In Sec. 2, we develop the theory and schemes for risk-optimal path planning. In Sec. 3, we apply the new schemes to compute risk optimal paths for a variety of stochastic flow scenarios. In Sec. 4, we conclude and provide future research directions.

1.1 Previous Progress in Optimal Path Planning

Traditionally, path planning has focused on land based robots in stationary environments (e.g., Hwang and Ahuja, 1992; LaValle, 2006; Latombe, 2012). However, a major challenge for marine and aerial platforms is the effects of the uncertain, strong and dynamic currents/winds. Several authors have extended many of the algorithms for static environments to plan paths of autonomous vehicles in dynamic environments (for reviews, see e.g., Lolla et al. (2014b); Pereira et al. (2013)). These applications include graph based search methods such as the modified Dijkstra's algorithm (Mannarini et al., 2016), A* search (Garau et al., 2005), RRTs (Rao and Williams, 2009), kinematic tree-based navigation (Chakrabarty and Langelaan, 2013), stochastic planners with uncertain edge weights (Wellman et al., 1995), and stochastic surface response methods (Kewlani et al., 2009). Other techniques such as nonlinear optimization methods (Kruger et al., 2007; Witt and Dunbabin, 2008), sequential quadratic programming (Beylkin, 2008), evolutionary algorithms (Alvarez et al., 2004; Aghababa, 2012), fast marching methods (Sethian, 1999; Petres et al., 2007), wave front expansion (Soulignac et al., 2009; Thompson et al., 2010) have been used with varying degrees of success. Monte Carlo methods to account for uncertainties and compute statistics of optimal trajectories have been used with potential field methods (Barraquand and Latombe, 1990) and two point boundary value problems (Wang et al., 2016). Partially Observable Markov Decision Processes have been utilized for computing policies of ro-bots moving in uncertain environments (Amato et al., 2016). We refer to Lermusiaux et al. (2016, 2017) and references therein for a detailed review of all these results, and to Blythe (1999) for an early review and outlook of decision-theoretic planning.

Briefly, the main issue with several of the above methods is that they are inaccurate, or require application specific heuristics, or are computationally intractable in strong and dynamic flows. Several methods do not rigorously utilize environmental predictions for planning. Additionally, accurate accounting of uncertainties requires large ensemble sizes for convergence of Monte Carlo methods, making them computationally very expensive for real-time use.

2. Theory and Schemes 2.1 Problem Statement

The risk-optimal path planning problem in uncertain flows can be formulated as follows (FIG. 1).

FIG. 4-1: Schematic of minimum-risk time-optimal path planning setup: The goal is to compute the time-optimal path with minimum risk under uncertainty for vehicles navigating from $x_s$ to $x_f$ in an uncertain flow field $v(x,t;\omega)$. The effective velocity, U experienced by the vehicle is the vector sum of the vehicle's forward motion $F(t)\hat{h}(t)$ and the background flow V Consider a domain D with a spatial index x, temporal index t, probabilistic sample space $\Omega$, random event $\omega \in \Omega$, and probability distribution function $p_\Omega(\bullet)$. For a vehicle Q navigating from start $x_s$ to a target $x_f$ in a stochastic flow $v(x,t;\bullet)$, we denote the time-optimal path distribution by $X_Q(x_s,t;\bullet)$ and the time-optimal heading distribution by $\hat{h}(t;\bullet)$. We define risk-optimal paths as the time-optimal paths that minimize the expected utility cost of following a path that is possibly sub-optimal in the uncertain environment. Next, we develop the theory to compute such risk-optimal paths.

2.2 Theory of Risk-Optimal Paths

Risk-optimal paths can be obtained in three steps. First, $v(x,t;\bullet)$ is computed by solving the DO stochastic environmental flow equations (Appendix A.1; Ueckermann et al. (2013); Subramani (2018). Second, $X_Q(x_s,t;\bullet)$ and $h(t;\bullet)$ are computed by solving the stochastic dynamically orthogonal level-set Hamilton Jacobi equations (eq. A.7) followed by the stochastic backtracking equation (eq. A.5). We developed and applied these equations in Subramani et al. (2018). Third, a risk metric is selected, the risk of all path choices $X_Q(x_s,t;\bullet)$ is evaluated, and the risk-optimal path $X^*_Q(x_s,t)$ computed by minimizing the risk. Here, we focus on all aspects of this third step.

To evaluate and minimize the risk of following a wrong path from among the distribution of time-optimal paths, we employ the expected utility hypothesis (e.g., Arrow, 1958; Schoemaker, 1982). The risk corresponding to a path choice is the expected utility cost of that choice being sub-optimal due to the uncertain environment. The utility cost depends on the error incurred due to the sub-optimality and the cost a decision maker assigns to this error, in accordance with their risk profile or chosen risk metric. Mathematically, we can formulate the risk evaluation and minimization problem as follows.

The time-optimal path $X_Q(x_s,t;\omega_l)$ or heading time-series $\hat{h}(t;\omega_l)$ corresponding to a random event $\omega_l \in \Omega$ is exact for the environmental realization $v(x,t;\omega_l)$; however, its use in another environmental realization $v(x,t;\omega_m)$ would be sub-optimal, and potentially infeasible. Let the trajectory achieved by following the waypoints or headings of the optimal path for $\omega_l$ in $\omega_m$ be $X_Q(x_s,t;\omega_l|\omega_m)$. We define the error incurred due to this path as $e(X_Q(x_s,t;\omega_l|\omega_m))$ and the cost $C(X_Q(x_s,t;\omega_l|\omega_m))=f(e(X_Q(x_s,t;\omega_l|\omega_m))$ to quantify the effect of this sub-optimality on the decision maker. Here, f is a utility cost function corresponding to the risk profile of the decision maker. Thus, the risk of utilizing the time-optimal path $X_Q(x_s,t;\omega_l)$ is the expected cost, i.e., $$R(X_Q(x_s,t;\omega_l)) = \int_\Omega C(X_Q(x_s,t;\omega_l|\omega_m)) p_\Omega(v(x,t;\omega_m)) d\omega_m. \quad (1)$$

Then, the risk-optimal path is computed by optimization as $$X^*_Q(x_s, t) = \operatorname*{argmin}_{X_Q(x_s,t;\omega_l)} R(X_Q(x_s, t; \omega_l)). \quad (2)$$

Of course, there can be many time-optimal paths that have the same risk $R(X_Q(x_s,t;\omega_l))$ in eq. (1). Similarly, the risk-optimal path $X^*_Q(x_s,t)$ defined in eq. (2) can also be multi-valued.

2.3 Schemes for Risk Evaluation and Minimization

The specific choice of the error incurred due to sub-optimality and the form of utility cost function determine the risk evaluation and risk-optimal path selection. For brevity of notation, we use hereafter $e_{lm}$ for the error $e(X_Q(x_s,t;\omega_l|\omega_m))$ and $C_{lm}$ for the cost $C(X_Q(x_s,t;\omega_l|\omega_m))$. There can be several error metrics corresponding to the operational parameters of interest and multiple analytical forms of the utility cost function f corresponding to different risk tolerance profiles of different decision maker, e.g., the pilot or mission designer (Schoemaker, 1982; LiCalzi and Sorato, 2006). Next, we present the schemes we consider.

2.3.1 Error Metric $e_{lm}$

The purpose of the error metric in our problem is to quantify the difference between following a prescribed path (specified as waypoints or a heading time-series) in an environment for which it is sub-optimal and following the true optimal path for that environment. We consider vehicle operations where the objectives are either achieving the optimal set of provided waypoints or the optimal heading time-series. In both operational modes, the optimal path can always be followed in the environment flow realization for which it is truly optimal, i.e., for which it reaches the target $x_f$ in fastest time. For a vehicle programmed to achieve waypoints, the ability to traverse a non-optimal path depends on whether the currents are always weaker than the vehicle's forward thrust or not. If yes, all prescribed paths are then feasible in finite time and differ from the optimal path mainly in total travel time. If not, then the vehicle does not have local controllability and may get advected away from the desired path; it may not be able to reach $x_f$ at all and thus need to be aborted. For a vehicle programmed to achieve the optimal heading time-series for a given environment, if it is operated in an environment for which these headings are sub-optimal, the vehicle would in general end up at a different end location than its intended target.

To quantify the physical dissimilarity between the paths $X_Q(x_s,t;\omega_l|\omega_m)$ and $X_Q(x_s,t;\omega_m)$, we employ the discrete Fréchet distance (Eiter and Mannila, 1994; Alt and Godau, 1995) as the error metric. A zero value of the discrete Fréchet distance means that the paths are coincident and higher values progressively imply more dissimilarity.

If the vehicle is programmed with waypoint objectives and is controllable, then $X_Q(x_s,t;\omega_l|\omega_m)$ is simply $X_Q(x_s,t;\omega_l)$ and the physical dissimilarity error metric can be directly computed from the distribution of optimal paths.

Alternative error metrics are possible for vehicles programmed with waypoint objectives or heading objectives. For example, for a vehicle programmed with waypoint objectives, the sub-optimal trajectory reaches the target in time $T(x_f;\omega_l|\omega_m)$ instead of $T(x_f;\omega_m)$. Thus, the error metric could be $|T(x_f;\omega_l|\omega_m)-T(x_f;\omega_m)|$. For a vehicle programmed with a heading objective, an appropriate error metric could be the error in arrival location. Specifically, following $X_Q(x_s,t;\omega_l|\omega_m)$, the vehicle ends up at $x'_f$ instead of $x_f$ and the error metric is the distance $|x_f-x'_f|$.

If the vehicle is not controllable as it gets caught in an unexpected current or wind field stronger than the vehicle speed, in practice, the mission may quickly get aborted. Here, the error metric could be set its maximum if the mission is aborted. If that current or wind field larger than the vehicle speed was forecast as possible, than the above metrics would continue to be employed.

All the above metrics have the property that if the path followed was the exact time-optimal path for the realized environment then the error is zero. For non-optimal paths, the error gets progressively higher with the degree of sub-optimality.

We note that, the above metrics have been chosen based on our experience with real time missions with REMUS 600 AUVs (Subramani et al., 2017b; Mirabito et al., 2017; Edwards et al., 2017). Of course, other error metrics are also possible. Examples include metrics based on the maximum background flow encountered along the path, or minimum bathymetry clearance along the path, or the number of times a vehicle has to perform a particular maneuver such as surfacing. Specific error metrics for individual missions and vehicles can be formulated based on an accurate performance characterization of the vehicle utilized, its navigation capabilities, fin configurations, and thresholds for satisfying navigation objectives. In the present paper, our goal is to provide a general theory and a recipe for risk-optimal path design and prediction for any acceptable function $e_{lm}$. If a specific metric is well adapted to a given situation, one would simply need to update the definition of $e_{lm}$; the rest of our schemes would still apply.

2.3.2 Analytical Forms of the Cost Function f

The analytical form of the cost function f that translates the error to a cost is important to characterize the risk tolerance of vehicle operators. A concave cost function implies risk-seeking preferences for choices within the range of concavity, a convex cost function implies risk-seeking preferences for choices and a cost function with a constant slope is a risk-neutral preference for choices (Fishburn, 1979; Schoemaker, 1982; LiCalzi and Sorato, 2006; Von Neumann and Morgenstern, 2007). In our applications, we will employ $f(e_{lm})=\log(1+e_{lm})$ for a risk seeking decision maker, $f(e_{lm})=e_{lm}$ for a risk neutral behavior, and $f(e_{lm})=-1+\exp(e_{lm})$ for a risk averse behavior.

2.4 Algorithm

The algorithm to implement the theory and schemes developed in Sec. 2.2-2.3 has four major steps as summarized in Table 1. See Table B.2 for our notation. A subscript DO is used to indicate that a DO (or KL) expansion and truncation has been applied to the corresponding stochastic variable.

TABLE 1

Risk-Optimal Path Planning: Algorithm

I. Probabilistic Flow Prediction
  1. Predict the probability of the velocity filed $v_{DO}$ (x, t; r) for r = 1 . . . $n_r$ by solving the discrete stochastic DO barotropic quasi-geostrophic equations (eqs. A.3) or discrete stochastic DO Primitive Equations (Chapter 2).
II. Stochastic Time-Optimal Path Planning
  1. Compute stochastic maximum reachability fronts $\phi_{OD}$ (x, t; r) for r = 1 . . . $n_r$ all at once by solving the stochastic DO level-set equations (eq. A.7) with $v_{DO}$ (x, t; r).
  2. Compute discrete time-optimal paths $X_Q$ ($x_s$, t; r) and time-optimal headings $\hat{h}$(t; r) for all r = 1 . . . $n_r$ using the backtracking equation (eq. A.5).

TABLE 1-continued

Risk-Optimal Path Planning: Algorithm

III. Risk Evaluation and Optimization
 1. Simulate the trajectories $X_Q$ ($x_s$, t; /lm) for waypoint objective $X_Q$ ($x_s$, t; 1) or heading objective $\hat{h}$(t; r) for all l = 1 . . . $n_r$. Under the conditions of complete controllability and for waypoint objectives, $X_Q$ ($x_s$, t;l|m) = $X_Q$ ($x_s$, t; 1).
 2. Compute the error metric matrix $e_{lm}$ as the discrete Frechet distance between $X_Q$ ($x_s$, t; l|m) and $X_Q$ ($x_s$, t; m) for all l, m = 1 . . . $n_r$, or one of the alternative error metrics defined in Sec. 2.3.1.
 3. Compute the cost matrix $C_{lm}$ = f($e_{lm}$) for all l, m = 1 . . . $n_r$.
 4. Compute the risk of choosing the path $X_Q(x_s, t; l)$ as $R_l = \frac{1}{n_r}\sum_{m=1}^{n_r} C_{lm}$.
 5. Find l that minimizes $R_l$. Then, the risk optimal path $X_Q^*(x_s, t) = X_Q(x_s,t; l)$.
IV. Iterate
 1. If there is evidence that the number of DO realizations r = 1 . . . $n_r$, or adaptive sizes of the DO environmental or level-set subspaces, $n_{s,v}$ or $n_{s,\phi}$ (Appendix A), are not sufficient to describe the probability density of v(x, t; ) or of $X_Q(x_s, t; )$, augment the number of realizations or subspace sizes, and iterate.

3. Applications

In this section, we showcase the above theory and schemes by applying them to three environ-mental flows of increasing complexity. In the first, we consider an autonomous vehicle crossing a simulated stochastic steady front (in the ocean or atmosphere) similar to the one we have used to previously (Lolla et al., 2014b; Subramani and Lermusiaux, 2016; Subramani et al., 2018), but now for stochastic flows and risk-optimal paths. Here, we consider a bi-modal Gaussian Mixture Model (GMM) PDF for the uncertain flow strength. In the second, we consider a stochastic quasi-geostrophic wind-driven double-gyre flow, as in Subramani et al. (2018), but now add the risk evaluation and optimization. In the third, we consider an autonomous vehicle navigating in simulated flow exiting a strait/estuary (in the coastal ocean) or wind blowing through a widening constriction of an urban canopy (such as from a narrow street onto a wide street both lined with tall buildings).

3.1 Stochastic Steady Front with Uncertain Flow Strength

Figures 1, 3:
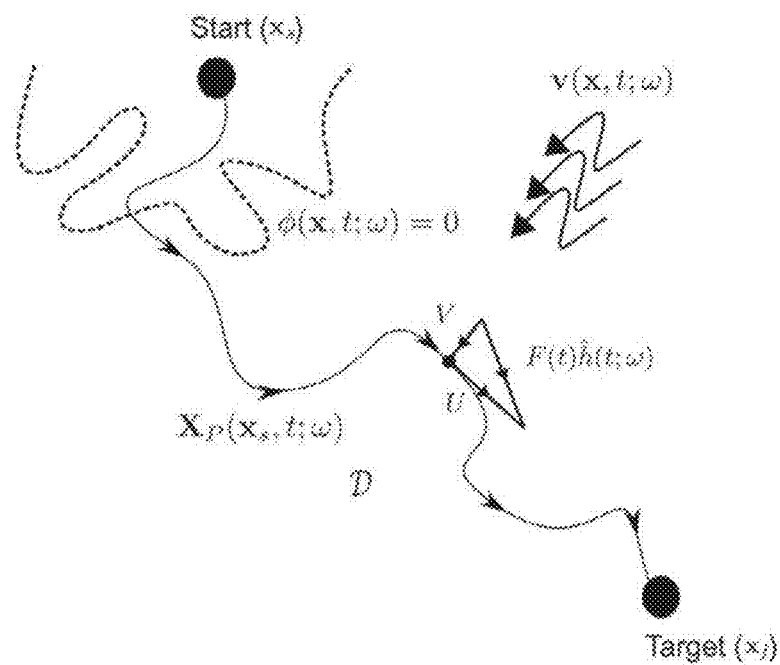
Figure 3:
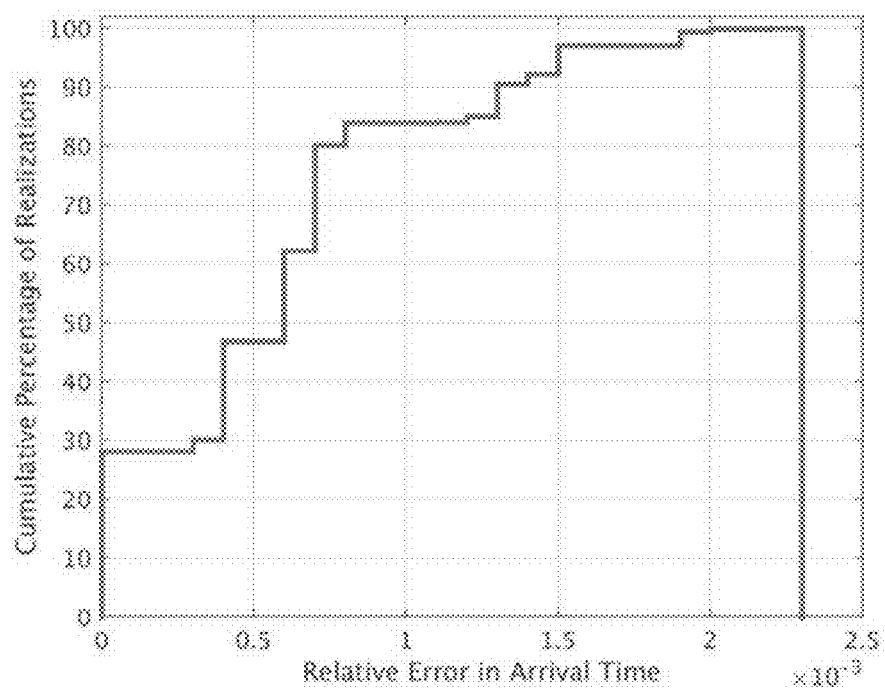
Figures 2A, 2B, 2C, 3:
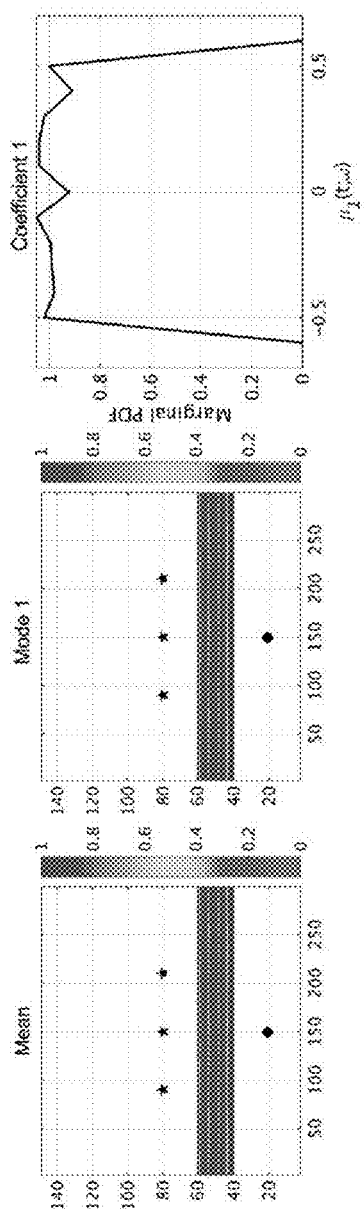
Figures 3, 4, 4A:
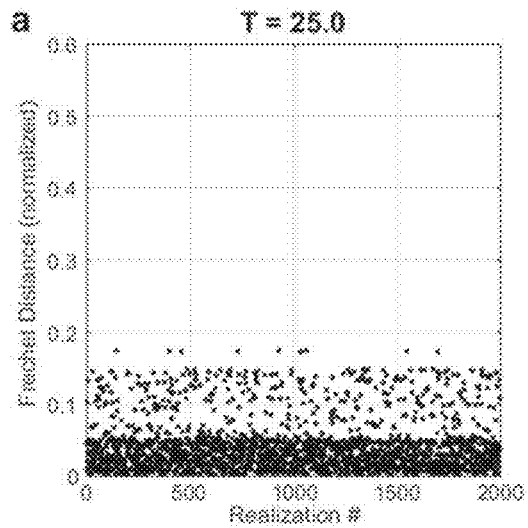
Figures 3, 4, 4B:
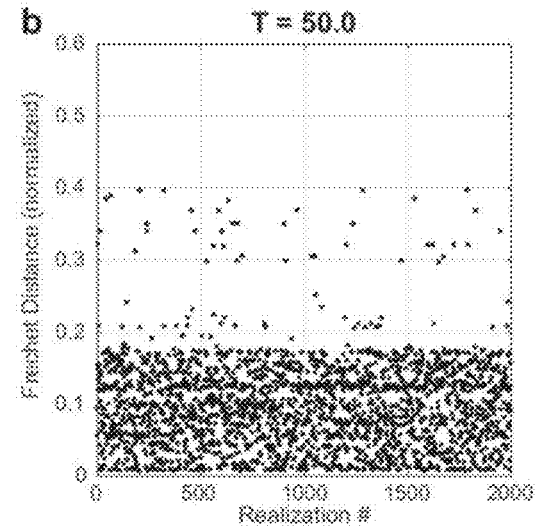
Figures 3, 4, 4C:
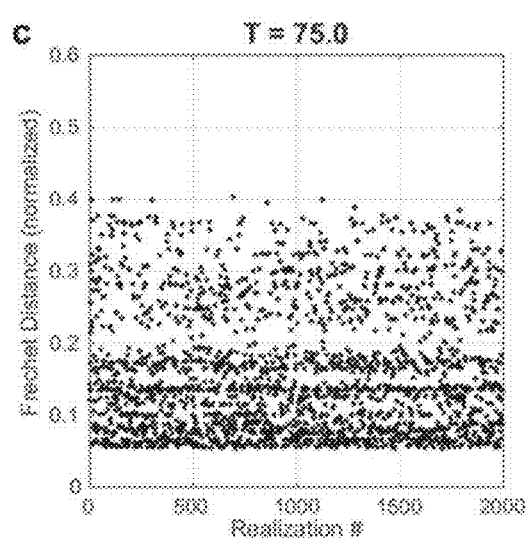
Figures 3, 4, 4D:
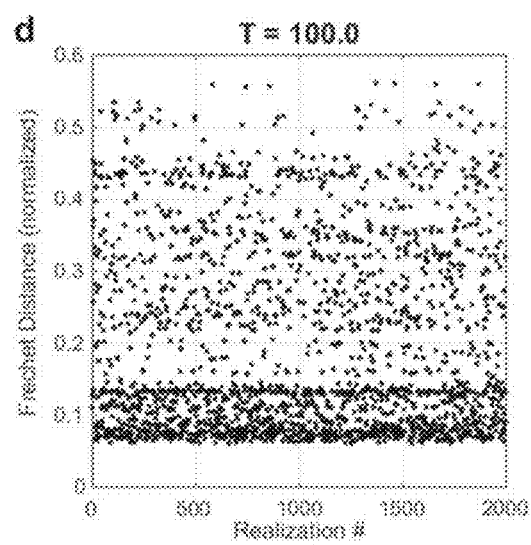
Figures 3, 4, 5, 5A:
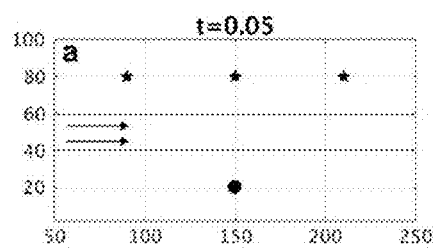
Figures 3, 4, 5, 5B:
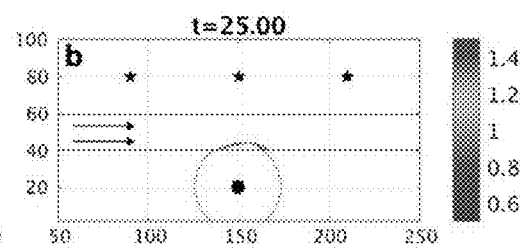
Figures 3, 4, 5, 5C:
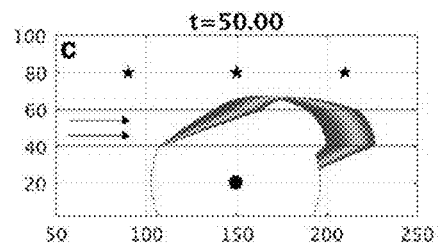
Figures 3, 4, 5, 5D:
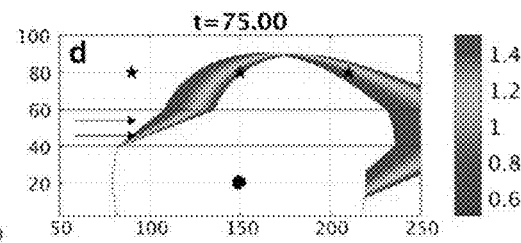
Figures 3, 4, 5, 5E:
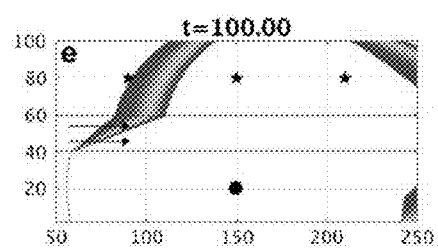
Figures 3, 4, 5, 5F:
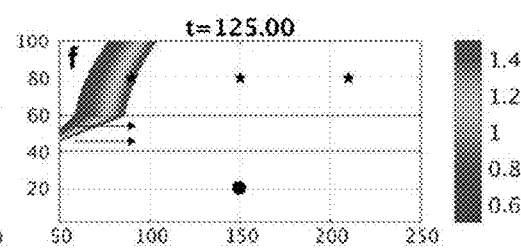

The first stochastic flow scenario we consider—a steady front with an uncertain flow strength described by a Gaussian Mixture Model PDF—is an idealization of missions where an AUV or glider crosses a front or channel. FIG. 4-2a shows the domain and FIG. 4-2b shows the PDF of the flow strength.

FIG. 4-2: Domain and the PDF of flow strength for the stochastic simulated front crossing test case: (a) In a square domain of non-dimensional side lengths 100×100, an idealized stochastic steady front is modeled as a zonaljet with uncertain strength, flowing from west to east between y=40 and y−=60 (b) The PDF of the flow strength is a Gaussian Mixture Model with two Gaussians with non-dimensional mean, standard deviation and mixture and mixture weight of (10, 3, 0.65) and (20, 1, 0.35) respectively.

The domain is a non-dimensional square basin of size 100×100 with an uncertain jet flowing from east to west and confined between 40<y<60. The direction of flow is considered known and only the strength is uncertain. The PDF of the flow strength is a Gaussian Mixture Model of two Gaussians components with non-dimensional mean, standard deviation and mixture weights of (10, 3, 0.65) and (20, 1, 0.35) respectively. A single $n_{s,v}$=1 mode is sufficient to describe the variability in the flow. We utilize $n_{r,v}$=5,000 realizations sampled from the GMM distribution of the stochastic coefficient corresponding to mode 1. Here, we consider a non-symmetric PDF for the flow strength in order to illustrate the key aspects of our risk-optimal planning. This completes step I of Table. 1.

Next, we simulate the stochastic reachability and time-optimal path distribution for a vehicle with non-dimensional speed 20 starting at (50,20) and heading to a target at (50,80). The start point is depicted by a circular marker and the target by a star marker in all our figures. Eq. A.7 is solved to obtain the distribution of stochastic reachability fronts. In FIG. 4-3a-e, five discrete snapshots during the evolution of the reachability front are shown.

FIG. 4-3: (a)-(e) Stochastic reachability front evolution at five discrete times and (f) time-optimal path distribution for a vehicle navigating in a stochastic steady front with uncertain flow strength.

Each realization of the reachability front is colored by the jet strength of the corresponding flow realization. FIG. 4-3f shows the distribution of the time-optimal paths computed by solving eq. A.5. This completes step II of Table. 1. Next, we compute the risk-optimal paths by completing step III of Table. 1.

3.1.1 Risk-Optimal Paths

Waypoint objective. For vehicles programmed with a waypoint objective and under conditions of complete controllability, no new trajectory simulation is required. We simply compute the error metric matrix as the dissimilarity matrix of all time-optimal path realizations. This $e_{lm}$ matrix is of size $n_{r,\phi} \times n_{r,\phi}$ and contains the pair-wise discrete Frechet distance between pairs (l,m) of paths for all l,m=1 . . . $n_{r,\phi}$. The utility cost matrix $C_{lm}$ for the required cost-functions can then be computed from $e_{lm}$. FIG. 4-4 row 1 shows the utility cost matrix for a risk-seeking cost function (column a), risk-neutral cost function (column b) and risk-averse cost function (column c).

FIG. 4-4: Computation of risk-optimal paths with waypoint objective for stochastic steady front crossing: Rows 1, 2 and 3 correspond to step III.3, III.4 and III.5 respectively of Table 1. Columns a, b, c correspond to risk seeking, risk-neutral and risk-averse behavior. To facilitate visualization, the waypoint objective choices l have been sorted, in rows 1 and 2, by the strength of the flow realization for which it is the exact time-optimal path.

The cost functions are computed by normalizing the errors to lie between 0 and 128 and applying the concave function f(e)=$\log_2$(1+e) to model risk-seeking behavior, the constant slope function f(e)=e to model risk-neutral behavior and the convex function f(e)=2e to model risk-averse behavior. In the present range, the above functions exhibit concavity and convexity enough to model risk-behaviors (see, e.g., Schoemaker, 1982). The i-axis of the cost matrix corresponds to the waypoint objective choice and the m-axis corresponds to the realizations of the flow field. The risk of the waypoint objective choices is then computed by marginalizing over m and obtaining the risk curve shown in row 2. The red point is the minimum risk choice. In row 3, each waypoint objective choice is colored by its risk, and the risk-optimal waypoint objective is shown in black.

Figures 2, 3, 4, 5, 5B:
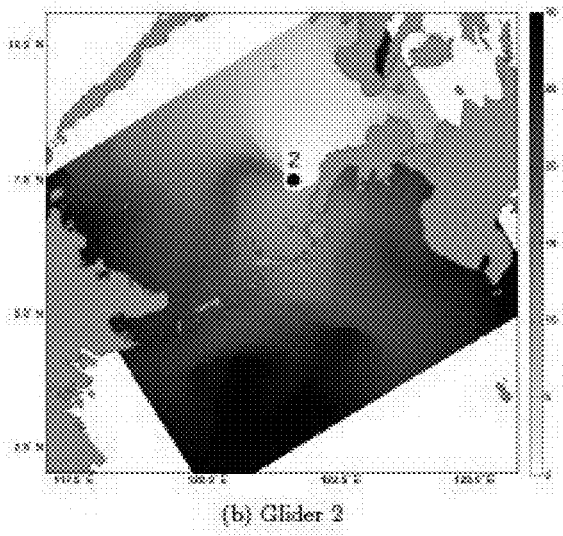

FIG. 4-5*a* shows the three risk-optimal waypoint objective choices corresponding to different risk behaviors. FIG. 4-5*b* shows the PDF of the frechet distance between the risk-optimal waypoint objectives and the true-time optimal path in all realizations of the stochastic flow environment.
FIG. 4-5: Risk-optimal waypoint objectives for stochastic steady front crossing: (a) The risk-seeking, risk-neutral and risk-averse waypoint objectives choices. (b) The PDF of error (quantifying the degree of sub-optimality) due to following the risk-optimal paths. The error is the discrete Frechet distance between the risk-optimal choice and the true time-optical path corresponding to the realized environment.
The PDF of the error describes the properties of the risk-optimal paths succinctly. By following the risk-seeking path, we have a high probability of having low errors, but also a high probability of having high errors. On the other hand, by following the risk-averse path we have higher certainty of making medium errors. The risk-neutral path has error characteristic in between the risk-seeking and risk-averse choices. Hence, depending on the risk appetite of the operator, one of the risk-optimal choices will be appropriate. An aggressive operator may want to bet with the risk-seeking choice with the understanding that, for the realized environment, this choice has a high probability of being close to the true time-optimal path but also a high probability of being far from the true time-optimal path. Similarly, a conservative operator may choose the risk-averse choice and have lower probability of large errors but also for small errors. An ambivalent operator may choose the risk-neutral choice.

Figures 3, 4, 5, 6:
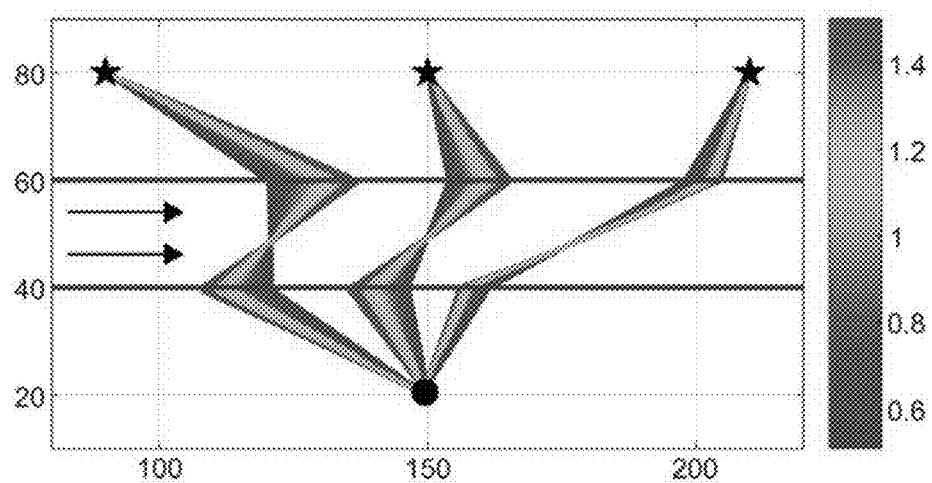
Figures 3, 4, 5, 6, 7:
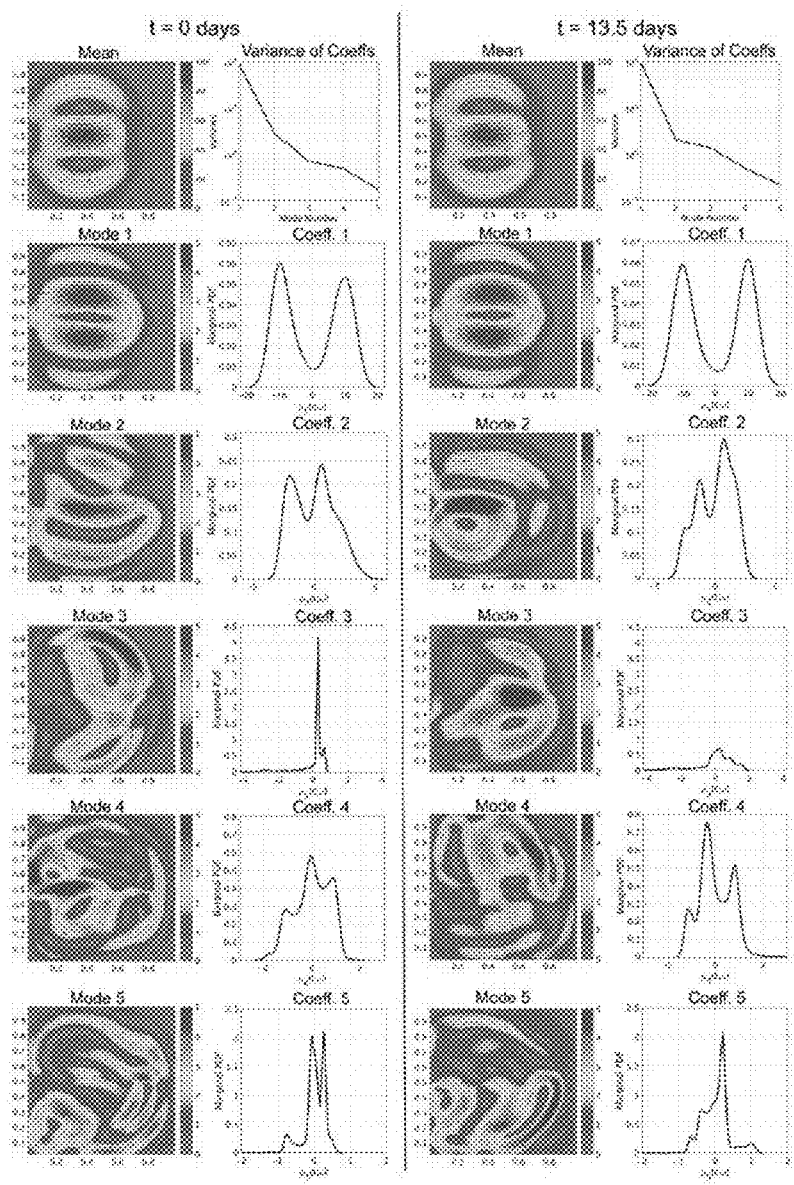
Figures 3, 4, 5, 6, 7, 8:
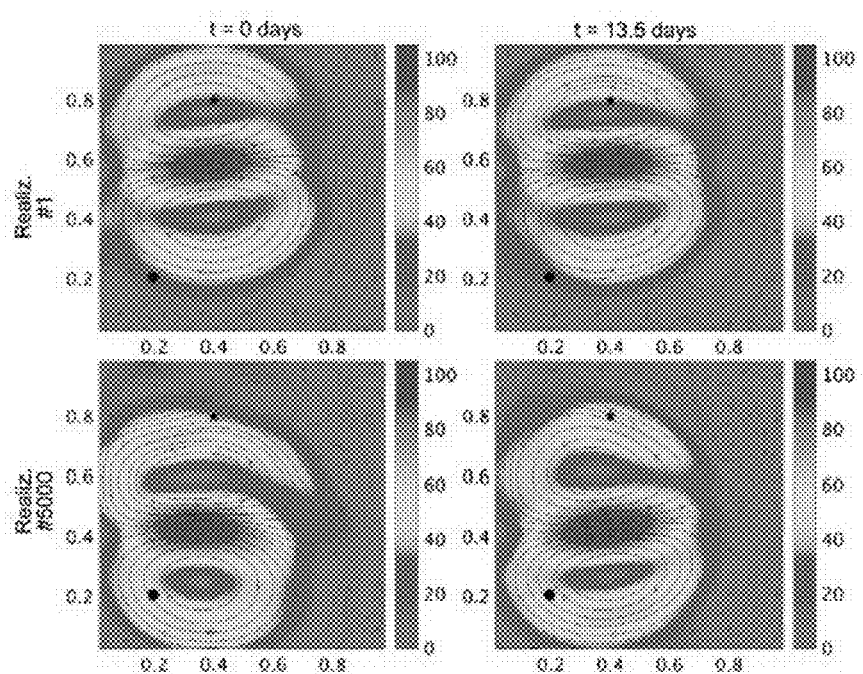

In FIG. 4-6, the errors due to following the risk-optimal choice are visualized on the other time-optimal paths, if they were the true time-optimal path.
FIG. 4-6. Error visualization for risk-optimal waypoint object choices: Each time-optimal path is colored by the Frechet distance between it and the risk-optimal choice. (a), (b) and (c) correspond to the risk-seeking, risk-neutral and risk-averse choices. The PDF of these errors is shown in FIG. 4-5*b*.
This is the physical visualization of the errors presented as a PDF in FIG. 4-5*b*.
Heading objective. For a heading objective, we simulate the trajectories obtained by following a particular heading objective choice in all the realizations of the flow. The error matrix is then computed by the discrete frechet distance between the realized trajectory and the true time-optimal path for that flow realization. Matrices and risk curves similar to that shown in FIG. 4-4 can be obtained for computing risk-optimal heading objective choices. We only show the risk-optimal heading choice and the error characteristics for these choices here. FIG. 4-7*a* shows the computed risk-optimal heading choices for our three risk behaviors. FIG. 4-7*b* shows the PDF of the error due to following the risk-optimal heading choice.

FIG. 4-7: Risk-optimal heading objectives for stochastic steady front crossing: (a) The risk-seeking, risk-neutral and risk-averse heading objective choices. (b) The PDF of errors due to following the risk-optimal heading objectives. The error is quantified as the discrete Frechet distance between the path obtained by following the risk-optimal choice and the true time-optimal path corresponding to that realized environmental flow.
The error is quantified as the discrete Frechet distance between the trajectory obtained due to following the risk-optimal heading in all flow realizations and the true time-optimal path for that flow realization. FIG. 4-8 shows this error visualized on the trajectories obtained by following the risk-optimal paths in all the flow realizations.
FIG. 4-8: Path distribution due to following the risk-optimal heading objectives in all environmental flow realizations: Each realized path corresponds to a particular flow realization and is colored by the discrete Frechet distance between this path and the true time-optimal path for the realized environmental flow. (a), (b) and (c) show the errors due to following risk-seeking, risk-neutral and risk-averse choices. FIG. 4-7*b* shows the PDF of these errors.
From FIG. 4-8, we see that by following the risk-optimal heading choice in a flow for which it is sub-optimal results in the vehicle missing its target. The risk-seeking heading objective choice results in paths that are close to the true time-optimal path in more flow realizations that the risk-neutral and risk-averse choices. On the flip side, the risk-seeking choice also leads to paths that are far from the true-time optimal paths in more flow realizations than the other two choices. As before, the risk averse choice leads to more certain medium errors.

3.2 Stochastic Wind-Driven Double Gyre

Figures 3, 4, 5, 6, 7, 8, 9:
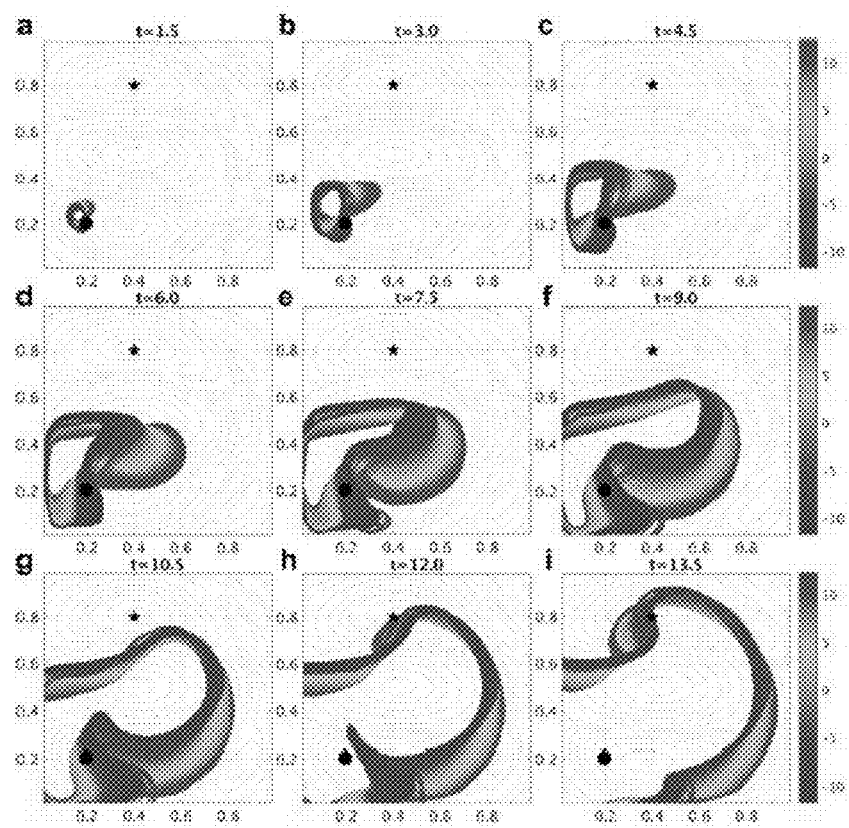
Figures 3, 4, 5, 6, 7, 8, 9, 10, 10A, 10B:
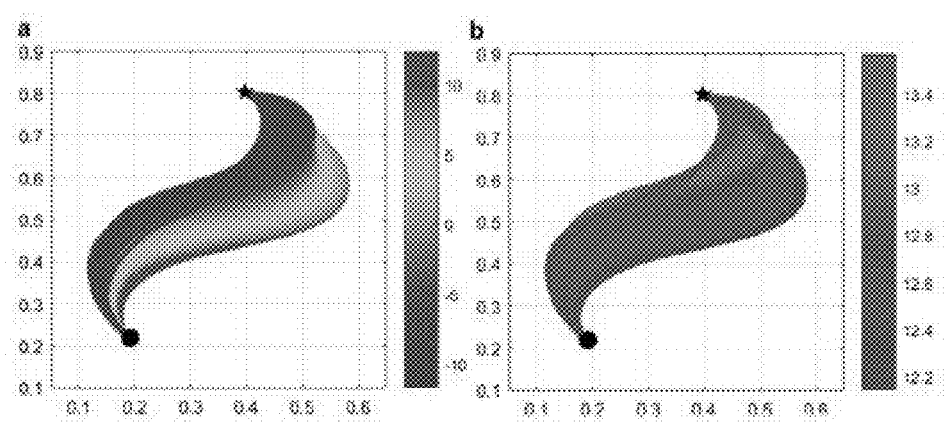
Figures 3, 4, 5, 6, 7, 8, 9, 10, 11, 11A:
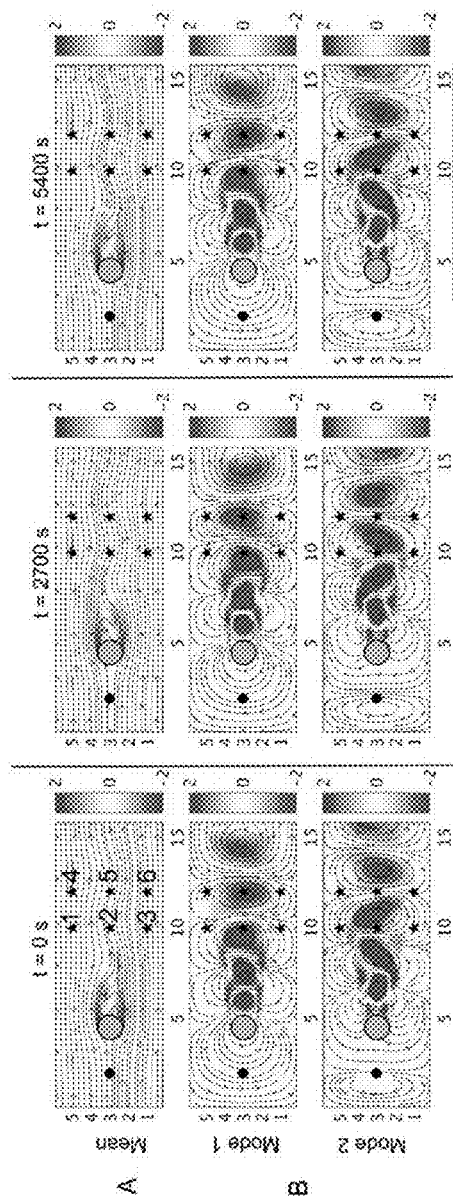
Figures 3, 4, 5, 6, 7, 8, 9, 10, 11, 11B:
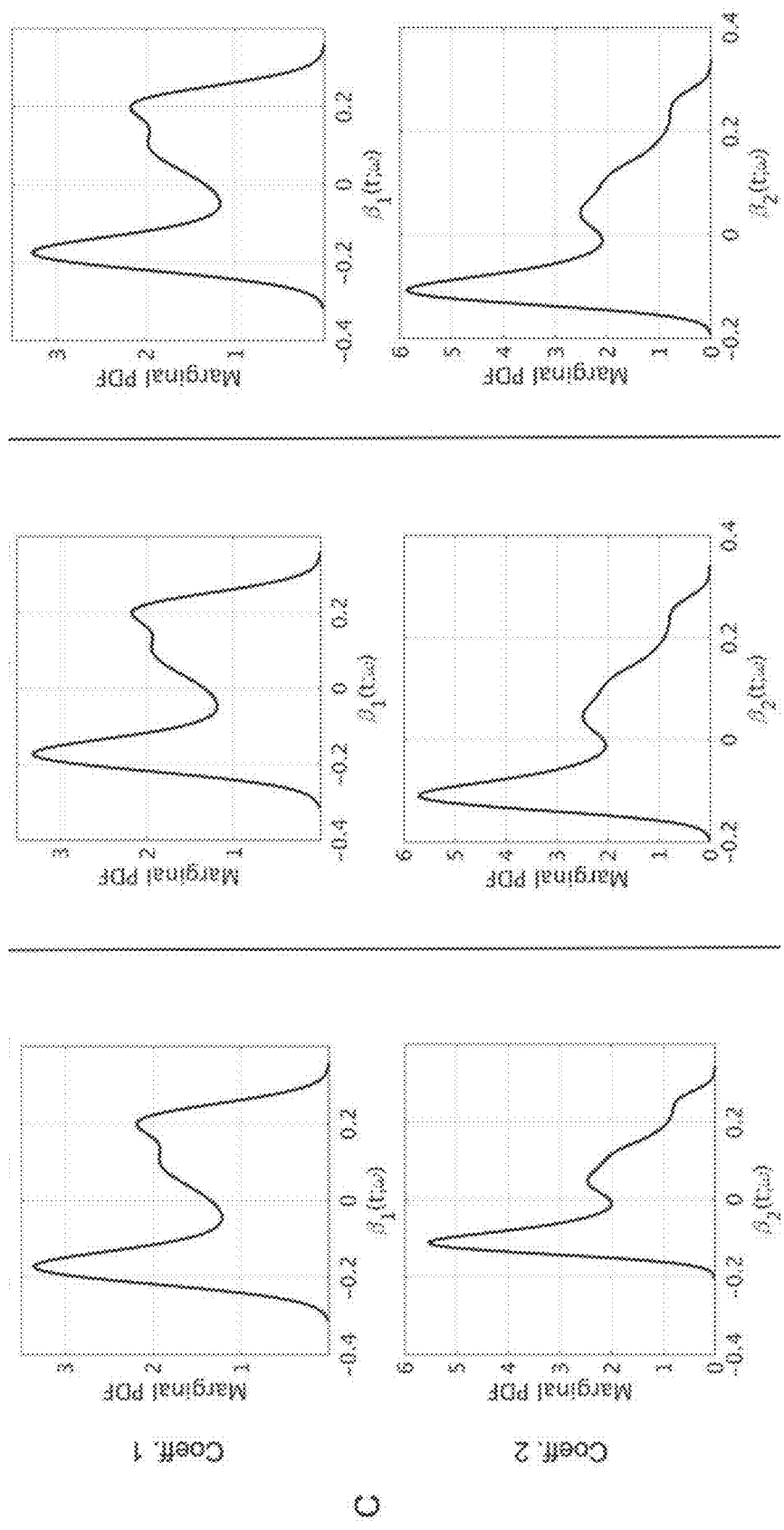
Figures 3, 4, 5, 6, 7, 8, 9, 10, 11, 12:
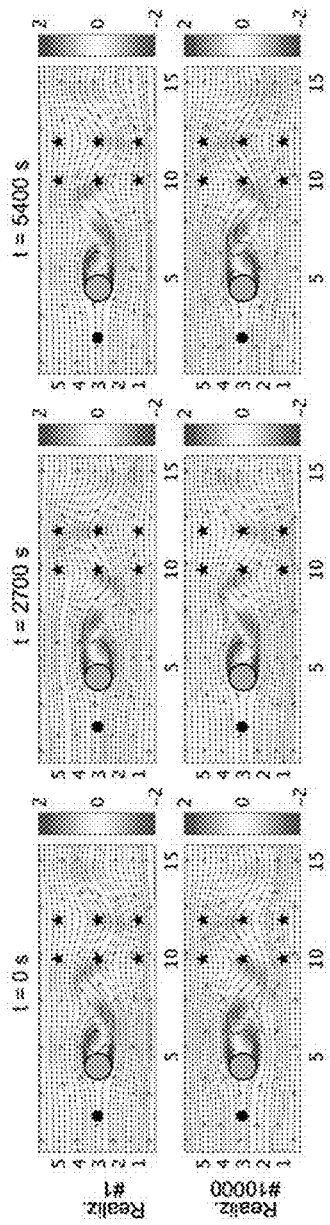
Figures 3, 4, 5, 6, 7, 8, 9, 10, 11, 12, 13:
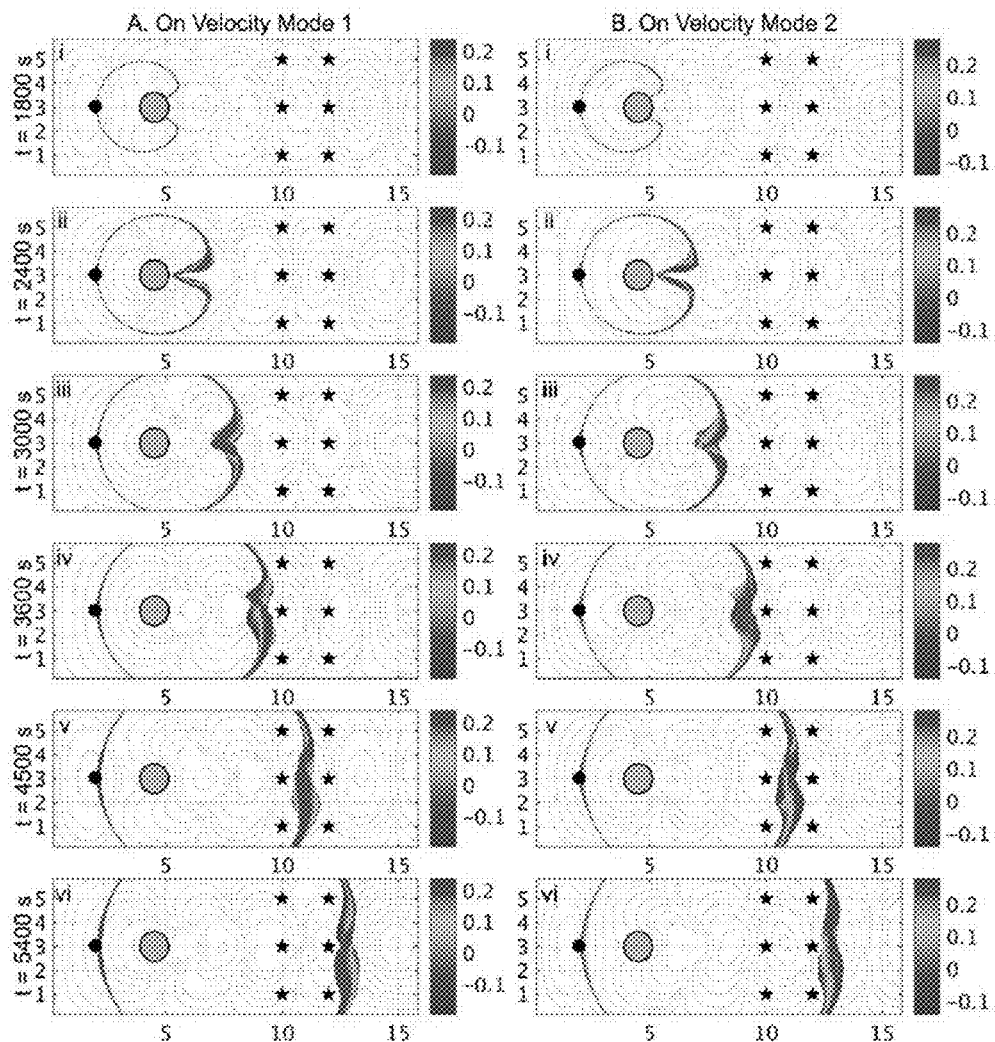
Figures 3, 4, 5, 6, 7, 8, 9, 10, 11, 12, 13, 14:
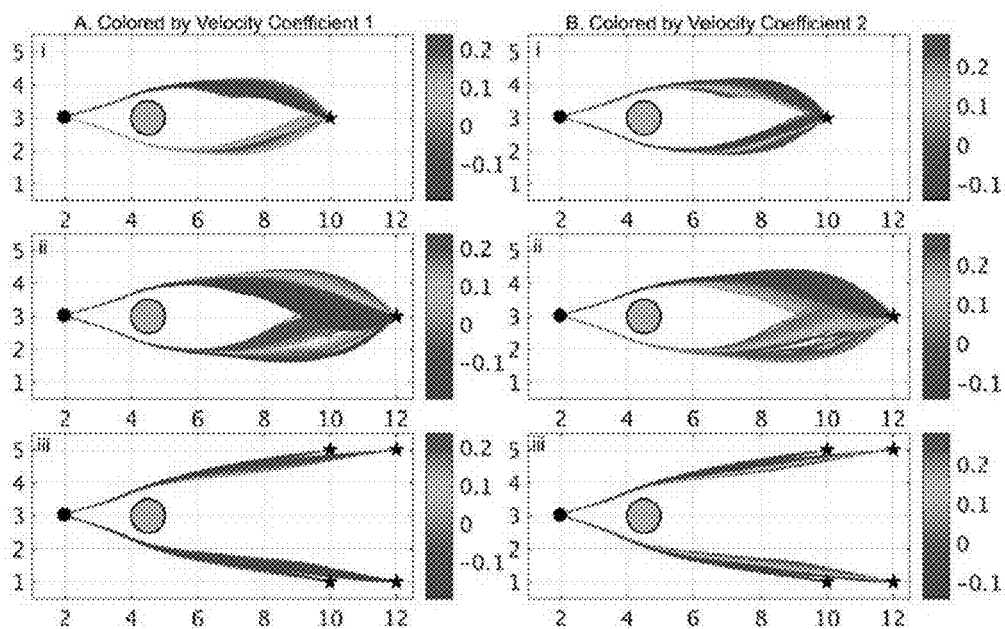

As our second illustration, we consider a stochastic wind-driven double gyre. This is the same flow fields that were presented in Subramani et al. (2018). This choice of test case is done to ensure continuity of our theoretical development. They are obtained by solving the quasi-geostrophic DO equations A.3 with $n_{s,v}$=5 DO modes and $n_{r,v}$=5,000 DO realizations. The domain is 1,000 km 1,000 km discretized into a 100×100 regular finite volume grid. A deterministic zonal wind forcing is applied to drive the double gyre dynamics initialized with uncertain barotropic velocity components. The flow field for 13.5 days for a mission with a vehicle moving at 40 cm/s is considered. FIG. 9 shows the mean, standard deviation and skewness of the velocity fields at three discrete times T=0, 6.75 and 13.5 days.
FIG. 4-9: Stochastic wind-driven double gyre flow: The mean, standard deviation and skewness of the velocity fields are shown in the first three rows. Perturbation from the DO mean of two representative realizations are shown in the last two rows. All fields are shown for three discrete times at the beginning, middle and end of the planning horizon in each column.
The perturbations from the DO mean of two extreme realizations are also shown. These two and the other 4,998 realizations are all simulated by one DO simulations with DO mean, mode and coefficient equations (see Subramani et al. (2018)). From the higher order statistics of the flow fields, we see that the flow exhibits non-Gaussian behavior. The extreme realizations have perturbations in the opposite direction with similar magnitudes showing that flow realizations with very different flow properties can be simulated by a single DO realization.

3.2.1 Risk Optimal Paths

As for the previous illustration, here we compute the risk-optimal paths for both waypoint objectives and heading objectives.

Waypoint objective. Under conditions of complete controllability, we can compute the utility cost matrix directly from the distribution of time-optimal paths. Results from each step of the computation are presented in FIG. 4-10.

FIG. 4-10: Computation of risk-optimal paths for waypoint objective in the stochastic double gyre: Rows 1, 2 and 3 correspond to step III.3, III.4 and III.5 respectively of Table 1. Columns a, b, c correspond to risk-seeking, risk-neutral and risk-averse behavior. To facilitate visualization, the waypoint objective choices have been sorted, in rows 1 and 2, by the velocity DO Coefficient 1.

The rows 1 and 2 show the utility cost matrix and the risk curve. Row 3 shows all waypoint objective choices colored by their respective risk and the risk-optimal choice colored by black. The columns a,b and c correspond to the three risk behaviors: risk-seeking, risk-neutral and risk-averse respectively.

FIG. 4-11a shows the three risk-optimal paths corresponding to different risk behaviors together. FIG. 4-11b shows the PDF of the Frechet distance between the risk-optimal waypoint objectives and the true-time optimal path in all realizations of the stochastic flow environment.

FIG. 4-11. Risk-optional waypoint objectives in the stochastic double gyre flow field: Same as FIG. 4-5 but for the mission in stochastic double gyre flow.

The properties of the risk-optimal paths are similar to those in the previous illustration. This shows that our method can be utilized in complex stochastic flow scenarios efficiently. The information in the PDF of the error is visualized on the physical paths in FIG. 4-12.

FIG. 4-12: Error visualization for waypoint objective risk-optimal choices: Each time-optimal path is colored by the Frechet distance between it and the risk-optimal choice. (a), (b) and (c) corresponds to the risk-seeking, risk-neutral and risk-averse choices. The PDF of these errors is shown in FIG. 4-11b.

Heading objective. The risk evaluation and minimization is completed for vehicles following heading objectives. FIG. 4-13a shows the risk-optimal heading objectives and FIG. 4-13b shows the error PDF due to following the risk-optimal headings in all flow realizations.

FIG. 4-13: Risk-optimal heading objectives in the stochastic double gyre flow filed: (a) The risk-seeking, risk-neutral and risk-averse heading objective choices. (b) The PDF of errors due to following the risk-optimal heading objectives. The error is quantified as the discrete Frechet distance between the path obtained by following the risk-optimal choice and the true time-optimal path corresponding to that realized environmental flow.

In FIG. 4-14, we show the trajectories obtained by following the risk-optimal headings in all the flow realizations. Here, the paths are colored by the Frechet distance between the obtained trajectory and the true time-optimal path in that flow realization.

FIG. 4-14: Path distribution due to following the risk-optimal heading objectives: Each realized path corresponds to a particular flow realization and is colored by the discrete Frechet distance between this path and the true time-optimal path for that realized environmental flow. (a), (b) and (c) show the errors due to following risk-seeking, risk-neutral and risk-averse choices. FIG. 4-13b shows the PDF of these errors.

3.3 Stochastic Flow Exiting a Strait

Figures 3, 4, 5, 6, 7, 8, 9, 10, 11, 12, 13, 14, 15:
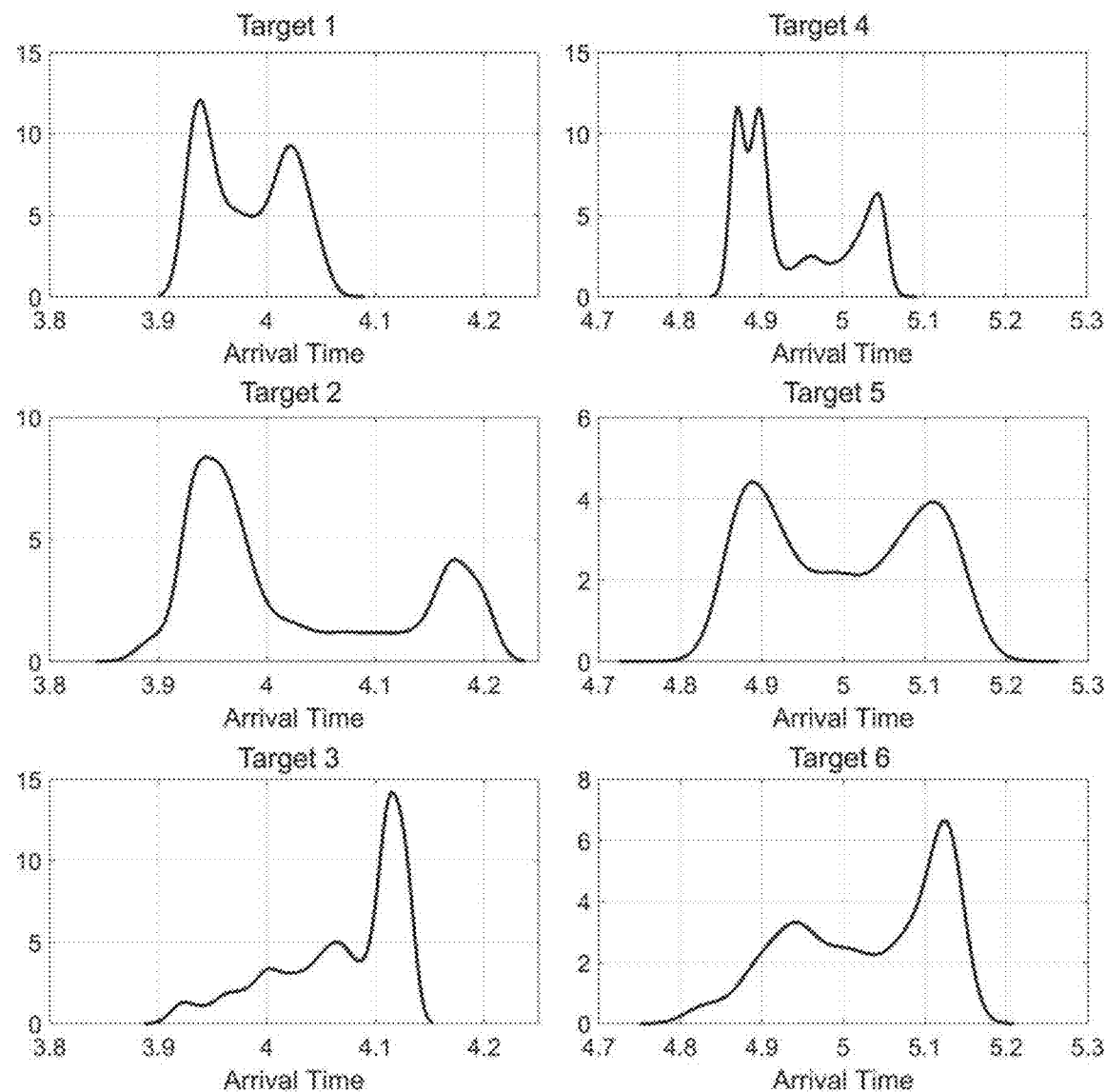
Figures 1, 4:
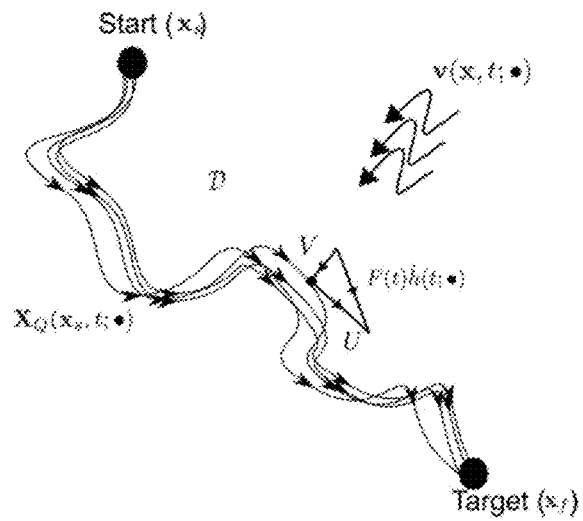
Figures 2A, 2B, 4:
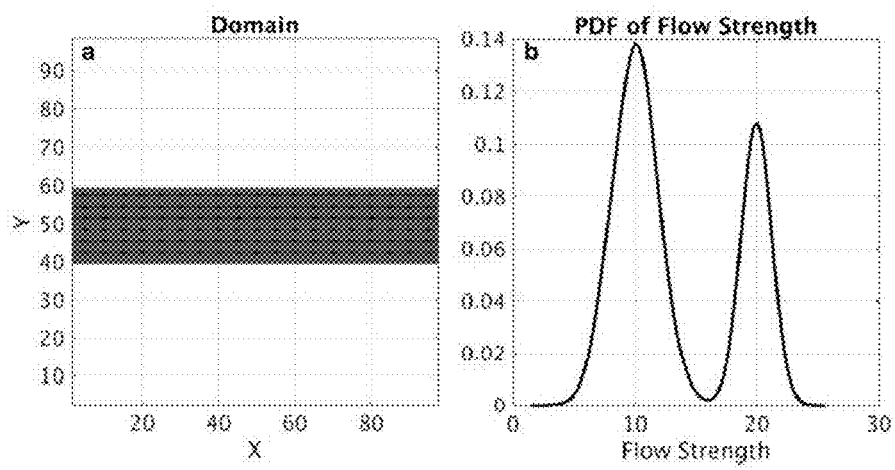
Figure 4:
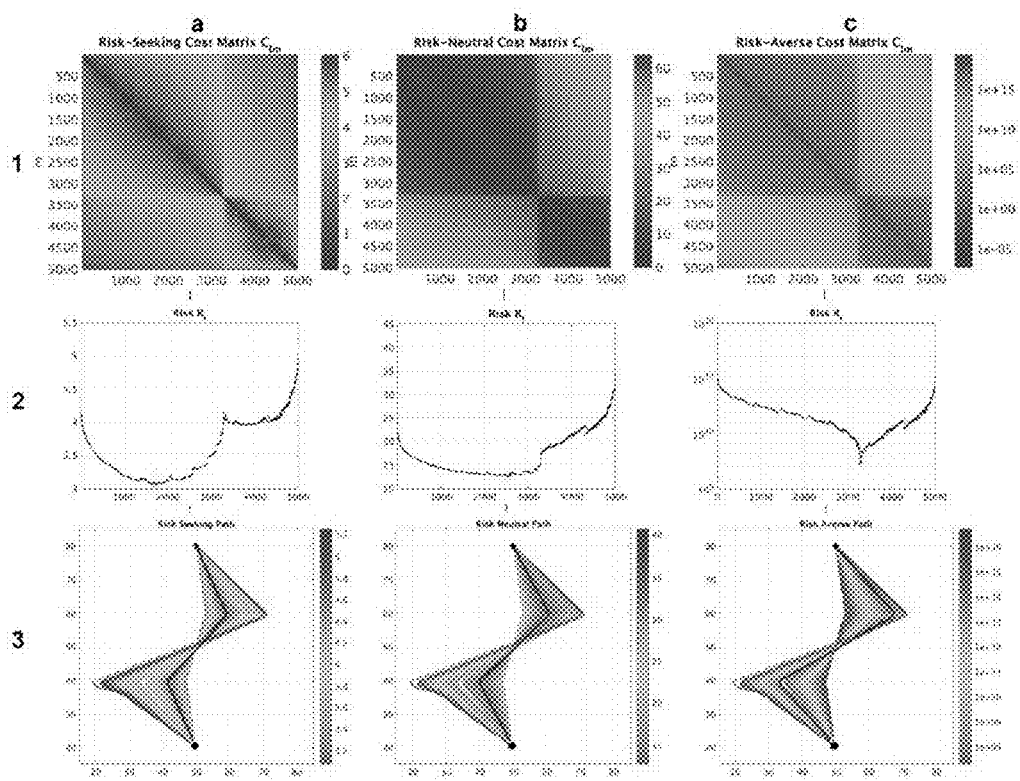
Figures 4, 5, 5A:
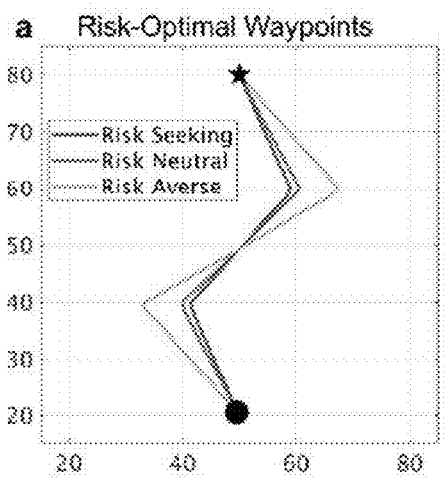
Figures 4, 5, 5B:
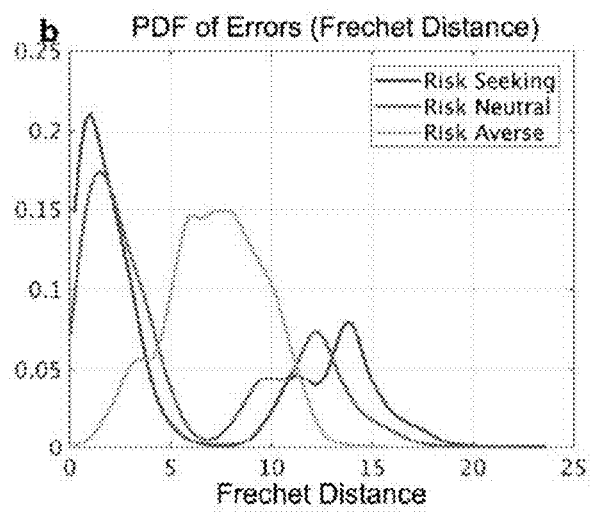
Figures 4, 5, 6, 6A, 6B, 6C:
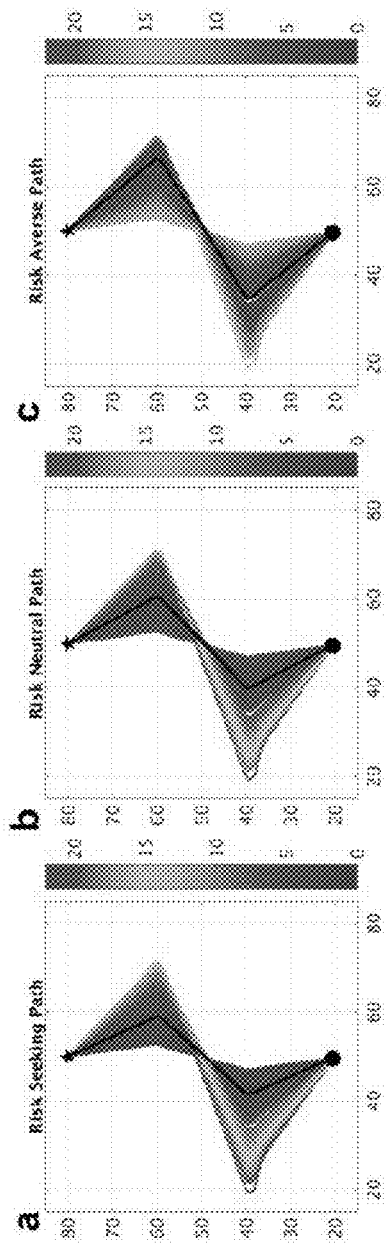
Figures 4, 5, 6, 7, 7A:
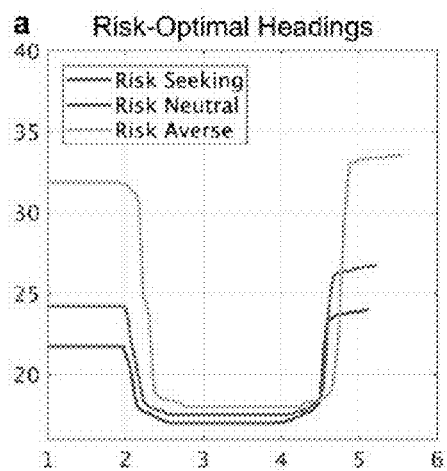
Figures 4, 5, 6, 7, 7B:
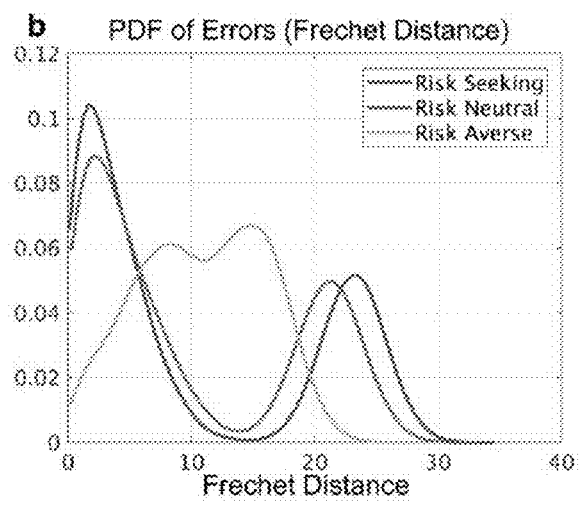
Figures 4, 5, 6, 7, 8, 9:
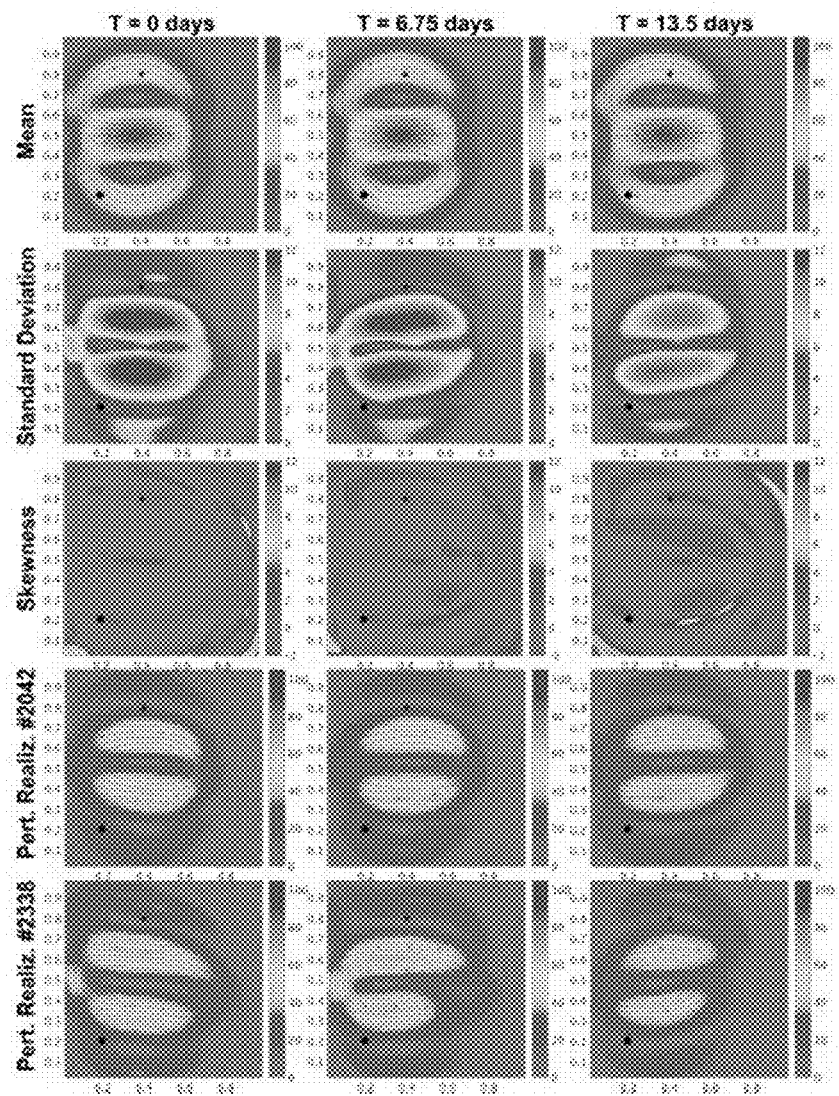
Figures 4, 5, 6, 7, 8, 9, 10:
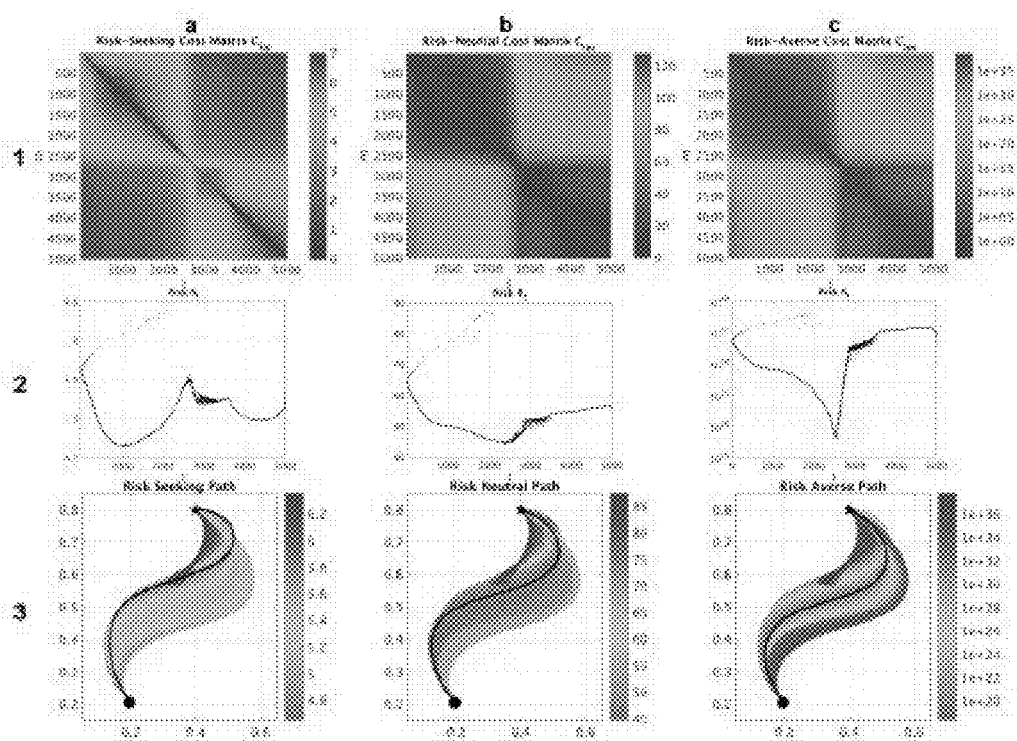
Figures 4, 5, 6, 7, 8, 9, 10, 11, 11A:
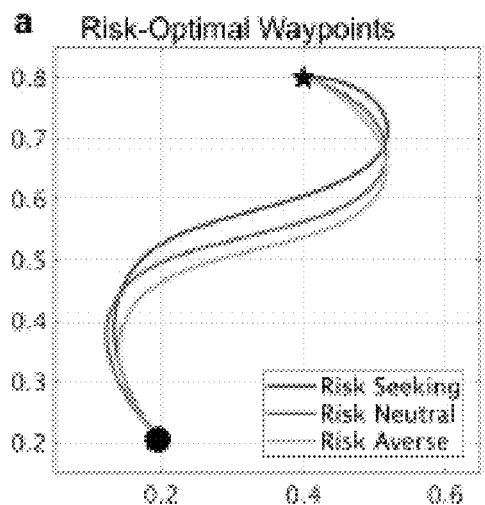
Figures 4, 5, 6, 7, 8, 9, 10, 11, 11B:
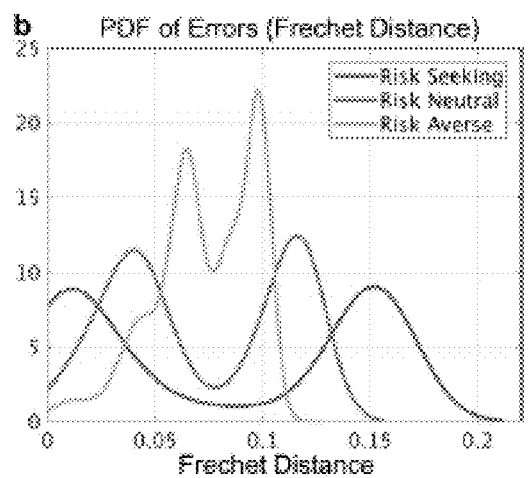
Figures 4, 5, 6, 7, 8, 9, 10, 11, 12, 12A, 12B, 12C:
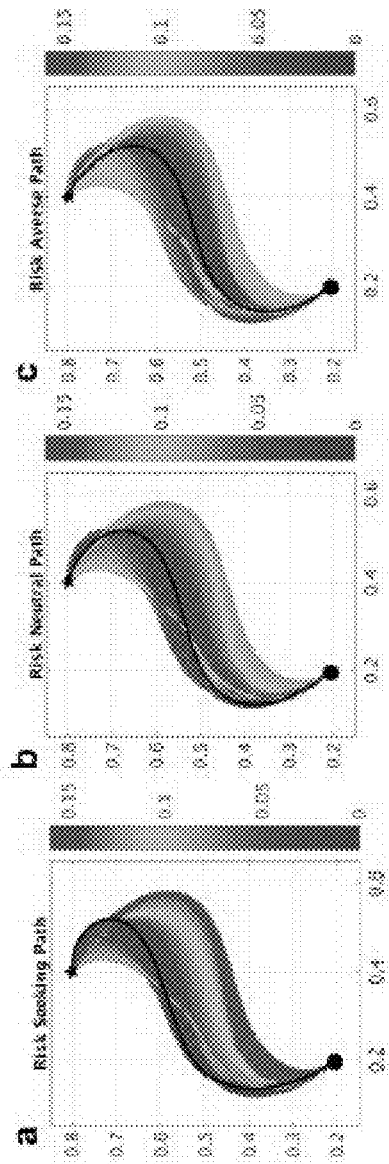
Figures 4, 5, 6, 7, 8, 9, 10, 11, 12, 13, 13A:
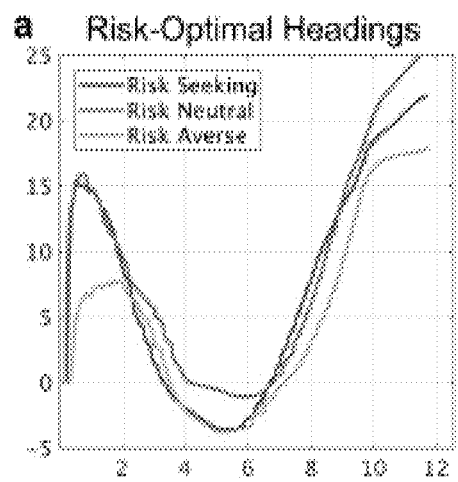
Figures 4, 5, 6, 7, 8, 9, 10, 11, 12, 13, 13B:
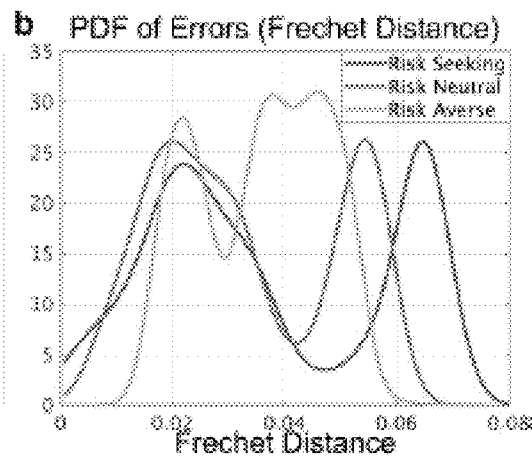
Figures 4, 5, 6, 7, 8, 9, 10, 11, 12, 13, 14, 14A, 14B, 14C:
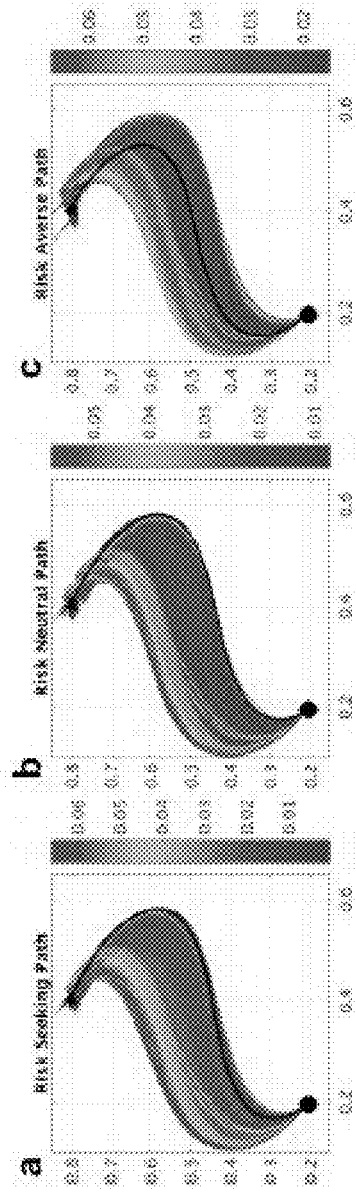
Figures 4, 5, 6, 7, 8, 9, 10, 11, 12, 13, 14, 15, 15A:
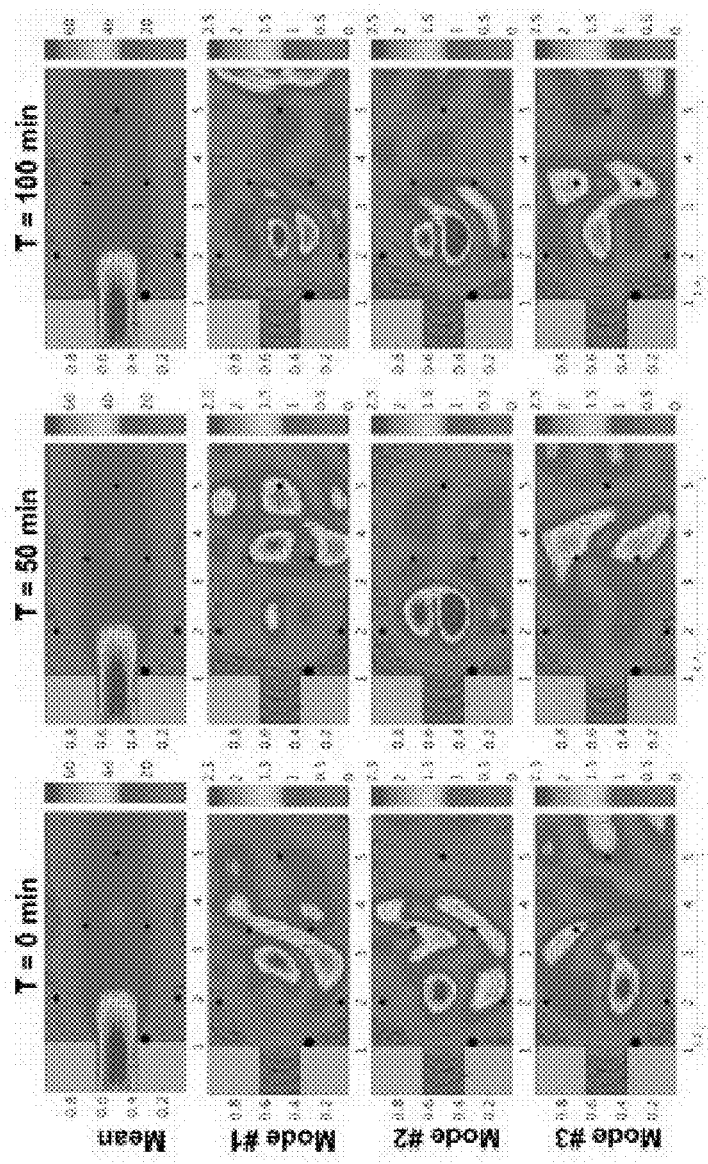
Figures 4, 5, 6, 7, 8, 9, 10, 11, 12, 13, 14, 15, 15B:
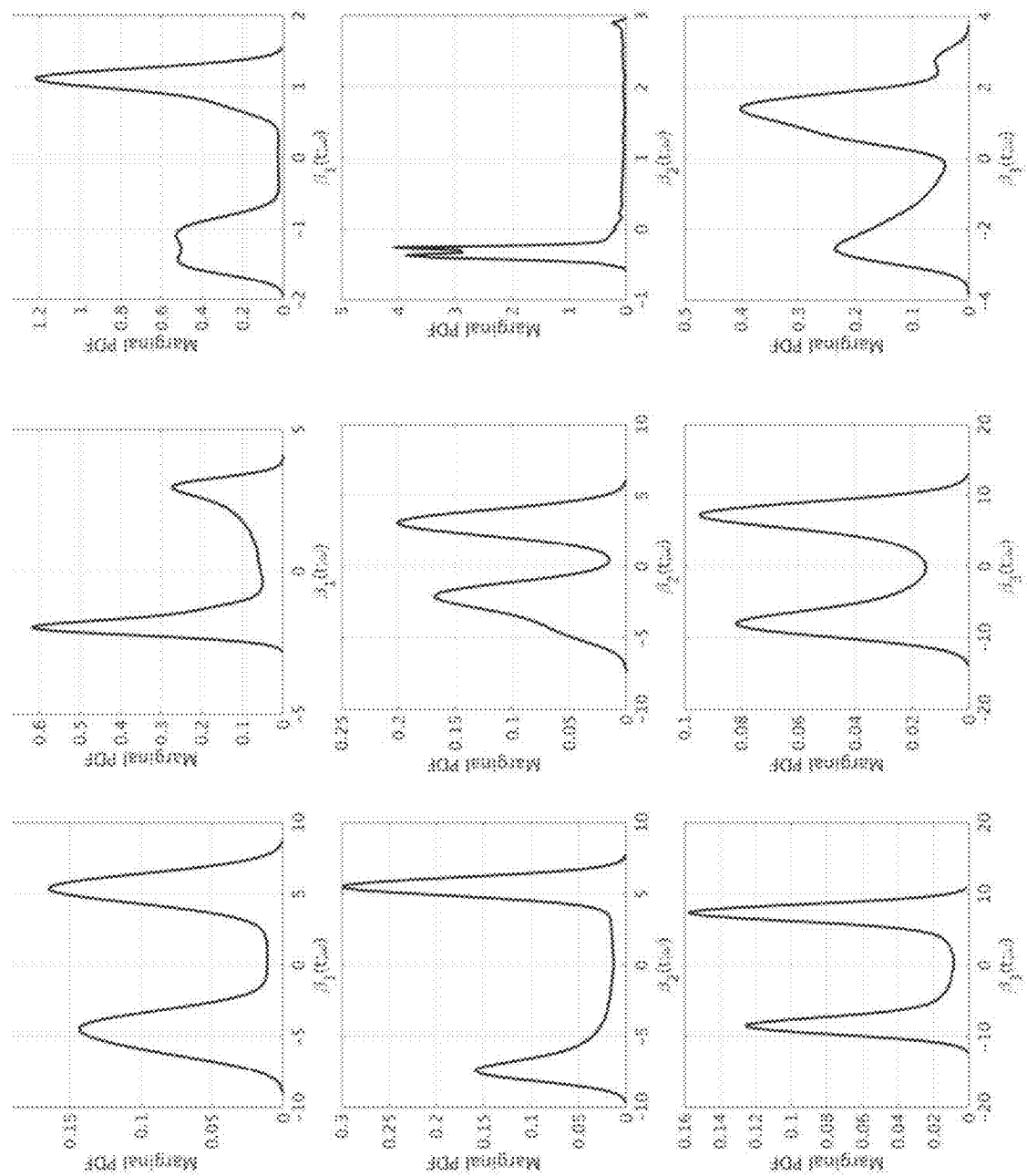
Figures 4, 5, 6, 7, 8, 9, 10, 11, 12, 13, 14, 15, 16:
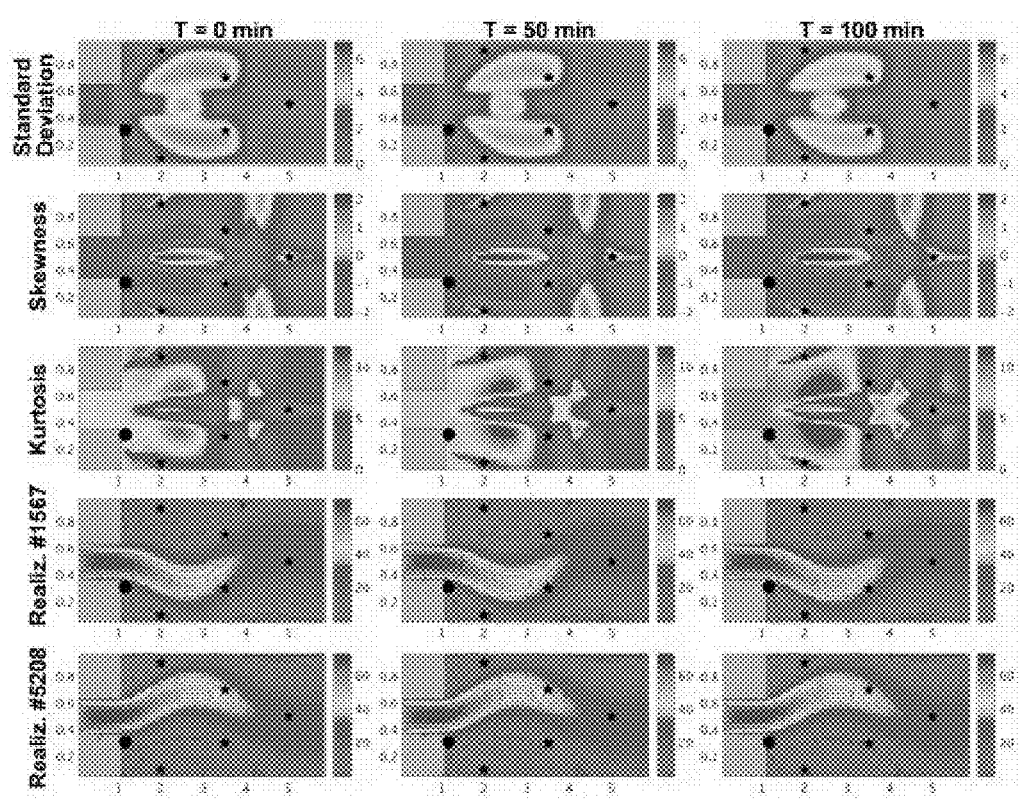
Figures 4, 5, 6, 7, 8, 9, 10, 11, 12, 13, 14, 15, 16, 17:
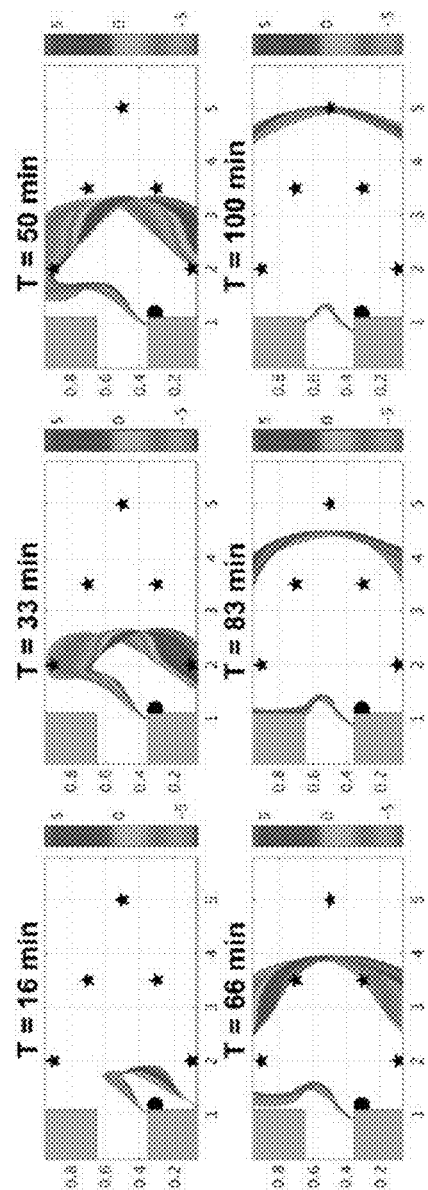
Figures 4, 5, 6, 7, 8, 9, 10, 11, 12, 13, 14, 15, 16, 17, 18:
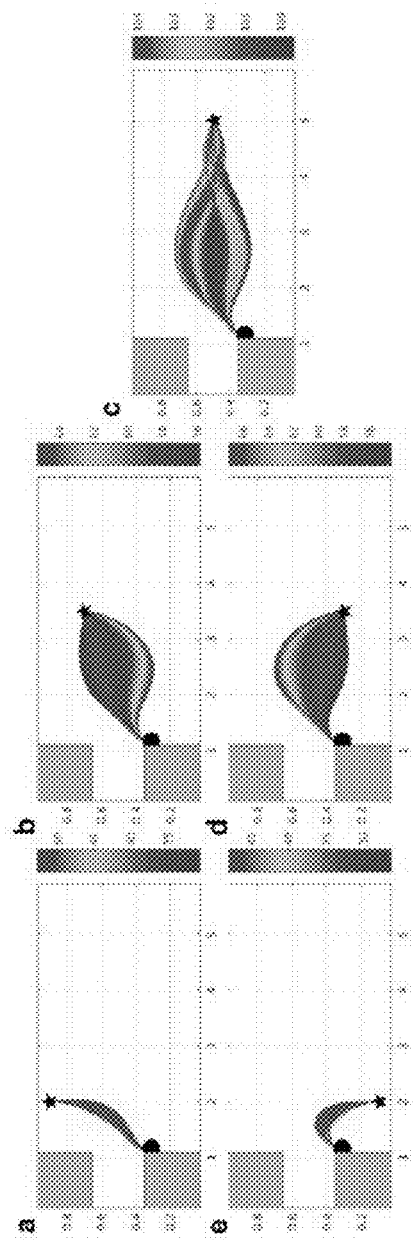
Figures 4, 5, 6, 7, 8, 9, 10, 11, 12, 13, 14, 15, 16, 17, 18, 19:
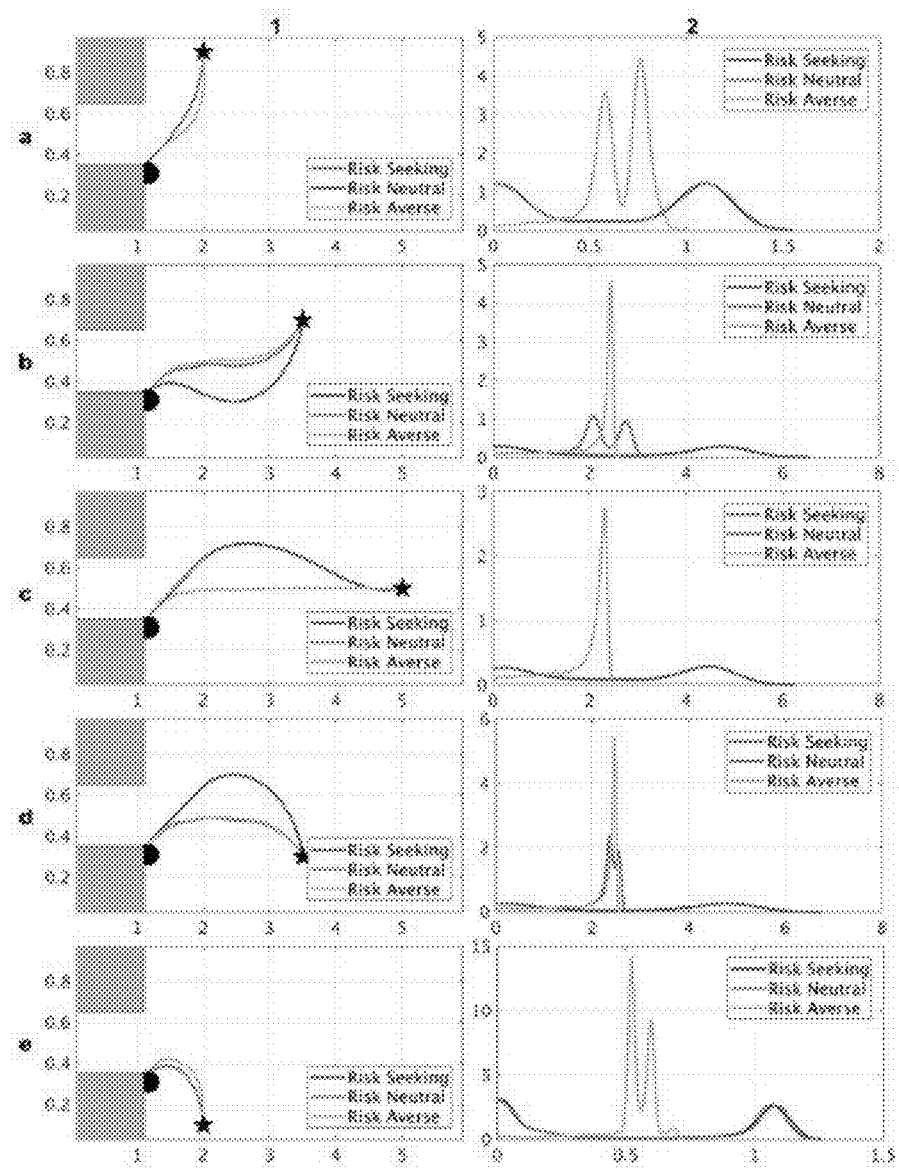
Figures 4, 5, 6, 7, 8, 9, 10, 11, 12, 13, 14, 15, 16, 17, 18, 19, 20:
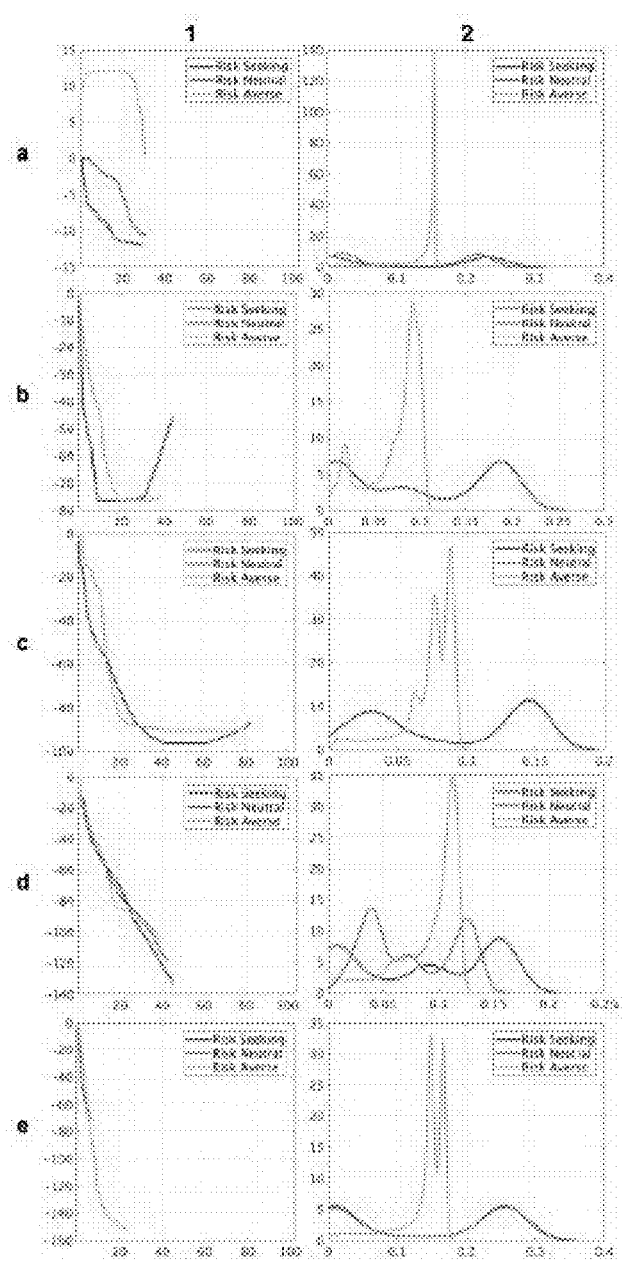
Figures 4, 5, 6, 7, 8, 9, 10, 11, 12, 13, 14, 15, 16, 17, 18, 19, 20, 21:
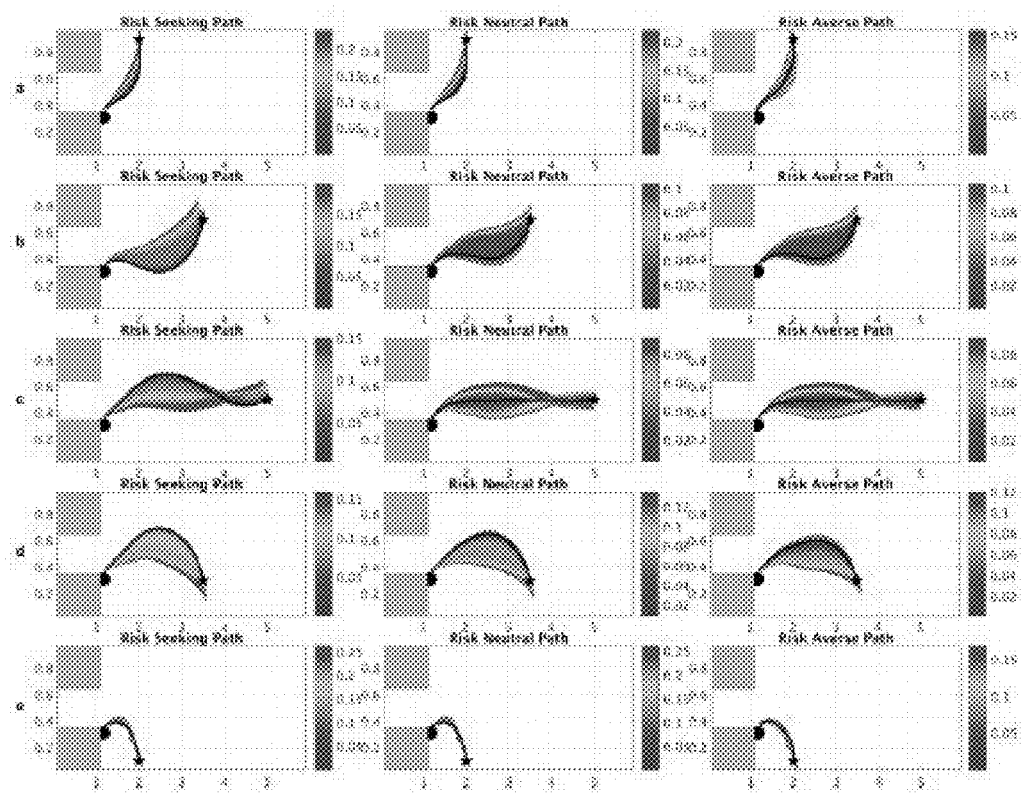

As our third illustration, we present risk-optimal planning in an idealized stochastic flow scenario encountered in the coastal oceans and in urban environments. In the coastal oceans, a barotropic jet exiting a strait (or an estuary) into a wider channel creates eddies and meanders downstream (Lolla et al., 2015). In urban environments, the wind blowing through narrow constrictions between buildings into an open area also creates similar dynamics. Such flows can be idealized as sudden expansion flows studied extensively in fluid dynamics (Cherdron et al., 1978; Durst et al., 1974; Fearn et al., 1990). We consider a 6 km×1 km channel with a narrow constriction of length ⅓ km on the West. A uniform jet with a velocity 50 cm/s is exiting the constriction into the channel. The initial conditions of the barotropic velocity components in the channel are uncertain and sampled from a Gaussian covariance kernel with a decorrelation length scale of 1 km. The simulation is conducted by solving the quasi-geostrophic DO equations A.3 with $n_{s,v}$=10 DO modes and $n_{r,v}$=10, 000 DO realizations. The stochastic flow is allowed to develop for 1,500 mins by which time the flow develops recirculation zones and breaks to either the north or south of the centerline, depending on the initial uncertain perturbations. The nonlinear dynamics causes the initial Gaussian uncertainty to become non-Gaussian by this time. For our risk-optimal planning, we consider the flow for the next 100 mins. FIG. 15 shows the mean field, and the first three DO velocity modes and the marginal PDF of the DO velocity coefficients at three discrete times T=0, 50 and 100 mins.

FIG. 4-15: Stochastic flow exiting a strait: Mean, Mode #1,#2,#3, Coeff. #1,#2,#3 are shown at three discrete times at the beginning, middle and end of the planning horizon. The mean and modes velocity streamlines are overlaid on a colorplot of their magnitude. The coefficients are shown by their marginal PDF.

As can be seen here, the uncertainty in the flow field is highly dynamic and non-Gaussian, but the mean flow is nearly steady. Such flows are often encountered in the coastal ocean or atmosphere. FIG. 4-16 shows the standard deviation, skewness and kurtosis of the velocity field at three discrete times.

FIG. 4-16: Statistics and representative realizations of the stochastic flow exiting a strait: The standard deviation, skewness and kurtosis of the velocity fields are shown in the first three rows. Two representative realizations are shown in the last two rows. All fields are shown for three discrete times at the beginning, middle and end of the planning horizon in each column.

Also shown are two representative realizations with the jet breaking to the south and north. This completes step I of Table. 1.

3.3.1 Stochastic Reachability and Time-Optimal Path Distribution

Our path planning problem is to predict the risk optimal paths of a vehicle with a nominal relative speed of 25 cm/s traveling from the start point (depicted by a circle in FIG. 4-17) to five target locations (depicted by stars in FIG. 4-17).

FIG. 4-17: Stochastic reachability front evolution colored by DO velocity coeff #1. The reachability fronts are computed by one DO simulation by solving the stochastic DO level set equations with the above stochastic DO velocity fields for the stochastic flow exiting a strait.

Using the velocity DO mean, modes and coefficients computed above, we solve the stochastic DO level set equations A.7 to obtain the distribution of the stochastic reachability fronts. FIG. 4-17 shows the evolution of the stochastic reachability front at six discrete times, T=16, 33, 50, 66, 83 and 100 mins. In each panel, the reachability fronts are colored by the DO velocity coefficient 1 of the stochastic flow field. The time-optimal path distribution is computed from the stochastic reachability fronts and back-tracking eq. A.5. FIG. 4-18 shows the distribution of the time-optimal paths to the five targets, each colored with the arrival time at the target.

FIG. 4-18: Time-optimal path distribution colored by arrival time in mins The distribution of exact time-optimal paths are computed from the stochastic reachability fronts using the stochastic back tracking equation.

The paths in panels (a) and (e) have low physical variability but significant arrival time variability. The paths in panels (c) have high physical variability but low variability in the arrival time and the paths in panels (b) and (c) have high variability in both the physical paths and arrival times. This completes step II of Table. 1.

3.3.2 Risk Optimal Paths

For each of the five targets, we complete step III of Table 1 to obtain the risk optimal paths (both waypoint objectives and heading objectives separately).

Waypoint Objectives. Here, as before, under assumptions of complete controllability, the error metric can be computed directly from the distribution of the time-optimal paths. FIG. 4-19 column 1 shows the computed risk-optimal paths that minimize risk-seeking, risk-neutral and risk-averse cost functions for all the five targets (rows (a) to (e)). FIG. 4-19 column 2 shows the PDF of the errors due to following the computed risk-optimal waypoint objectives corresponding to the paths in column 1.

FIG. 4-19: Risk-optimal paths with waypoint objectives in the stochastic flow exiting a strait: (a)-(e) correspond to the five target locations. Column 1 shows the risk-seeking, risk-neutral and risk-averse waypoint objective choices. Column 2 shows the PDF of errors due to following the risk optimal paths. The error is quantified as the discrete Frechet distance between the risk-optimal choice and the true time-optimal path corresponding to the realized environment.

Due to the complex and dynamic nature of the path uncertainty, the different risk-optimal paths show interesting behavior. For targets a and e, the risk-neutral and risk-seeking paths are physically very close to each other and have similar error PDFs. However, for targets b, c and d, it is the risk-neutral and risk-averse paths that are physically closer. For all targets, the error PDF of the risk-seeking and risk-averse paths are similar to the error PDF in other test cases. Crucially, our rigorous probabilistic prediction and risk-optimal path planning framework allows computation of such complex risk-optimal paths very efficiently.

Heading Objectives. FIG. 4-20 shows the risk-optimal heading objectives (in column 1) and the error PDF (column 2) for the five target locations (rows (a) to (e)), computed by completing step III of Table 1.

FIG. 4-20: Risk-optimal heading objectives in the stochastic flow exiting a strait: Rows (a)-(e) correspond to the five targets. Column 1 shows the risk-seeking, risk-neutral and risk-averse heading objective choices, and column 2 shows the PDF of errors due to following the risk-optimal heading objectives. The error is quantified as the discrete Frechet distance between the path obtained by following the risk-optimal choice and the true time-optimal path corresponding to that realized environmental flow.

FIG. 4-21 shows the trajectories obtained by following the risk-optimal heading objectives in all the flow realizations. As before, each trajectory is colored by the discrete Frechet distance between that and the true time-optimal path for that flow realization.

FIG. 4-21: Trajectories obtained by following risk-optimal headings in the stochastic flow exiting a strait: (a)-(e) correspond to the five target locations. The columns correspond to risk-seeking, risk-neutral and risk-averse waypoint objective choices. Each trajectory is colored by the discrete Frechet distance between that trajectory and the exact time-optimal path corresponding to that realization of the environment.

As before, each trajectory is colored by the discrete Frechet distance between that and the true time-optimal path for that flow realization.

4. Conclusion

We developed the theory for rational risk-optimal path planning by combining decision theory and our stochastic time-optimal path planning with stochastic DO level-set equations. The schemes and software developed compute risk-optimal paths for vehicles navigating in uncertain, strong and dynamic flows. The path planning proceeds in three steps: (i) obtain predictions of the probability distribution of environmental flows, (ii) obtain predictions of the distribution of exact time-optimal paths for the above flow distribution, and (iii) compute and minimize the risk of following the above time-optimal paths. Three cost functions corresponding to risk-seeking, risk-neutral and risk-averse behaviors were utilized to compute and minimize risk. We illustrated the planning in three stochastic flow scenarios: stochastic steady front crossing, double gyre and flow exiting a strait. The risk-optimal paths minimize the error of following the chosen path, if it is not the exact time-optimal path for that environmental flow realization. Minimizing a risk-seeking cost function results in a path that has a higher probability of being closer to the exact time-optimal path, but also a higher probability of being far away from the exact time-optimal path. A risk-averse path on the other hand has a high probability of medium error, and a low probability of either extremes (being very close or very far from the exact time optimal path). In complex flow situations, it is difficult to predict the behavior a-priori as shown in the stochastic flow exiting a strait example. Here, our methodology allows in the characterization and minimization of the risks along time-optimal paths. In the future, risk-optimal planning can be integrated with probabilistic current predictions for real-time missions with real AUVs.

5. Stochastic Time-Optimal Path Planning

5.1 Stochastic Dynamically Orthogonal Barotropic Quasi-Geostrophic Equations In this information, we briefly provide the stochastic PDEs that govern the dynamics of uncertain Barotropic Quasi-Geostrophic flows. For specifics, we refer to Ueckermann et al. (2013). The stochastic Barotropic Quasi-Geostrophic equation, written as conservation of momentum in the Langevin form is $$\frac{\partial v(x, t; \omega)}{\partial t} + \nabla \cdot (v(x, t; \omega) v(x, t; \omega)) + f \hat{k} \times v(x, t; \omega) = \tag{A.1a}$$
$$-\nabla p(x, t; \omega) + \frac{1}{Re} \nabla^2 v(x, t; \omega) + a\tau,$$

$$\nabla \cdot v(x, t; \omega) = 0, \tag{A.1b}$$

$$v(x, 0; \omega) = v_0(x; \omega), \tag{A.1c}$$

where Re is the Reynold's number, f is the Coriolis coefficient, and a the strength of the wind stress. For the Coriolis coefficient, we employ a β-plane approximation $f=f_0+\beta y$.

Introducing a DO decomposition to $v(x,t;\omega)$, $$v(x, t; \omega) = \bar{v}(x, t) + \sum_{i=1}^{n_{s,v}} \mu_j(t; \omega)\tilde{v}_j(x, t) \quad (A.2)$$

where $\mathbb{E}[\mu_j(t;\omega)] = 0 \forall j = 1 \ldots n_{s,v}$, we can derive the DO mean (eqs. A.3a, A.3b), coefficient (eq. A.3c) and mode equations (eqs. A.3d, A.3e) of the S-PDE eq A.1 as $$\nabla \cdot \bar{v} = 0, \quad (A.3a)$$

$$\frac{\partial \bar{v}}{\partial t} = \frac{1}{Re}\nabla^2 \bar{v} - \nabla \cdot (\bar{v}\bar{v}) - C_{\mu_m\mu_n}\nabla \cdot (\tilde{v}_m\tilde{v}_n) - f\hat{k}\times\bar{v} - \nabla\bar{p} + a\tau, \quad (A.3b)$$

$$\frac{d\mu_i}{dt} = \mu_m\left(\frac{1}{Re}\nabla^2 \tilde{v}_m - \nabla\cdot(\tilde{v}_m\bar{v}) - \nabla(\bar{v}\tilde{v}_m) - \nabla\tilde{p}_m - f\hat{k}\times\tilde{v}_m, \tilde{v}_i\right) - \quad (A.3c)$$
$$(\mu_m\mu_n - C_{\mu_m\mu_n})\langle\nabla\cdot(\tilde{v}_m\tilde{v}_n),\tilde{v}_i\rangle,$$

$$\nabla \cdot \tilde{v}_i = 0, \quad (A.3d)$$

$$\frac{\partial \tilde{v}_i}{\partial t} = D_i^v - \langle D_i^v \tilde{v}_k \rangle \tilde{v}_k, \text{ where} \quad (A.3e)$$

$$D_i^v = \frac{1}{Re}\nabla^2 \tilde{v}_i - \nabla\cdot(\tilde{v}_i\bar{v}) - \nabla(\bar{v}\tilde{v}_i) - \nabla\tilde{p}_i - C_{\mu_t\mu_j}^{-1}M_{\mu_j\mu_m\mu_n}\nabla\cdot(\tilde{u}_m\tilde{u}_n),$$

where we have dropped the parenthesis $(x,t;\omega)$ for brevity of notation. Here, $\mathbb{E}$ is the expectation operator, C is the covariance matrix, M is the third moment, and $\langle\psi_i,\psi_j\rangle$ is the spatial inner-product operator for any two fields $\psi_i$ and $\psi_j$ defined as $\langle\psi_i,\psi_j\rangle = \int_D \psi_i\psi_j dx$.

5.2 Stochastic Dynamically Orthogonal Level-Set Equations

Here, we summarize the exact stochastic level-set equations and the efficient stochastic DO level-set equations derived for stochastic time-optimal path planning in Subramani et al. (2018).

The stochastic reachability front for a vehicle-Q (FIG. 1) is governed by the stochastic Hamilton-Jacobi (HJ) level-set equation $$\frac{\partial \phi(x, t; \omega)}{\partial t} + F(t)|\nabla \phi(x, t; \omega)| + v(x, t; \omega)\cdot\nabla\phi(x, t; \omega) = 0, \quad (A.4)$$

with the initial condition $\phi(x,0;\omega) = |x-x_s|$ and, as needed, open boundary condition $$\left.\frac{\partial^2 \phi(x, t; \omega)}{\partial n^2}\right|_{\delta D} = 0$$

where n is the outward normal to the boundary δD, ω is a random event, and φ is the reachability-front-tracking scalar level-set field (e.g., signed distance function). For every ω, the optimal arrival-time $T(x_f;\omega)$ at $x_f$ is obtained by integrating eq. A.4 until the first time t such that $\phi(x_f,t;\omega) \leq 0$. The optimal trajectory $X_Q(x_s,t;\omega)$ is then given by the particle backtracking equation $$\frac{dX_Q(x_s, t; \omega)}{dt} = \quad (A.5)$$
$$-v(X_Q(x_s, t; \omega), t; \omega) - F(t)\frac{\nabla\phi(X_Q(x_s, t; \omega), t; \omega)}{|\nabla\phi(X_Q(x_s, t; \omega), t; \omega)|},$$

$$0 \leq t \leq T(x_f; \omega) \text{ and } X_Q(x_s, T; \omega) = x_f.$$

To arrive at the DO level-set equations, let us introduce a DO decomposition to the stochastic level-set φ as $$\phi(x, t; \omega) = \bar{\phi}(x, t) + \sum_{i=1}^{n_{s,\phi}} Y_i(t; \omega)\tilde{\phi}_i(x, t), \quad (A.6)$$

where $\mathbb{E}[Y_i(t;w)] = 0 \ \forall \ i = 1 \ldots n_{s,\phi}$.

The stochastic DO level-set equations are $$\frac{\partial \bar{\phi}}{\partial t} = -[F\mathbb{E}[\gamma] + \bar{v}\cdot\nabla\bar{\phi} + C_{\mu_j Y_i}\tilde{v}_j\cdot\nabla\tilde{\phi}_i], \quad (A.7a)$$

$$\frac{dY_i}{dt} = -\langle F(\gamma - \mathbb{E}[\gamma]) + Y_k\bar{v}\cdot\nabla\tilde{\phi}_k + \quad (A.7b)$$
$$\mu_j\tilde{v}_j\cdot\nabla\bar{\phi} + \tilde{v}_j\cdot\nabla\tilde{\phi}_k(\mu_j Y_k - C_{\mu_j Y_k}), \tilde{\phi}_i\rangle,$$

$$\frac{\partial \tilde{\phi}_i}{\partial t} = D_i - \langle D_i, \tilde{\phi}_n\rangle\tilde{\phi}_n, \text{ where} \quad (A.7c)$$

$$D_i = -C_{Y_j Y_i}^{-1}[F\mathbb{E}[Y_j\gamma] + C_{Y_j\mu_k}\tilde{v}_k\cdot\nabla\bar{\phi} + \mathbb{E}[Y_j\mu_k Y_i]\tilde{v}_k\cdot\nabla\tilde{\phi}_i] - \bar{v}\cdot\nabla\tilde{\phi}_i.$$

6. Notation

The notation for variables used in the present paper is furnished here in Table B.2.

Aghababa, M. P., 2012. 3d path planning for underwater vehicles using five evolutionary optimization algorithms avoi-ding static and energetic obstacles. Applied Ocean Research 38, 48-62.

Alt, H., Godau, M., 1995. Computing the frechet distance between two polygonal curves. International Journal of Com-putational Geometry & Applications 5 (01n02), 75-91.

Alvarez, A., Caiti, A., Onken, R., 2004. Evolutionary path planning for autonomous underwater vehicles in a variable ocean. IEEE Journal of Oceanic Engineering 29 (2),418-429.

Amato, C., Konidaris, G., Anders, A., Cruz, G., How, J. P., Kaelbling, L. P., 2016. Policy search for multi-robot coordi-nation under uncertainty. The International Journal of Robotics Research 35 (14), 1760-1778.

TABLE B.2

| Relevant notation | | |
|---|---|---|
| Scalar | | |
| i, j | $\in \mathbb{N}$ | Stochastic subspace index |
| Q | | Vehicle whose risk-optimal path is to be determined |
| F | $\in \mathbb{R}^+$ | Vehicle speed |
| $n_D$ | $\in \mathbb{N}$ | Dimension of $\mathcal{D}$, the physical domain |
| $n_x$ | $\in \mathbb{N}$ | Number of discrete grid points in the x-direction |
| $n_x$ | | Number of discrete grid points in the y-direction |
| $n_g$ | $\in \mathbb{N}$ | Total number of discrete grid points in $\mathcal{D}$ |
| $n_{s,\phi}$ | $\in \mathbb{N}$ | Dimension of the stochastic subspace of φ, the level-set scalar field |
| $n_{s,v}$ | $\in \mathbb{N}$ | Dimension of the stochastic subspace of v, the velocity vector field |
| $Y_i$ | $\in \mathbb{R}$ | Random variable describing the PDF of the orthonormal level-set (φ) modes $\tilde{\phi}_i$ |

TABLE B.2-continued

Relevant notation

| | | |
|---|---|---|
| $\mu_i$ | $\in \mathbb{R}$ | Random variable describing the PDF of the orthonormal velocity (v) modes $\tilde{v}_i$ |
| $n_r$ | $\in \mathbb{N}$ | Number of Monte Carlo realizations of the level-sets (and velocity vector fields) |
| r | $\in \mathbb{N}$ | Realization index |
| | | Vector |
| v | $\in \mathbb{R}^{n_D n_g}$ | Velocity vector field |
| $\bar{v}$ | $\in \mathbb{R}^{n_D n_g}$ | Mean velocity vector field |
| $\tilde{v}$ | $\in \mathbb{R}^{n_D n_g}$ | DO mode i of v: Dynamically orthogonal basis for the stochastic subspace of v |
| $\phi$ | $\in \mathbb{R}^{n_g}$ | Level-Set field |
| $\bar{\phi}$ | $\in \mathbb{R}^{n_g}$ | Mean Level-Set field |
| $\tilde{\phi}_i$ | $\in \mathbb{R}^{n_g}$ | DO mode i of $\phi$: Dynamically orthogonal basis for the stochastic subspace of $\phi$ |

REFERENCES

Arrow, K. J., 1958. Utilities, attitudes, choices: A review note. Econometrica: Journal of the Econometric Society, 1-23. Barraquand, J., Latombe, J.-C., 1990. A monte-carlo algorithm for path planning with many degrees of freedom. In:

Robotics and Automation, 1990. Proceedings., 1990 IEEE International Conference on. IEEE, pp. 1712-1717. Beylkin, D., 2008. Path optimization for an earth-based demonstration balloon flight. Surf report, Caltech, Pasadena, Calif. Blythe, J., 1999. An Overview of Planning Under Uncertainty. Springer Berlin Heidelberg, Berlin, Heidelberg, pp. 85-110.

Boddy, M., Dean, T. L., 1989. Solving time-dependent planning problems. Brown University, Department of Computer Science, Providence, R.I.

Bry, A., Roy, N., 2011. Rapidly-exploring random belief trees for motion planning under uncertainty. In: Robotics and Automation (ICRA), 2011 IEEE International Conference on. IEEE, pp. 723-730.

Burns, B., Brock, O., 2007. Sampling-based motion planning with sensing uncertainty. In: Robotics and Automation, 2007 IEEE International Conference on. IEEE, pp. 3313-3318.

Chakrabarty, A., Langelaan, J., 2013. UAV flight path planning in time varying complex wind-fields. In: American Control Conference. IEEE, pp. 2568-2574.

Cherdron, W., Durst, F., Whitelaw, J. H., 1978. Asymmetric flows and instabilities in symmetric ducts with sudden expansions. Journal of Fluid Mechanics 84 (1), 13-31.

Durst, F., Melling, A., Whitelaw, J. H., 1974. Low Reynolds number flow over a plane symmetric sudden expansion. Journal of Fluid Mechanics 64, 111-128.

Edwards, J., Smith, J., Girard, A., Wickman, D., Subramani, D. N., Kulkarni, C. S., Haley, Jr., P. J., Mirabito, C., Jana, S., Lermusiaux, P. F. J., June 2017. Data-driven learning and modeling of AUV operational characteristics for optimal path planning. In: Oceans '17 MTS/IEEE Conference. Aberdeen.

Eiter, T., Mannila, H., 1994. Computing discrete fréchet distance. Tech. rep., Technische Universitat Wien.

Epstein, L. G., 1992. Behavior under risk: Recent developments in theory and applications. Advances in economic theory 2, 1-63.

Fearn, R. M., Mullin, T., Cliffe, K. A., 1990. Nonlinear flow phenomena in a symmetric sudden expansion. Journal of Fluid Mechanics 211, 595-608.

Feppon, F., Lermusiaux, P. F. J., 2018. A geometric approach to dynamical model-order reduction. SIAM Journal on Matrix Analysis and Applications In press.

Fishburn, P. C., 1979. On the nature of expected utility. In: Expected utility hypotheses and the Allais paradox. Springer, pp. 243-257.

Fishburn, P. C., 1988. Nonlinear preference and utility theory. Vol. 5. Johns Hopkins University Press, Baltimore.

Garau, B., Alvarez, A., Oliver, G., 2005. Path planning of autonomous underwater vehicles in current fields with complex spatial variability: an A* approach. In: Proceedings of the 2005 IEEE International Conference on Robotics and Automation. IEEE, pp. 194-198.

Hwang, Y. K., Ahuja, N., 1992. Gross motion planning—a survey. ACM Computing Surveys (CSUR) 24 (3), 219-291. Kewlani, G., Ishigami, G., Iagnemma, K., October 2009. Stochastic mobility-based path planning in uncertain environments. In: 2009 IEEE/RSJ International Conference on Intelligent Robots and Systems. pp. 1183-1189.

Kruger, D., Stolkin, R., Blum, A., Briganti, J., april 2007. Optimal AUV path planning for extended missions in complex, fast-flowing estuarine environments. In: Robotics and Automation, 2007 IEEE International Conference on. pp. 4265-4270.

Latombe, J.-C., 2012. Robot Motion Planning. Vol. 124. Springer Science & Business Media, New York. LaValle, S. M., 2006. Planning algorithms. Cambridge university press, Cambridge, UK.

Lermusiaux, P. F. J., Lolla, T., Haley, Jr., P. J., Yigit, K., Ueckermann, M. P., Sondergaard, T., Leslie, W. G., 2016. Science of autonomy: Time-optimal path planning and adaptive sampling for swarms of ocean vehicles. In: Curtin, T. (Ed.), Springer Handbook of Ocean Engineering: Autonomous Ocean Vehicles, Subsystems and Control. Springer, Ch. 21, pp. 481-498.

Lermusiaux, P. F. J., Subramani, D. N., Lin, J., Kulkarni, C. S., Gupta, A., Dutt, A., Lolla, T., Haley, Jr., P. J., Ali, W. H., Mirabito, C., Jana, S., 2017. A future for intelligent autonomous ocean observing systems. Journal of Marine Research 75, special issue: The Science of Ocean Prediction, vol. 17 of The Sea. In press.

LiCalzi, M., Sorato, A., 2006. The pearson system of utility functions. European Journal of Operational Research 172 (2), 560-573.

Lolla, T., Haley, Jr., P. J., Lermusiaux, P. F. J., 2014a. Time-optimal path planning in dynamic flows using level set equations: Realistic applications. Ocean Dynamics 64 (10), 1399-1417.

Lolla, T., Haley, Jr., P. J., Lermusiaux, P. F. J., 2015. Path planning in multiscale ocean flows: coordination and dynamic obstacles. Ocean Modelling 94, 46-66.

Lolla, T., Lermusiaux, P. F. J., Ueckermann, M. P., Haley, Jr., P. J., 2014b. Time-optimal path planning in dynamic flows using level set equations: Theory and schemes. Ocean Dynamics 64 (10), 1373-1397.

Mannarini, G., Pinardi, N., Coppini, G., Oddo, P., Iafrati, A., 2016. Visir-i: small vessels-least-time nautical routes using wave forecasts. Geoscientific Model Development 9 (4), 1597-1625.

Mirabito, C., Subramani, D. N., Lolla, T., Haley, Jr., P. J., Jain, A., Lermusiaux, P. F. J., Li, C., Yue, D. K. P., Liu, Y., Hover, F. S., Pulsone, N., Edwards, J., Railey, K. E., Shaw, G., June 2017. Autonomy for surface ship interception. In: Oceans '17 MTS/IEEE Conference. Aberdeen.

Pereira, A. A., Binney, J., Hollinger, G. A., Sukhatme, G. S., 2013. Risk-aware path planning for autonomous underwater vehicles using predictive ocean models. Journal of Field Robotics 30 (5), 741-762.

Petres, C., Pailhas, Y., Patron, P., Petillot, Y., Evans, J., Lane, D., April 2007. Path planning for autonomous underwater vehicles. Robotics, IEEE Transactions on 23 (2), 331-341.

Rao, D., Williams, S. B., Dec. 2-4, 2009. Large-scale path planning for underwater gliders in ocean currents. In: Proceedings of Australasian Conference on Robotics and Automation. pp. 28-35.

Rosenblatt, J. K., 2000. Optimal selection of uncertain actions by maximizing expected utility. Autonomous Robots 9 (1), 17-25.

Sapsis, T. P., Lermusiaux, P. F. J., December 2009. Dynamically orthogonal field equations for continuous stochastic dynamical systems. Physica D: Nonlinear Phenomena 238 (23-24), 2347-2360.

Schoemaker, P. J., 1982. The expected utility model: Its variants, purposes, evidence and limitations. Journal of economic literature, 529-563.

Sethian, J. A., June 1999. Fast marching methods. SIAM Rev. 41 (2), 199-235.

Soulignac, M., Taillibert, P., Rueher, M., may 2009. Time-minimal path planning in dynamic current fields. In: IEEE International Conference on Robotics and Automation. pp. 2473-2479.

Subramani, D. N., February 2018. Probabilistic regional ocean predictions: Stochastic fields and optimal planning. Ph.D. thesis, Massachusetts Institute of Technology, Department of Mechanical Engineering, Cambridge, Mass.

Subramani, D. N., Haley, Jr., P. J., Lermusiaux, P. F. J., 2017a. Energy-optimal path planning in the coastal ocean. Journal of Geophysical Research: Oceans 122, 3981-4003.

Subramani, D. N., Lermusiaux, P. F. J., 2016. Energy-optimal path planning by stochastic dynamically orthogonal level-set optimization. Ocean Modeling 100, 57-77.

Subramani, D. N., Lermusiaux, P. F. J., Haley, Jr., P. J., Mirabito, C., Jana, S., Kulkarni, C. S., Girard, A., Wickman, D., Edwards, J., Smith, J., June 2017b. Time-optimal path planning: Real-time sea exercises. In: Oceans '17 MTS/IEEE Conference. Aberdeen.

Subramani, D. N., Lolla, T., Haley, Jr., P. J., Lermusiaux, P. F. J., 2015. A stochastic optimization method for energy-based path planning. In: Ravela, S., Sandu, A. (Eds.), DyDESS 2014. Vol. 8964 of LNCS. Springer, pp. 1-12.

Subramani, D. N., Wei, Q. J., Lermusiaux, P. F. J., 2018. Stochastic time-optimal path-planning in uncertain, strong, and dynamic flows. Computer Methods in Applied Mechanics and Engineering 333, 218-237.

Sun, W., Tsiotras, P., Lolla, T., Subramani, D. N., Lermusiaux, P. F. J., April 2017a. Multiple-pursuer-one-evader pursuit evasion game in dynamic flow fields. Journal of Guidance, Control and Dynamics 40 (7).

Sun, W., Tsiotras, P., Lolla, T., Subramani, D. N., Lermusiaux, P. F. J., 2017b. Pursuit-evasion games in dynamic flow fields via reachability set analysis. In: 2017 American Control Conference (ACC). Seattle, pp. 4595-4600.

Thompson, D. R., Chien, S. A., Chao, Y., Li, P., Cahill, B., Levin, J., Schofield, O., Balasuriya, A. P., Petillo, S., Arrott, M., Meisinger, M., 2010. Spatiotemporal path planning in strong, dynamic, uncertain currents. In: Proceedings of IEEE International Conference on Robotics and Automation. pp. 4778-4783.

Ueckermann, M. P., Lermusiaux, P. F. J., Sapsis, T. P., January 2013. Numerical schemes for dynamically orthogonal equa-tions of stochastic fluid and ocean flows. Journal of Computational Physics 233, 272-294.

Von Neumann, J., Morgenstern, O., 2007. Theory of games and economic behavior. Princeton university press, Princeton, N.J.

Wang, T., Le Maître, O. P., Hoteit, I., Knio, O. M., 2016. Path planning in uncertain flow fields using ensemble method. Ocean Dynamics 66 (10), 1231-1251.

Wellman, M. P., Ford, M., Larson, K., 1995. Path planning under time-dependent uncertainty. In: Proceedings of the Eleventh Conference on Uncertainty in Artificial Intelligence. UAI'95. Morgan Kaufmann Publishers Inc., San Fran-cisco, CA, USA, pp. 532-539.
URL http://dl.acm.org/citation.cfm?id=2074158.2074219

Witt, J., Dunbabin, M., December 2008. Go with the flow: Optimal auv path planning in coastal environments. In: Kim, J., Mahony, R. (Eds.), Proceedings of Australasian Conference on Robotics and Automation. pp. 86-94.

V. Additional Considerations

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., FIG. 4) has been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for use in automatically determining an optimized route for a vehicle, the method comprising:
    using at least one computer hardware processor to perform:
        obtaining a target state, a fixed initial position of the vehicle, and uncertain dynamic environmental flow information;
        determining an optimized route from the fixed initial position to the target state using the uncertain dynamic environmental flow information;
        wherein the determining includes solving for stochastic time optimum paths and/or probabilistic reachability sets in a dynamically uncertain environment using dynamic stochastic order reduction including using a dynamically orthogonal (DO) decomposition of a stochastic time-optimal level set or value function to efficiently solve corresponding stochastic DO level-set equations; and
        guiding the vehicle using the optimized route.

2. The method of claim 1, wherein determining the optimized route comprises calculating a forward reachability set and front by numerically solving an unsteady Hamilton-Jacobi (HJ) equation.

3. The method of claim 1, wherein determining the optimized route comprises using a predicted probabilistic environmental velocity field.

4. The method of claim 3, wherein predicting the probabilistic velocity field comprises solving discrete stochastic dynamically orthogonal (DO) barotropic quasi-geostrophic equations.

5. The method of claim 3, wherein predicting the probabilistic velocity field comprises solving discrete stochastic dynamically orthogonal (DO) primitive equations.

6. The method of claim 3, wherein determining the optimized path further comprises performing stochastic optimized route planning by solving stochastic DO level-set equations and computing discrete time-optimal routes and headings using backtracking equations.

7. The method of claim 6, wherein determining the optimized route further comprises performing risk evaluation and optimization.

8. The method of claim 7, wherein performing risk evaluation and optimization comprises:
    simulating trajectories using waypoint objective or heading objectives;
    computing an error metric matrix for the simulated trajectories;
    computing a cost matrix for the simulated trajectories based on the error metric matrix;
    computing a risk for each of the simulated trajectories based on the cost matrix; and
    determining the optimized route as the simulated trajectory associated with a lowest value of the computed risk.

9. At least one non-transitory computer-readable storage medium storing processor executable instructions that, when executed by at least one computer hardware processor, cause the at least one computer hardware processor to perform a method for use in automatically determining an optimized route for a vehicle, the method comprising:
    obtaining a target state, a fixed initial position of the vehicle, and uncertain dynamic environmental flow information; and
        determining an optimized route from the fixed initial position to the target state using the uncertain dynamic environmental flow information;
        wherein the determining includes solving for stochastic time optimum paths and/or probabilistic reachability sets in a dynamically uncertain environment using dynamic stochastic order reduction including using a dynamically orthogonal (DO) decomposition of a stochastic time-optimal level set or value function to efficiently solve corresponding stochastic DO level-set equations; and
    guiding the vehicle using the optimized route.

10. The at least one non-transitory computer-readable storage medium of claim 9, wherein determining the optimized route further comprises:
    performing stochastic optimized path planning by solving stochastic DO level-set equations and computing discrete time-optimal paths and headings using backtracking equations;
    performing risk evaluation and optimization by:
        simulating trajectories using waypoint objective or heading objectives;
        computing an error metric matrix for the simulated trajectories;
        computing a cost matrix for the simulated trajectories based on the error metric matrix; and
        computing a risk for each of the simulated trajectories based on the cost matrix; and
    determining the optimized route as the simulated trajectory associated with a lowest value of the computed risk.

11. A system, comprising:
    at least one computer hardware processor; and
    at least one non-transitory computer-readable storage medium storing processor executable instructions that, when executed by the at least one computer hardware processor, cause the at least one computer hardware processor to perform a method for use in automatically determining an optimized route for a vehicle, the method comprising:
        obtaining a target state, a fixed initial position of the vehicle, and uncertain dynamic environmental flow information; and
        determining an optimized route from the fixed initial position to the target state using the uncertain dynamic environmental flow information;
        wherein the determining includes solving for stochastic time optimum paths and/or probabilistic reachability sets in a dynamically uncertain environment using dynamic stochastic order reduction including using a dynamically orthogonal (DO) decomposition of a stochastic time-optimal level set or value function to efficiently solve corresponding stochastic DO level-set equations; and a device that guides the vehicle using the optimized route.

12. The system of claim 11, wherein determining the optimized route comprises calculating a forward reachability front set by numerically solving an unsteady Hamilton-Jacobi (HJ) equation.

13. The system of claim 11, wherein determining the optimized route further comprises:

performing stochastic optimized route planning by solving stochastic DO level-set equations and computing discrete time-optimal routes and headings using backtracking equations;

performing risk evaluation and optimization; and determining the optimized route as the simulated trajectory associated with a lowest value of the computed risk.

14. The system of claim 11, wherein performing risk evaluation and optimization comprises:

simulating trajectories using waypoint objective or heading objectives;

computing an error metric matrix for the simulated trajectories;

computing a cost matrix for the simulated trajectories based on the error metric matrix; and computing a risk for each of the simulated trajectories based on the cost matrix.

* * * * *